Figure 1:
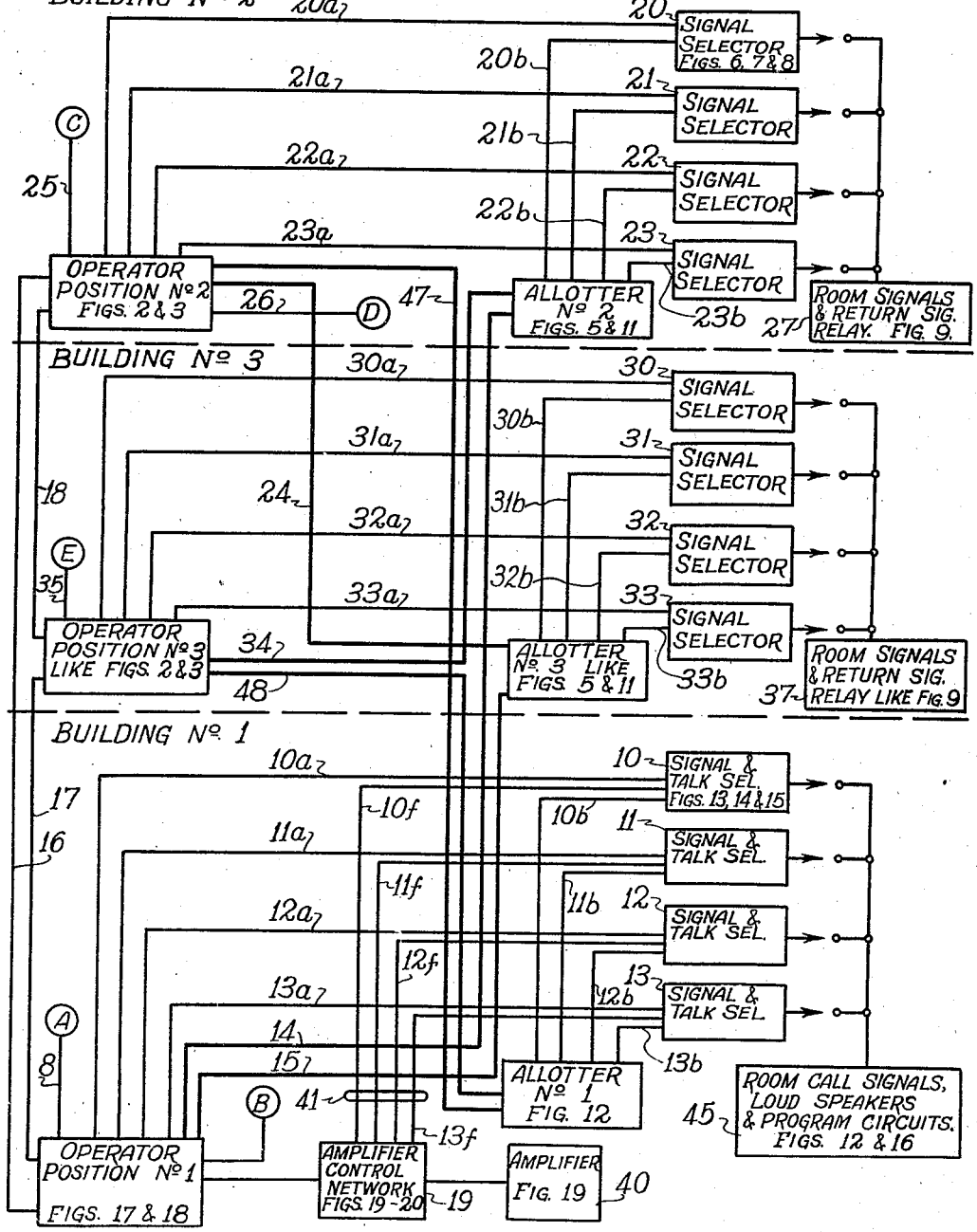

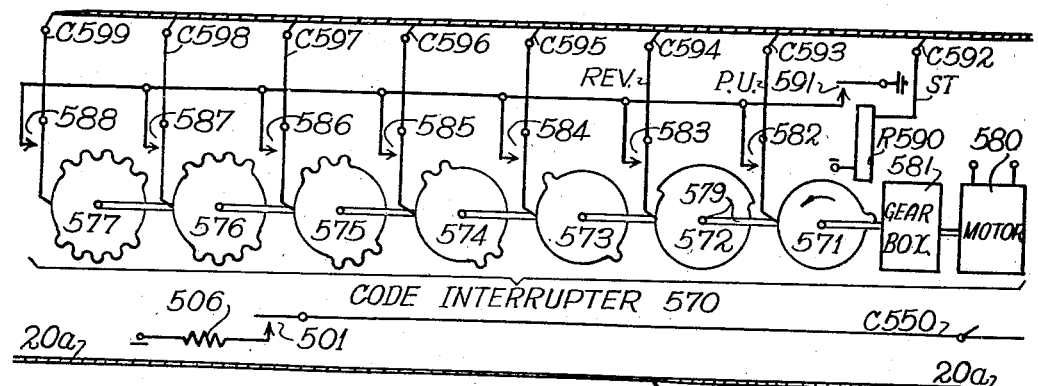
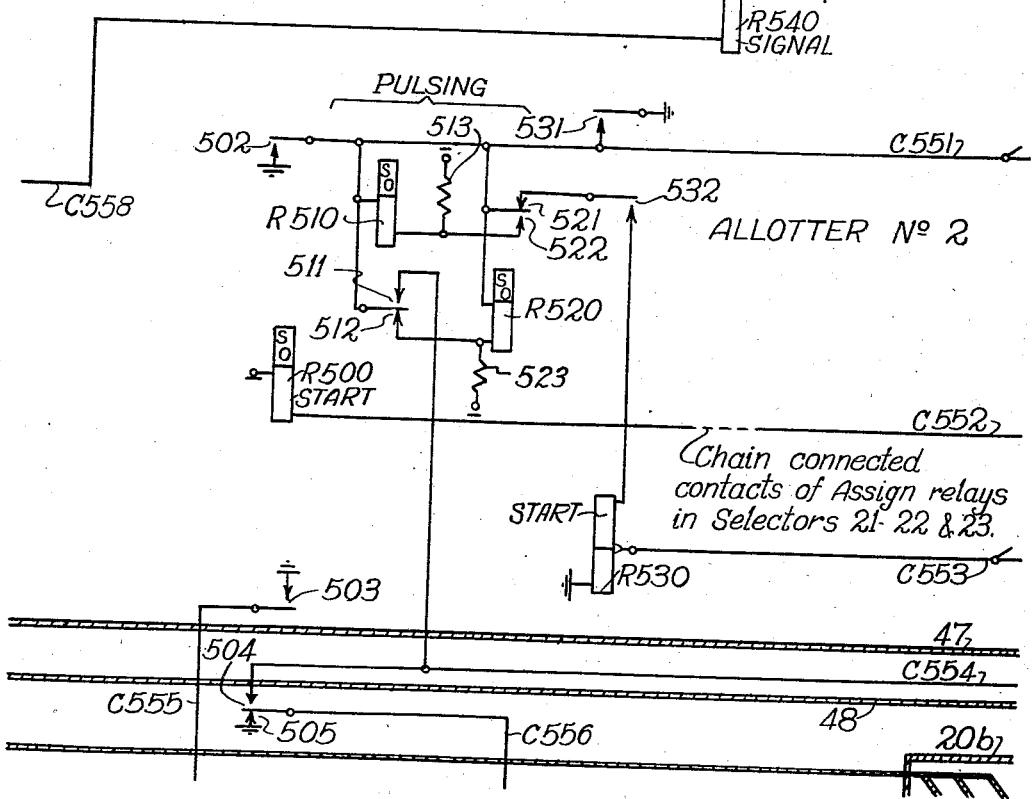
Fig. 5

Sept. 29, 1942.    K. MULLERHEIM    2,297,068
SIGNALING SYSTEM
Filed May 31, 1941    20 Sheets-Sheet 16

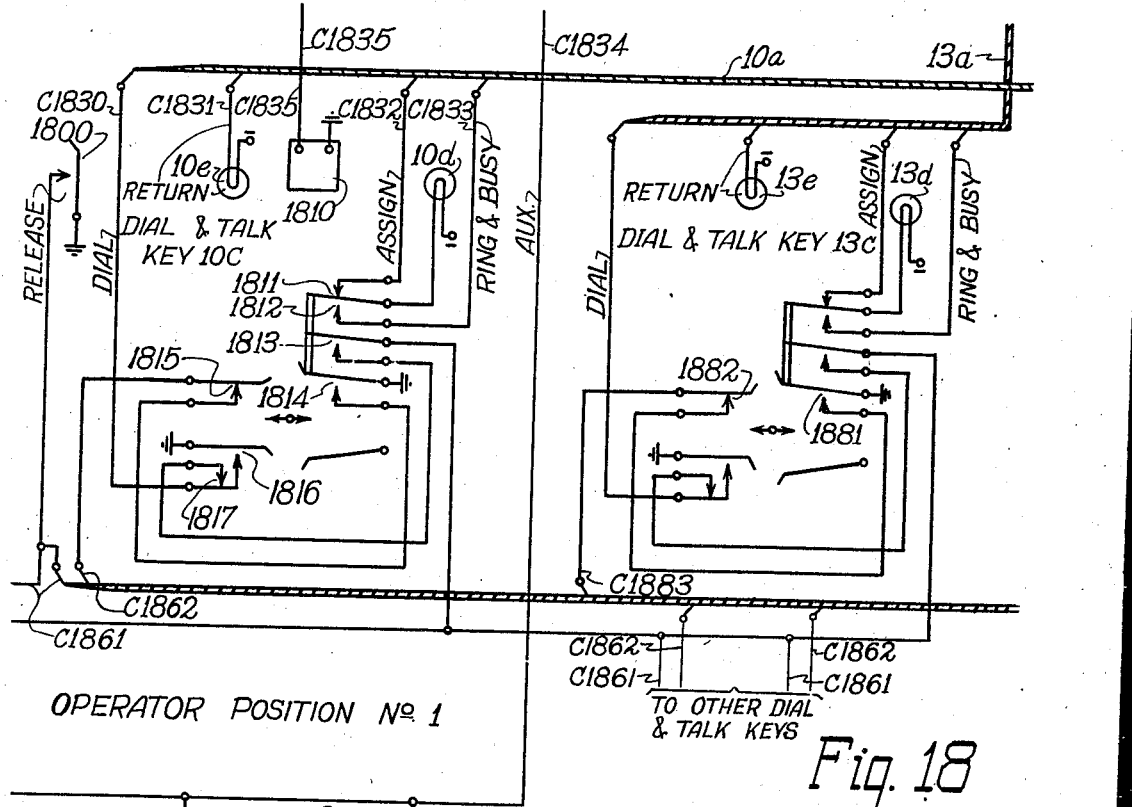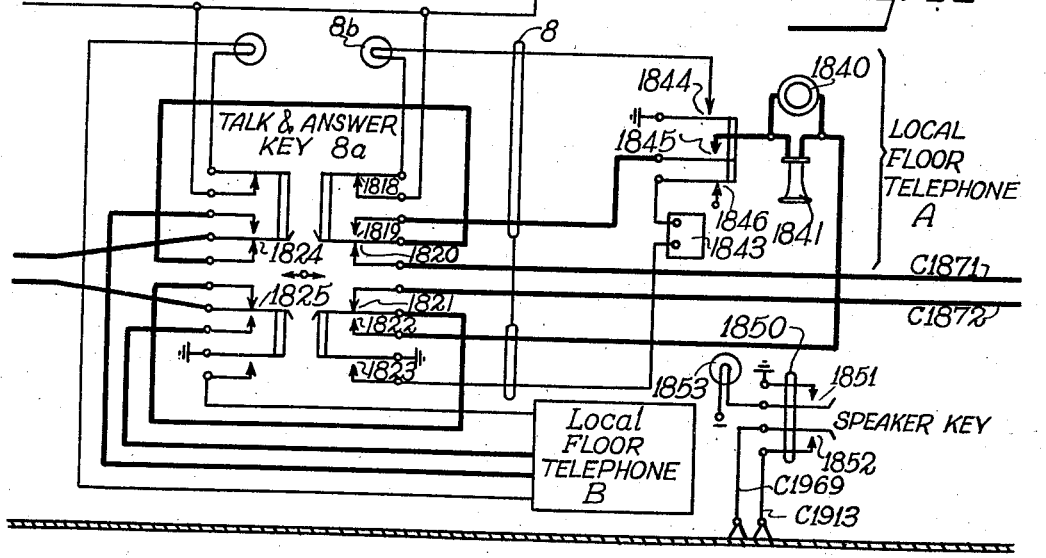
Fig. 18

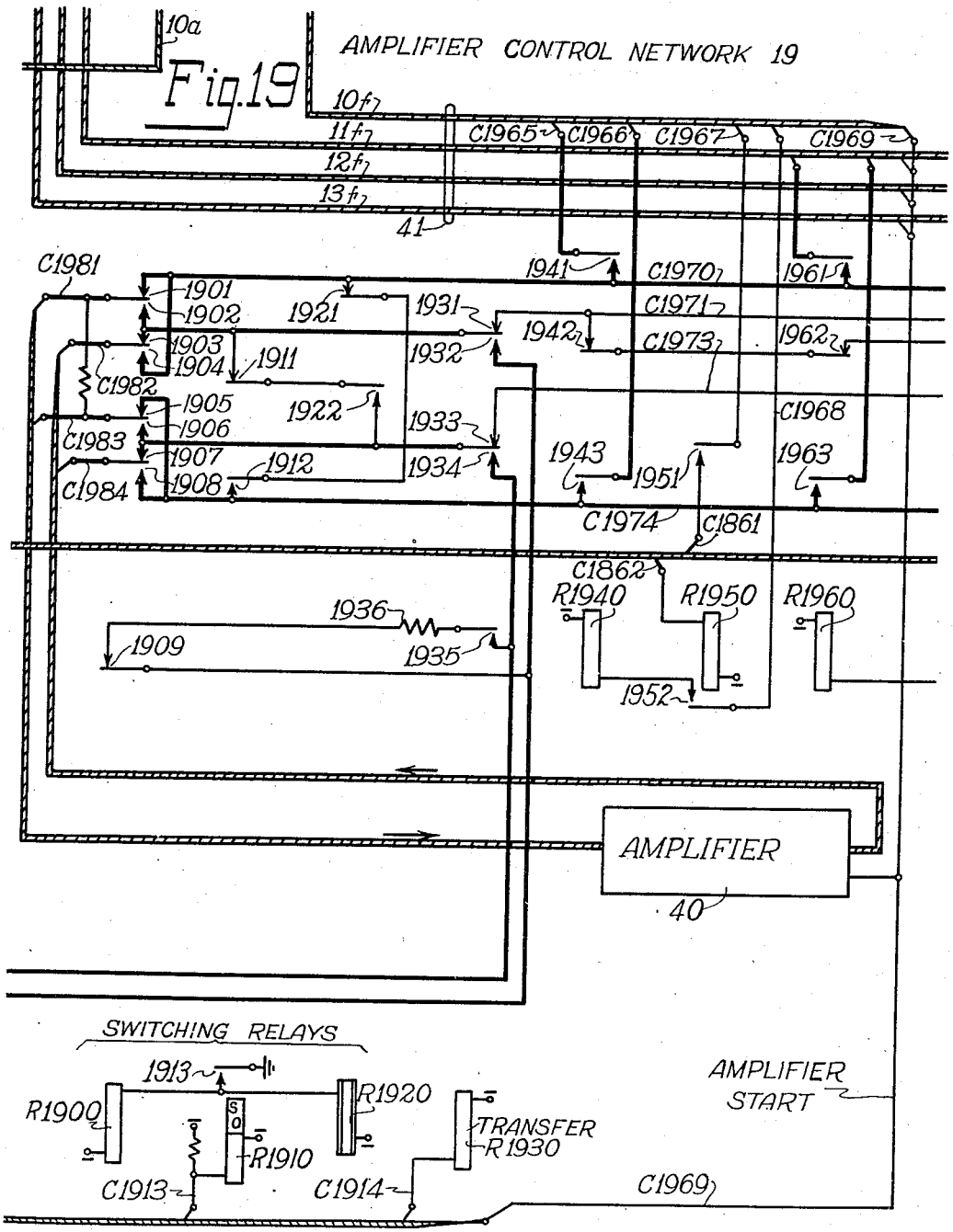

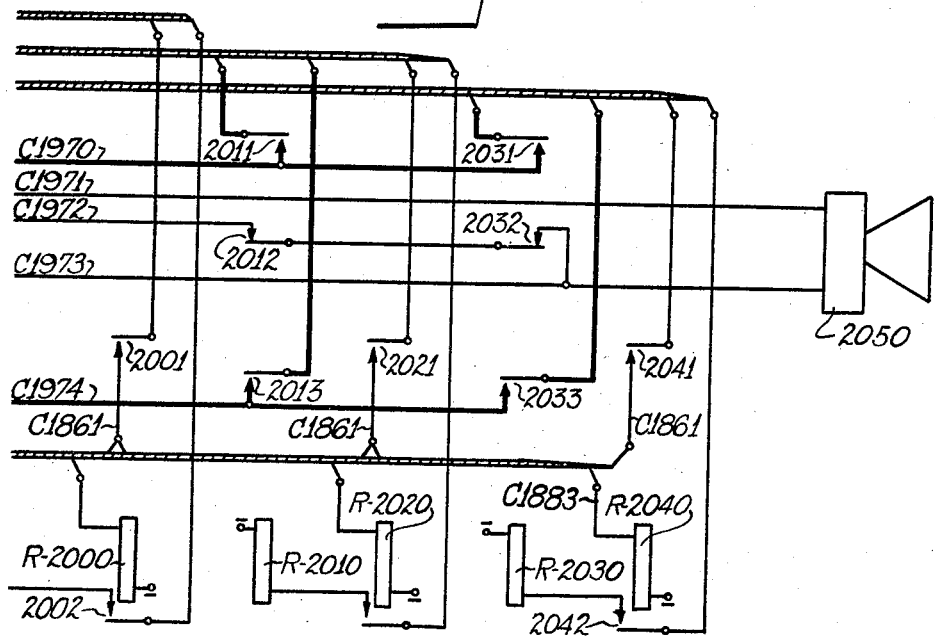

Patented Sept. 29, 1942

2,297,068

UNITED STATES PATENT OFFICE 2,297,068

SIGNALING SYSTEM

Kurt Mullerheim, Chicago, Ill., assignor to Associated Electric Laboratories, Inc., Chicago, Ill., a corporation of Delaware Application May 31, 1941, Serial No. 396,110

80 Claims. (Cl. 179—27)

The present invention relates to improvements in signaling systems and, more particularly, to improvements in signaling systems of the character having both intercommunicating and selective call facilities incorporated therein.

In general, it is an object of the present invention to provide a system of the character described, which has a large call signal capacity, is simple and flexible in its arrangement and mode of operation, is well adapted to meet the diversified operating requirements of several different buildings or zones served by the system, and requires a minimum of equipment to meet the service requirements of the system.

It is another object of the invention to provide in a plural building system of the character described, improved cross-call facilities whereby the attendants at the operator positions or master stations individual to the several buildings are permitted to gain access to the selectors of the other buildings for the purpose of selectively controlling the call signals located in the other buildings.

According to another object of the invention, the selectors of one building are rendered accessible to the attendant in another building over a single trunk which extends from the first building to the operator position in the other building.

It is a further object of the invention to provide in a system of the character described, an improved arrangement for preselecting the selectors of each building for use in a predetermined order, and for guarding each selector which is occupied with a call initiated at one operator position against seizure from a second operator position.

It is another object of the invention to provide an improved system of the character described, wherein provisions are made for automatically signaling the attendant at any one of the operator positions as to the progress of a call routed from the operator position to a desired one of the call signals.

According to another object of the invention, an improved arrangement is incorporated in the system for automatically signaling the attendant at a calling operator position as to the approximate location of the call signal where the call is received or acknowledged.

It is a further object of the invention to provide a system of the character described, which is so arranged that the combined signal and talk selectors provided in one of the buildings may be controlled from the operator position in any one of the buildings to select and selectively control the call signals to which it has access, and may also be utilized to set up communication connections between the operator position in the same building and the remote stations at which the call signals are respectively provided.

In accordance with another object of the invention, a single one-way voice current amplifier is provided in association with the signal and talk selectors, which is automatically included in a communication connection set up through one of these selectors.

According to another feature of the invention, the amplifier may be disassociated from a connection set up through one of the signal and talk selectors and may automatically be included in a connection routed through a second of the signal and talk selectors without releasing the first connection.

According to still another object of the invention, provisions are made whereby the amplifier may be reversely included in a connection set up through one of the selectors in order to reverse the direction in which voice currents may be transmitted over the connection.

It is a still further object of the invention to provide an arrangement whereby a loud speaker and a telephone instrument may selectively be used at the calling operator position in communicating over a connection set up through one of the signal and talk selectors.

It is still another object of the invention to provide an arrangement for automatically short-circuiting the input circuit to the amplifier at the calling operator position incident to each amplifier reversing operation.

It is still another object of the invention to provide a system of the character described, wherein the loud speakers forming a part of a program distribution system installed in the building served by the signal and talk selectors, may be used in communicating over connections set up through these selectors.

According to another object of the invention, the signal and talk selectors may be controlled to seize the distribution trunk of the program distribution system, whereby this trunk and the connected loud speakers may be utilized for the purpose of making announcements from the operator position of the building.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Fig. 1 illustrates in schematic form the apparatus incorporated in a system connected and arranged in accordance with the present invention, and Figs. 2 to 20, inclusive, when combined in the manner illustrated in Fig. 21, illustrate the circuit details of a portion of the switching equipment embodied in the system schematically shown in Fig. 1.

Referring now more particularly to Fig. 1 of the drawings, the system there illustrated is arranged to provide facilities for selectively signaling the occupants of the different rooms in three different buildings. To this end, each room of each building is equipped with a call or room signal which may be selected and selectively controlled through any one of four different selectors provided in the same building, from three different operator positions individual to the three buildings. Provisions are also made in each room whereby a return or answer supervisory signal may be transmitted to the attendant at one of the three operator positions, which indicates that the call has been received and understood.

In the trunking arrangement as illustrated in Fig. 1 of the drawings, the various room signals and return signaling equipment provided in building No. 2 are schematically and collectively indicated at 27 as being accessible to the four signal selectors 20, 21, 22 and 23. These four selectors may be directly controlled over the trunks 20a, 21a, 22a and 23a, respectively, from the operator position No. 2, which is preferably located in the lobby of building No. 2. The four signal selectors are also controllable over the trunks 20b, 21b, 22b and 23b through an allotter No. 2 from the operator position No. 3 provided in building No. 3 and the operator position No. 1 provided in building No. 1. More specifically, the equipment of the allotter No. 2 is located in building No. 2 and is connected by means of a single common trunk 34 to the operator position No. 3 and by a single common trunk 14 to the operator position No. 1.

In a similar manner, the room signals and return signal equipment provided in the rooms of building No. 3 are collectively indicated at 37 as being accessible to four additional signal selectors 30, 31, 32 and 33, which are provided in building No. 3 and may be controlled over the trunks 30a, 31a, 32a and 33a, respectively, directly from the operator position No. 3, located in the lobby of building No. 3. These four selectors are also accessible to the attendant at the operator position No. 2 and the attendant at the operator position No. 1 over trunks 30b, 31b, 32b and 33b, respectively, which extend to an allotter No. 3. This allotter is provided in building No. 3 and terminates trunks 24 and 15 which respectively extend to the operator position No. 2 and the operator position No. 1.

The equipment thus far described, i. e., that provided in buildings Nos. 2 and 3, is utilized solely for the purpose of selecting and controlling the various room signals in acordance with differently coded signal voltages to produce coded signals in the various rooms having various imports as determined by the coding thereof. These same facilities are also provided in building No. 1, but in the equipment of the latter building provisions are also made whereby the attendant at the operator position No. 1 may set up communicating connections to any one of a plurality of rooms in this building. More specifically, this building is equipped with a program distribution system which is so arranged that radio or other programs may be distributed to loud speakers provided in the various rooms over a program circuit which includes a common distribution trunk. Each of the rooms of this building is also equipped with a room signal and with a return signal key. These various pieces of equipment as incorporated in the various rooms of building No. 1 are collectively indicated at 45 as being accessible to the combined signal and talk selectors 10, 11, 12 and 13. The enumerated selectors may be controlled over the trunks 10a, 11a, 12a and 13a, respectively, directly from the operator position No. 1, to select and selectively control the various room signals to which they have access and also to set up communication connections between the operator position No. 1 and any selected room. The arrangement is such that an amplifier 40, common to the four selectors 10, 11, 12 and 13, is automatically included in an intercommunicating connection set up through any one of these selectors. To this end, an amplifier control network 19 is provided which is selectively controlled from the operator position No. 1 and over the trunks 10f, 11f, 12f and 13f from the various signal and talk selectors, automatically to associate the amplifier 40 with any one of the four selectors which is seized from the operator position No. 1. For the purpose of rendering the four signal and talk selectors 10, 11, 12 and 13 accessible to the attendant at the operator position No. 2 and the attendant at the operator position No. 3, these selectors are connected by means of trunks 10b, 11b, 12b and 13b, respectively, to an allotter No. 1 which, in turn, terminates trunks 47 and 48 respectively extending to the operator position No. 2 and the operator position No. 3. In this regard, it may be pointed out that the connections which may be set up between the two last-named operator positions and the four signal and talk selectors provided in building No. 1 only permit the selectors to be utilized in selecting and selectively controlling the room signals provided in the various rooms of this building. More specifically, no provisions are made whereby communication connections may be set up between the operator position No. 2 or the operator position No. 3 and the various rooms of building No. 1.

Each of the three buildings is also equipped with a plurality of floor telephones which are interconnected with the switchboard provided at the operator position in the same building. For example, the operator position No. 2 terminates two lines 25 and 26 which respectively extend to the floor telephones C and D provided on different floors of building No. 2. Similarly, the operator position No. 1 terminates a pair of lines which respectively extend to the floor telephones A and B provided on different floors of building No. 1. The operator position No. 3 similarly terminates a line 35 which extends to a floor telephone E located on one of the floors of building No. 3.

The system further comprises facilities whereby communication connections may be set up between the operator positions of the respective buildings. To this end, a two-way interposition trunk 16 is provided which connects the operator position No. 1 with the operator position No. 2; a two-way interposition trunk 17 is provided which connects the operator position No. 1 with the operator position No. 3; and a two-way interposition trunk 18 is provided which connects the operator position No. 2 with the operator position No. 3.

From the above brief explanation, it will be understood that communication connections may be set up between any two of the operator positions, and between any operator position and the floor telephone located in the same building. It will further be understood that communication connections may be set up between the operator position No. 1 and any one of the rooms in building No. 1. It will also be understood that the room signals, as individually provided in the various rooms of each of the three buildings, may be selected and selectively controlled in accordance with any desired signal code from any one of the three operator positions. In this regard, it may be pointed out that the allotters individual to the three buildings are provided with equipment for preselecting the associated selectors for use one at a time and in a predetermined order. Moreover, provisions are made therein for guarding any selector occupied with a call against seizure, and for suitably signaling the attendants at the three operator positions, over the various connecting trunks, as to the availability of idle selectors in the various buildings. These facilities are so arranged that the attendant at each operator position is at all times informed as to which of the four associated selectors should be seized for the purpose of setting up a control connection.

Figure 2:
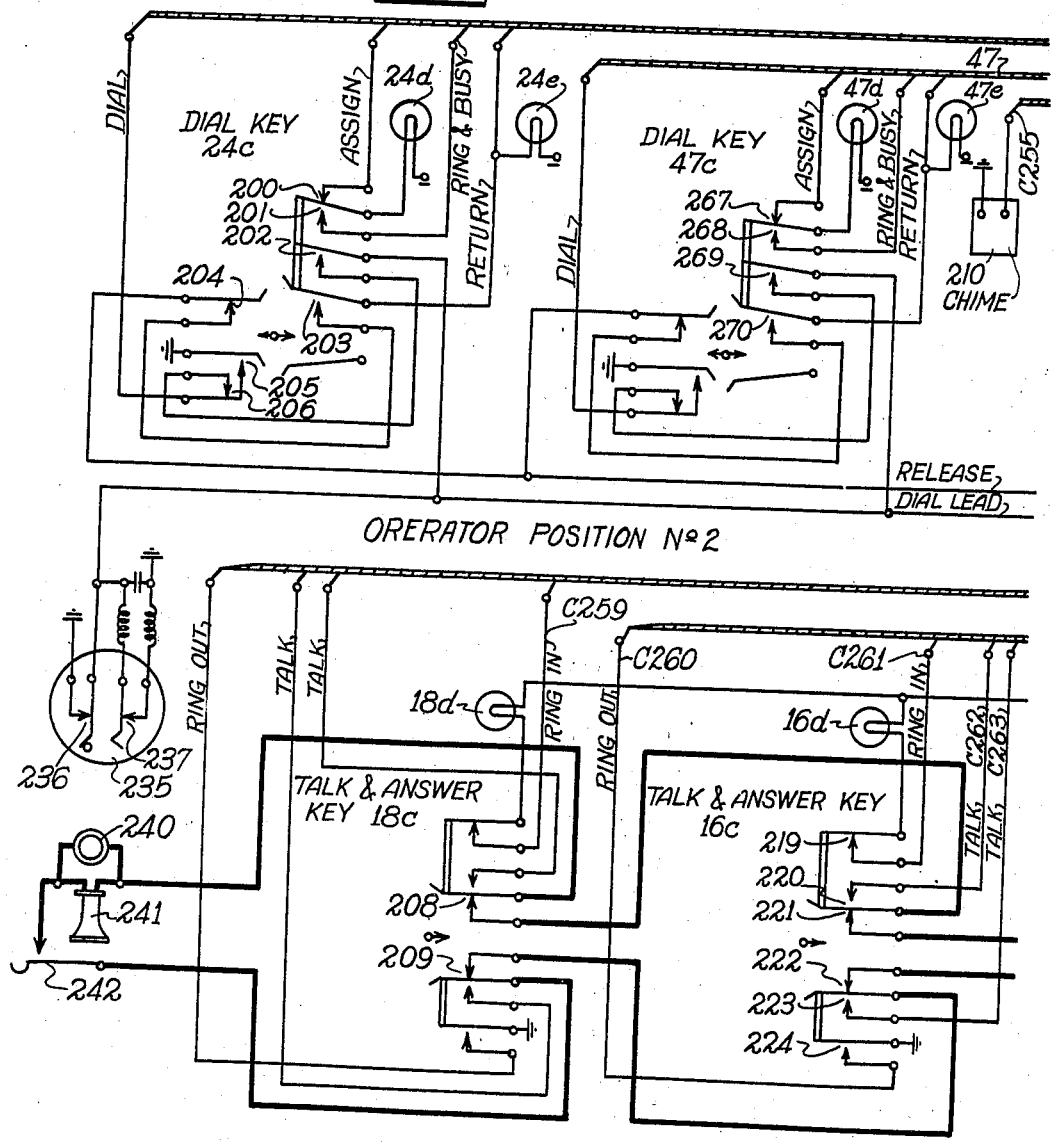
Figure 3:
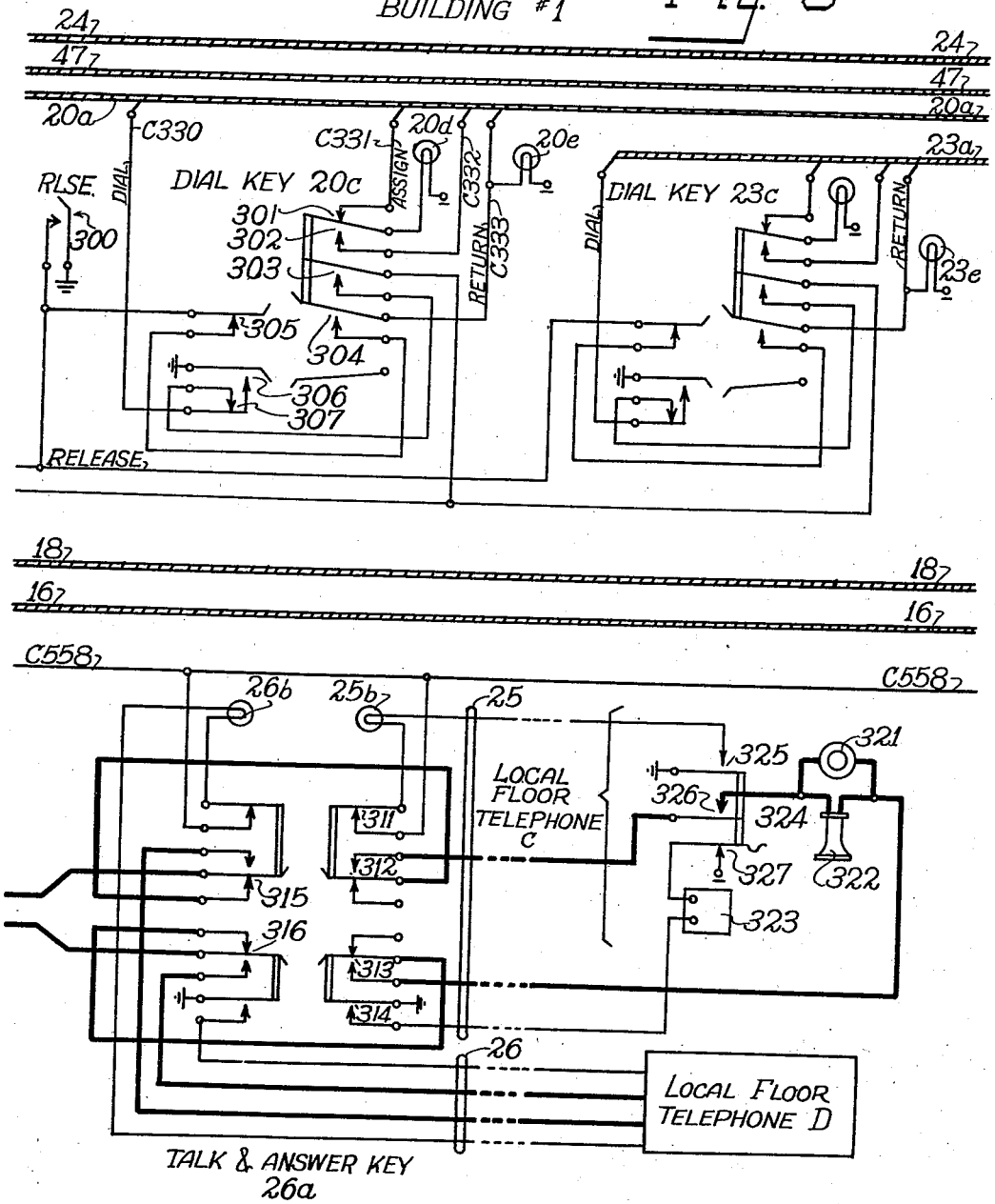
Figure 4:
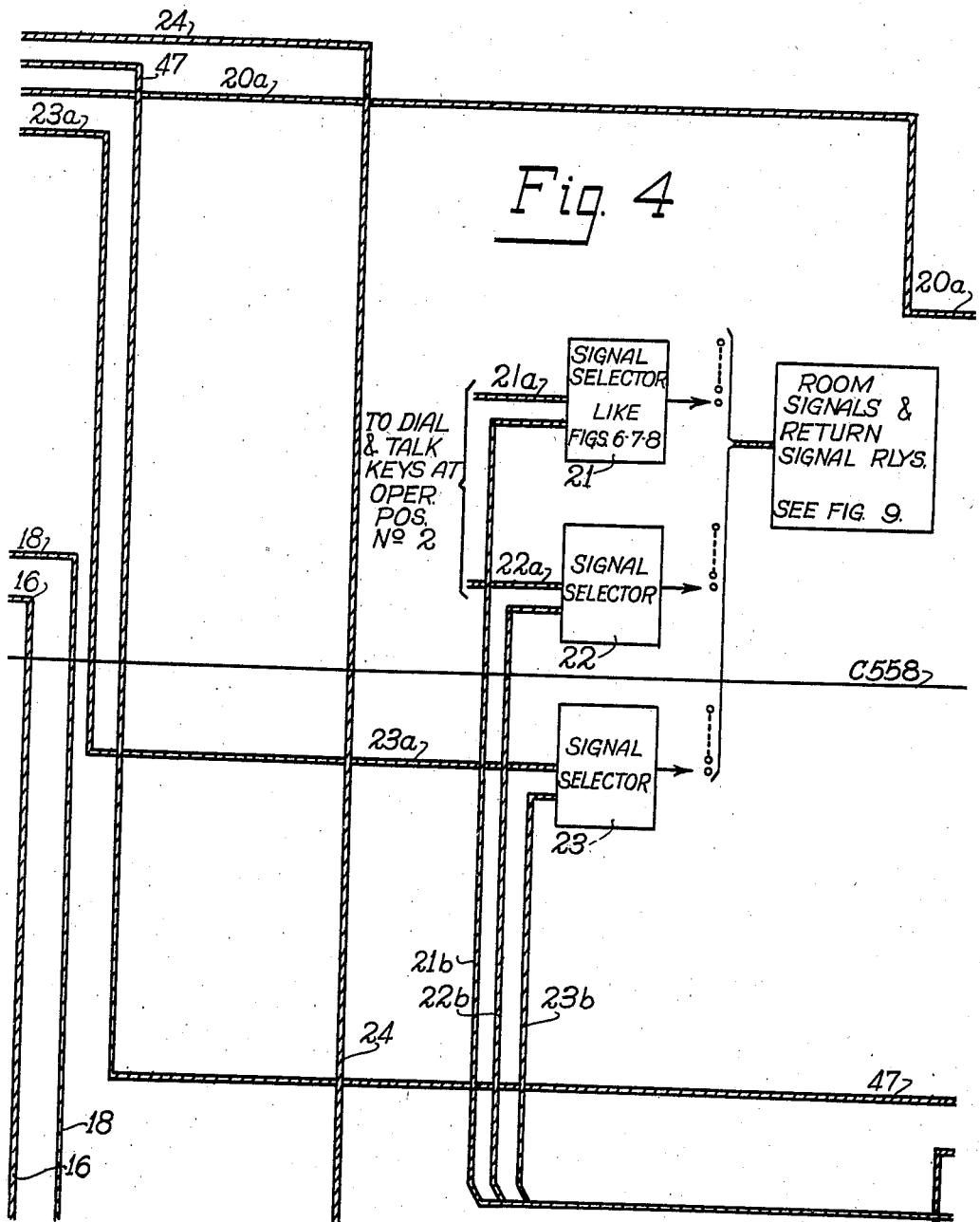

Referring now more particularly to the circuit arrangement of the apparatus incorporated in the system, and considering first the equipment provided at the operator position No. 2 in building No. 2, this equipment is illustrated in Figs. 2 and 3 of the drawings as comprising a telephone instrument, preferably of the well-known handset type, which includes a transmitter 240, a receiver 241 and a hook or cradle switch 242. The instrument also includes a calling device 235 of the well-known dial-operated type conventionally used in automatic telephone systems. This device is provided with a pair of pulsing springs 237 which are normally shunted by the engaged shunt springs 236 and a radio frequency suppressor circuit in the manner illustrated. Each time the dial of the device is moved off normal, however, the shunt springs 236 are opened to permit the transmission of impulses by the pulsing springs 237. For the purpose of operatively associating the calling device 235 with any one of the trunks extending to the operator position No. 2, dial keys 20c, 23c, 24c, 47c, etc., individual to these trunks are provided. Each trunk also has individually associated therewith at the operator position No. 2 a pair of supervisory lamps which are used in the production of supervisory signals that enable the attendant at this position properly to control the various selectors. More specifically, the trunks 20a, 23a, 24 and 47, have individually associated therewith assign lamps 20d, 23d, 24d and 47d, and return signal lamps 20e, 23e, 24e and 47e. Corresponding lamps are provided in association with each of the other two trunks 21a and 22a terminating at this operator position. For the purpose of operatively associating the telephone instrument provided at the operator position No. 2 with either of the two interposition trunks 16 and 18, or any one of the lines extending to a floor telephone in building No. 2, a plurality of talk and answer keys are provided. More specifically, this group of keys includes the keys 16c and 18c which are individual to the interposition trunks 16 and 18, and a third key 26a which terminates the conductors of the lines 25 and 26 respectively extending to the local floor telephones C and D. The talking conductors extending to the telephone instrument 240, 241 are carried through chain-connected contacts controlled by the talk and answer keys, and it will be understood that additional keys each terminating a pair of lines extending to two different local floor telephones, may be provided if required. The two interposition trunks 16 and 18 and the various lines extending to the local floor telephones also have individually associated therewith call lamps 16d, 18d, 25b, 26b, etc., which are connected to be energized in series with an incoming call signal relay R540 in response to the initiation of calls on the respective associated lines. This signal relay is arranged to control the energization of an audible signal device in the form of a chime 210 from a transformer 542 which is connected to a source of ringing current of commercial frequency. This chime is primarily utilized in the rendition of night service. The equipment provided at the operator position No. 2 also includes a release key 300 which is common to the various trunks through which the selectors in the three buildings may be seized, and is provided for the purpose of effecting an immediate release of any selector seized from the operator position No. 2. All of the keys provided at this operator position, with the exception of the release key 300, are of the well-known locking type such that when any one thereof is operated to a particular position, it remains in that position until manually actuated to another position. The release key 300, on the other hand, is of the well-known nonlocking or self-restoring type and must be manually restrained in its off-normal position to prevent the automatic restoration thereof.

The equipment provided at the two other operator positions is substantially similar to that provided at the operator position No. 1 and described above. Thus the equipment embodied in the switchboard provided at the operator position No. 1 includes a telephone instrument, preferably of the handset type, which comprises a transmitter 1740, a receiver 1741, a cradle switch 1742, and a manually operable thumb switch 1745 which is incorporated in the handset handle intermediate the transmitter 1740 and the receiver 1741. Preferably, the handset of this instrument is of the character disclosed and claimed in Patent No. 2,002,504, granted May 28, 1935, to George A. Graham and George O. Tapper. The telephone instrument further comprises a calling device 1735 of the well-known dial-operated type conventionally used in automatic telephone systems. A loud speaker 2050 is also provided at the operator position No. 1 which may be used in lieu of the telephone instrument 1740, 1741 in communication over connections set up through the signal and talk selectors 10 to 13, inclusive, to a selected one of the rooms of building No. 1. In order operatively to associate the calling device 1735 with any one of the six selector control trunks 10a, 11a, 12a, 13a, 14 and 15, terminating at the operator position No. 1, dial keys 14c and 15c, individual to the trunks 14 and 15, respectively, are provided and dial and talk keys 10c, 11c, 12c and 13c, only the first and last of which are shown, are provided in association with the trunks 10a, 11a, 12a and 13a. The interposition trunks 16 and 17 terminate at the switchboard in the contacts of the talk and answer keys 16c and 17c, respectively. Similarly, the lines extending to the local floor telephones terminate at the contacts of talk and answer keys, a single key 8a being illustrated as terminating the lines respectively extending to the local floor telephones A and B. Each of the indicated keys has associated therewith one or two supervisory lamps. More specifically, the dial and talk keys 10c to 15c, inclusive, are arranged to control the associated assign lamps 10d to 15d, respectively, and associated return signal lamps 10e to 15e, respectively. Only incoming call lamps are provided in association with the talk and answer keys which terminate the interposition trunks and the lines extending to the local floor telephones. Thus the lamps 8b, 16d and 17d are illustrated as being individual to the local floor telephone line 8 and the interposition trunks 16 and 17, respectively. These incoming call lamps are each arranged to be energized in series with a signal relay R1240 which is provided to control the operating circuit for a chime 1810 located at the operator position No. 1. This chime, which is primarily utilized during the night when light traffic conditions prevail, functions audibly to supplement the visual signals produced by the incoming call lamps and is arranged to be energized from an alternating current source of commercial frequency through a voltage step-down transformer 1242. The equipment provided at the operator position No. 1 also includes a speaker key 1850 which is utilized for the purpose of controlling certain of the switching relays incorporated in the control network 19 in order reversely to connect the amplifier 40 in a communication connection routed through one of the four signal and talk selectors 10 to 13, inclusive. This key has associated therewith a supervisory lamp 1853, which functions to provide a visual indication of the manner in which the amplifier 40 is included in a communication connection set up through one of the four signal and talk selectors. The equipment located at the operator position No. 1 also includes a common release key 1800 which may be operated to effect the immediate release of any one of the twelve selectors held from this operator position. All of the indicated keys provided at this position, with the exception of the release key 1800, are also of the well-known locking type, the excepted key being of the conventional nonlocking type.

The arrangement of the equipment provided at each of the local floor telephones is identical and is simple in the extreme. More specifically, the equipment provided at the local floor telephone A comprises a self-contained telephone instrument which includes a transmitter 1840, a receiver 1841, a hook or cradle switch 1842 and a bell or buzzer 1843. Similarly, the instrument provided at the local floor telephone C comprises a transmitter 321, a receiver 322, a hook or cradle switch 324 and an incoming call signal in the form of a buzzer or bell 323. Preferably, each of these instruments is of the well-known handset type. All of the telephone instruments utilized in the system are of the well-known sound powered type, such that no external source of current is required for the production of signal currents of sufficient magnitude for clear reproduction.

Figure 6:
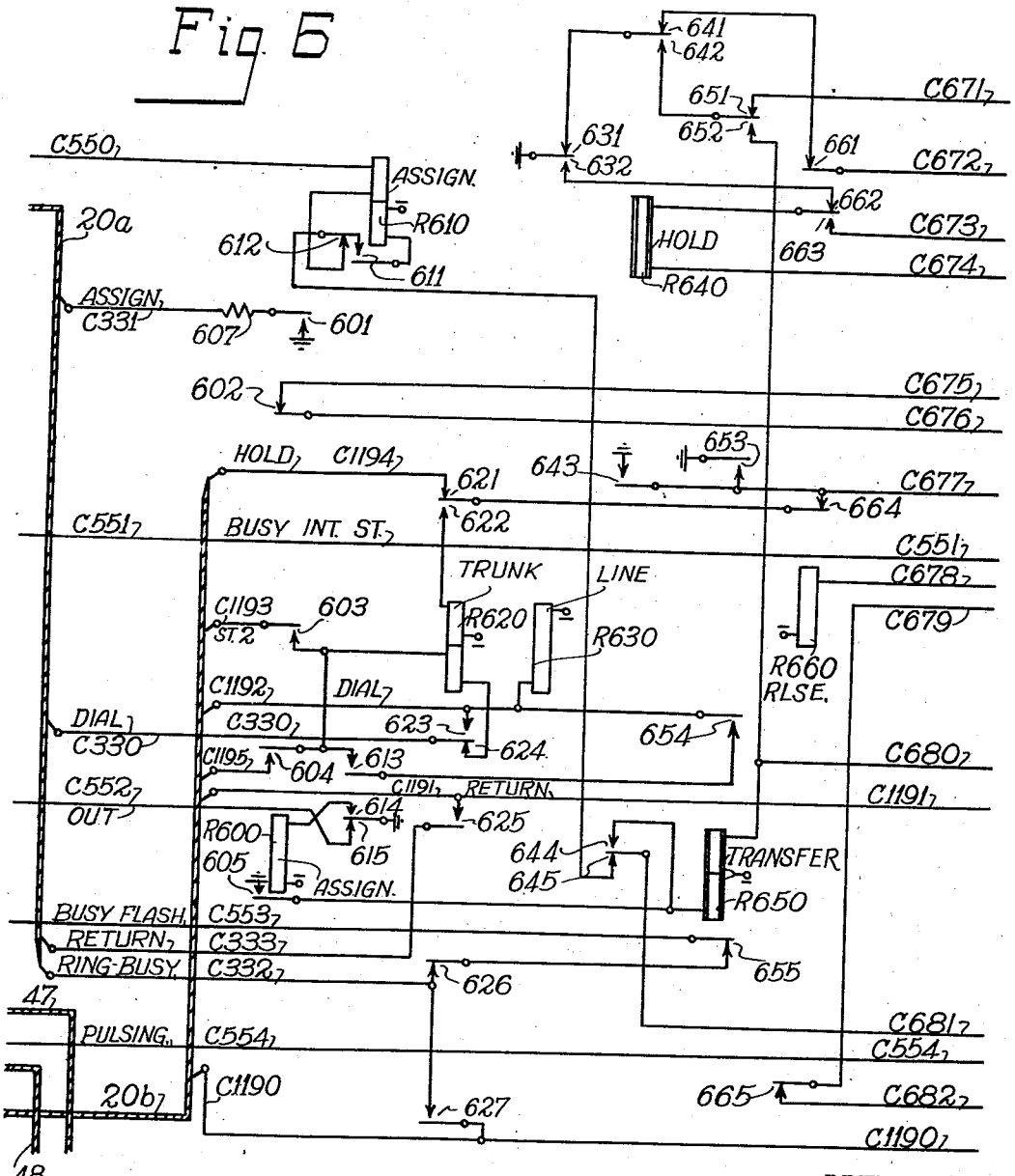
Figure 7:
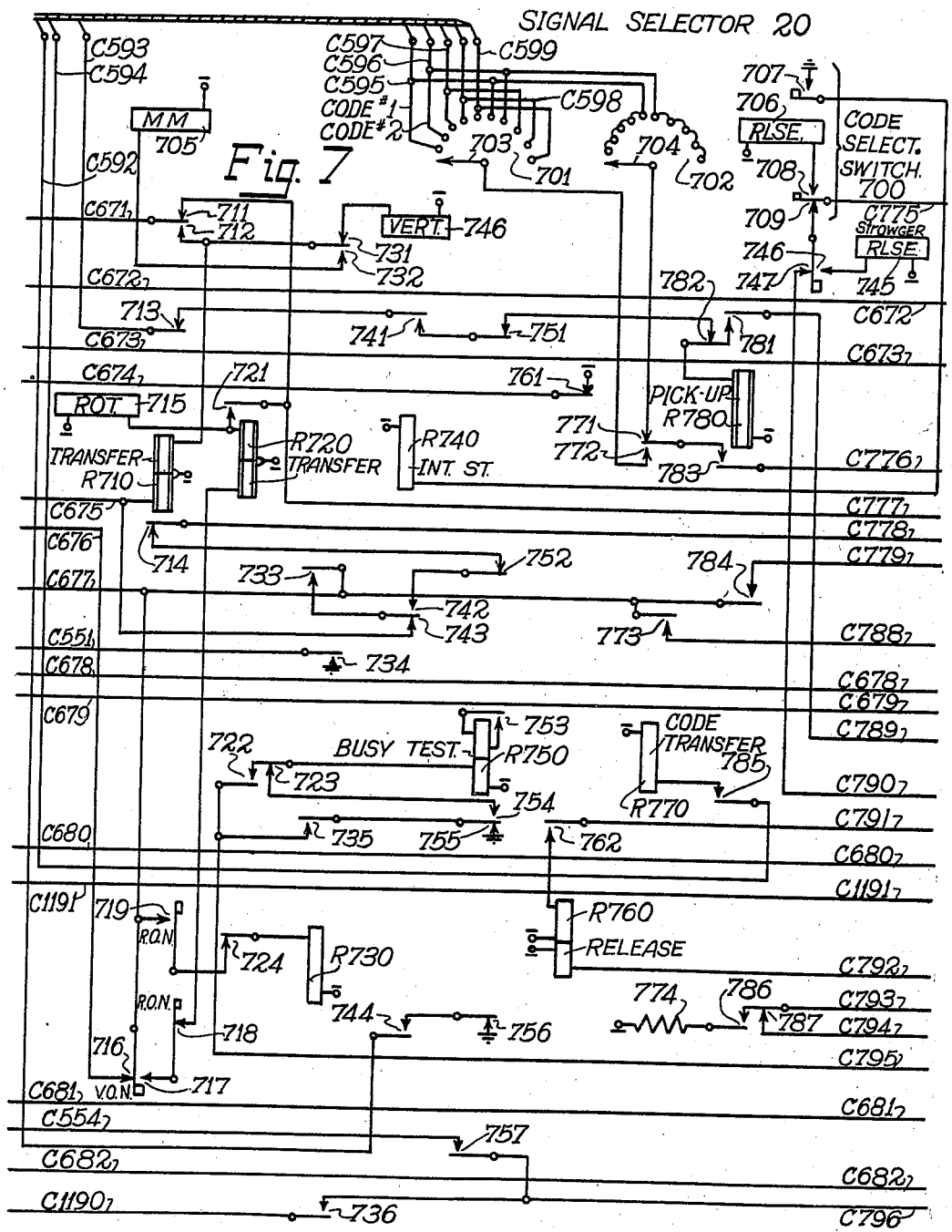
Figure 8:
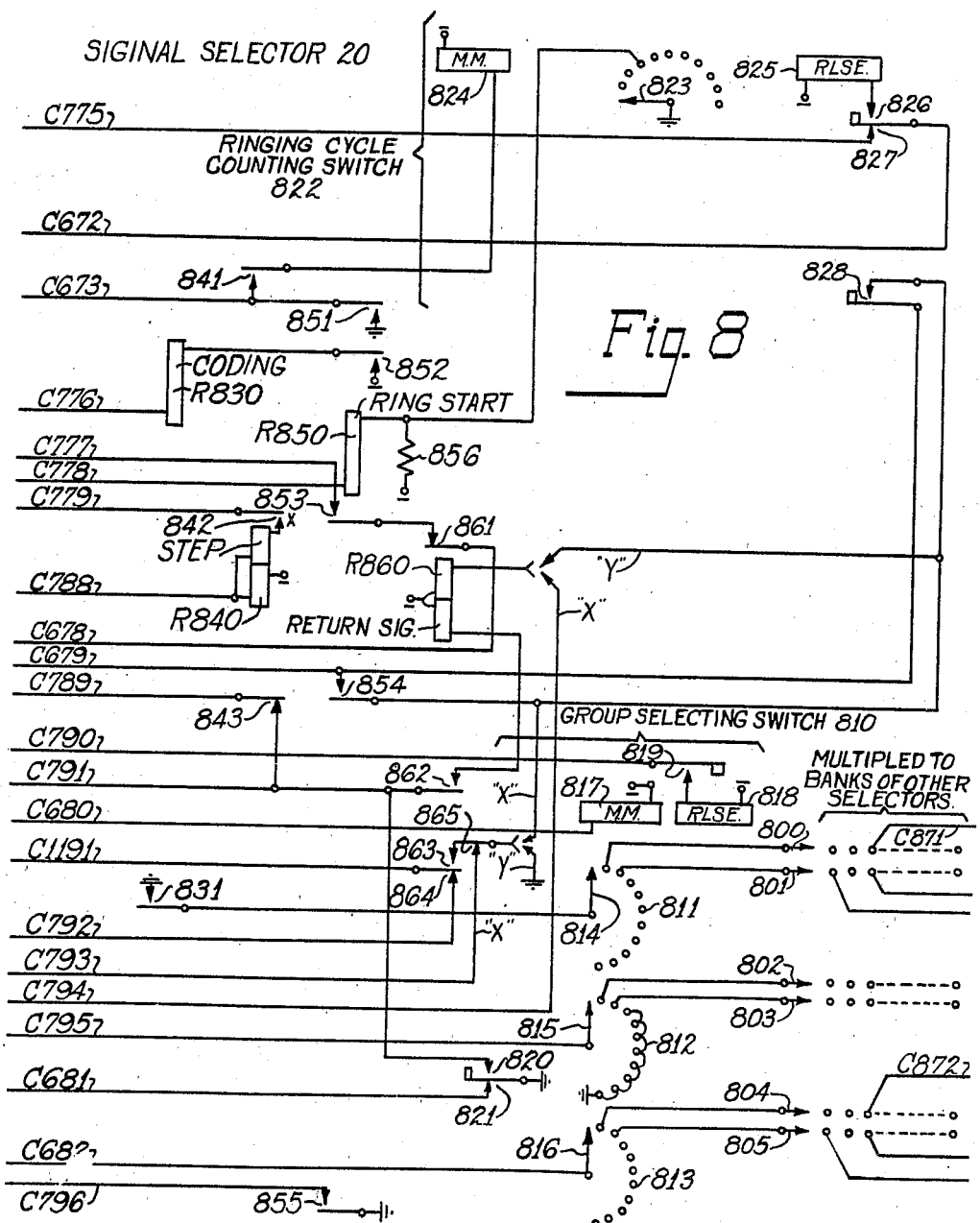

Referring now in greater detail to the automatic switching equipment provided in the various buildings, and considering first the equipment located in building No. 2, it is indicated above that this equipment comprises the four signal selectors 20, 21, 22 and 23 having associated therewith a common allotter No. 2. The four signal selectors are identical in arrangement and, accordingly, only the details of the selector 20 have been illustrated. Briefly described, this selector comprises a two-motion switching mechanism of the well-known Strowger type, a group selecting switch 810, a ringing cycle counting switch 822, a code selecting switch 700, and a group of control relays which are illustrated in Figs. 6, 7 and 8 of the drawings and are functionally identified by the legends appended thereto. The Strowger switching mechanism is equipped with six banks of contacts each including 100 contact points, and the contacts making up this field are divided into ten levels of ten contact sets each. Each of the six banks has associated therewith one of the six wipers 800, 801, 802, 803, 804 and 805, and these wipers are commonly carried by an associated wiper carriage structure of well-known construction and arrangement. For the purpose of elevating the enumerated wipers to a position opposite a desired level of bank contacts, and then rotating the same into engagement with a selected set of contacts in the selected level, vertical and rotary magnets 746 and 715 are included in the switching mechanism. This mechanism further comprises a release magnet 745 which, when energized, permits the wiper carriage structure to be returned to rotary and vertical normal; two sets of vertical off-normal springs 708, 709, and 716, 717 which are operated when the wiper carriage structure is moved to any vertical off-normal position; and two sets of rotary off-normal springs 718 and 719 which are operated when the wiper carriage structure is rotated away from the rotary normal position thereof. The code selecting switch 700, the ringing cycle counting switch 822, and the group selecting switch 810 are all of the well-known minor type but comprise different contact bank and wiper arrangements in order to perform the functions variously assigned thereto. Thus the counting switch 822 comprises a single set of contacts having associated therewith a wiper 823, an operating magnet 824 for driving the wiper 823 over the contacts of the associated contact set, a release magnet 825 which, when energized, permits the wiper 823 to be returned to normal, and off-normal springs 826, 827 and 828. The code selecting switch 700, on the other hand, comprises two sets of contacts 701 and 702, wipers 703 and 704 individual to these contact sets, an operating magnet 705, a release magnet 706, and off-normal springs 707, 708 and 709. Finally, the group selecting switch 810 comprises three sets of contacts 811, 812 and 813, wipers 814, 815 and 816 individual to these contact sets, an operating magnet 817, a release magnet 818, and off-normal springs 819, 820 and 821.

Briefly considered, the relay equipment incorporated in the signal selector 20 comprises a pair of assign relays R600 and R610, a trunk relay R620, a line relay R630, a hold relay R640, three digit transfer relays R650, R710 and R720, a pair of release relays R660 and R760, a control relay R730, an interrupter start relay R740, a busy test relay R750, a code transfer relay R770, a code pickup relay R780, a coding relay R830, a counting switch stepping relay R840, a ring start relay R850, and a return signal relay R860. As indicated by the mode of illustration thereof, the relays R640, R650, R710, R720 and R760 are of the well-known slow-acting type. The relay R840 is of the double wound two-step type. The remaining relays are of the single or double wound fast-acting type.

The allotter equipment associated with the four selectors 20, 21, 22 and 23 serves the dual purpose of preselecting idle ones of the selectors for use one at a time, and of rendering these selectors accessible to the trunks 14 and 34 which respectively extend to the operator position No. 1 and the operator position No. 3. More specifically, this equipment includes a start relay R500 which is arranged to control the R610 assign relays of each of the four selectors in accordance with the idle or busy condition thereof, an all-busy relay R1100, and two groups of connect relays which are individual to the trunks 14 and 34, respectively. More specifically, the four connect relays R1110, R1120, R1130 and R1140 are individual to the four selectors 20, 21, 22 and 23, respectively, and are provided for the purpose of selectively connecting these selectors to the trunk 14 extending to the operator position No. 1. The connect relays R1150, R1160, R1170 and R1180 of the second group are also individual to the selectors 20, 21, 22 and 23 and are provided for the purpose of selectively connecting these selectors to the trunk 34 which extends to the operator position No. 3. The equipment common to the four selectors also includes a pair of pulse generating relays R510 and R520 which function to produce ground pulses that are utilized in controlling the various supervisory lamps, and a start relay R530 which functions to initiate the operation of the two pulsing relays when a selected room signal is tested and found busy.

As indicated by the above brief description of the signal selector 20, provisions are made in the system for controlling any one of the room signals selected through any one of the four selectors 20 to 23, inclusive, in accordance with any one of several different codes. These codes are produced by a code interrupter 570 which is common to the four selectors and is schematically illustrated in Fig. 5 of the drawings as comprising five code producing cams 573, 574, 575, 576 and 577, a pickup cam 571 and a reversing cam 572. These cams are mounted for rotation with a common drive shaft 579 which is driven through a gearbox 581 by a constant speed motor 580. The enumerated pulsing cams are arranged to control the contact springs 582, 583, 584, 585, 586, 587 and 588, respectively, to transmit ground pulses over the associated pulsing leads when the start relay R590 of the interrupter is operated.

Figure 9:
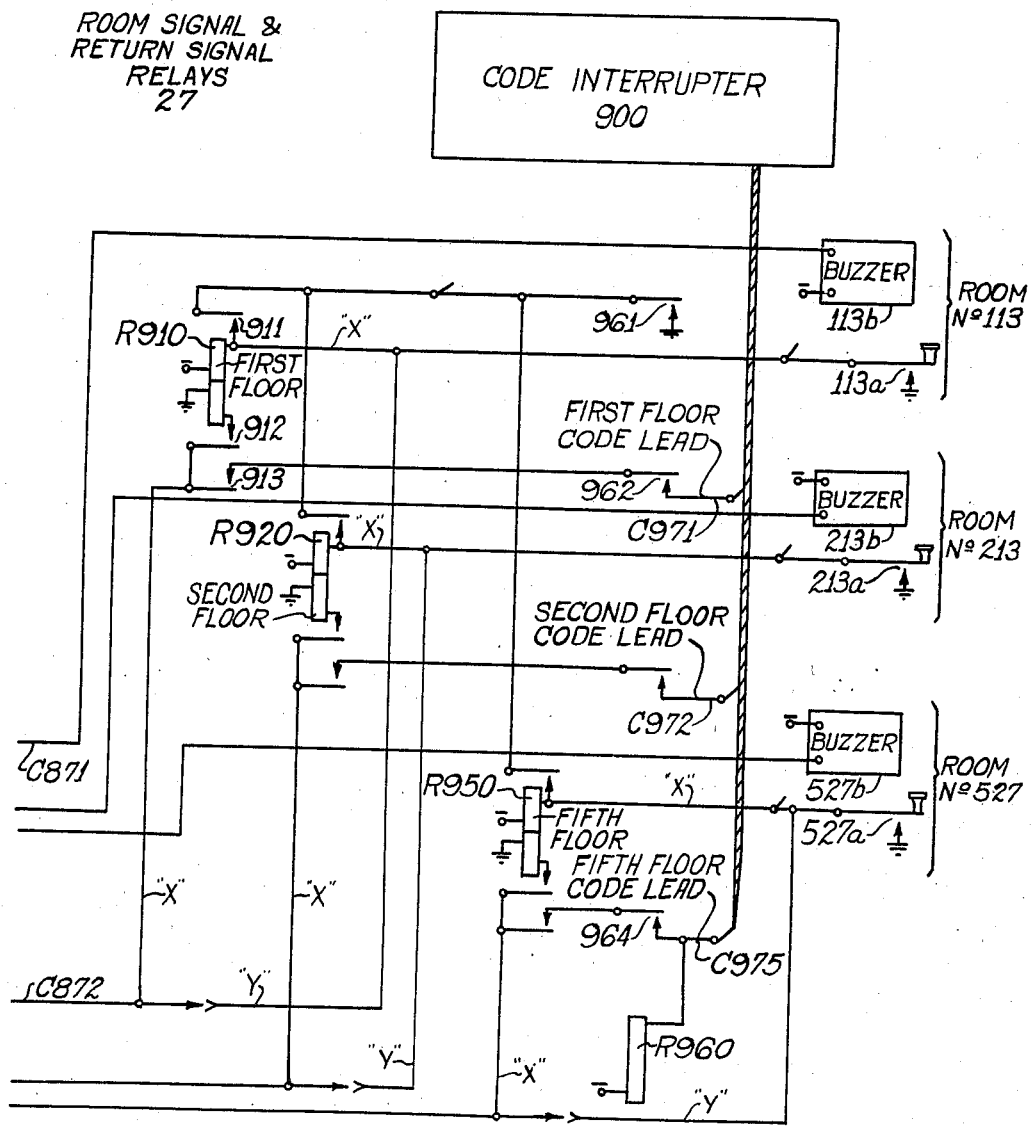

Referring now more particularly to Fig. 9 of the drawings, a portion of the room signals and the return signaling equipment which may be used in the system is there illustrated. More specifically, the rooms #113, #213 and #527 of building No. 1 are shown as being equipped with room signals in the form of buzzers 113b, 213b and 527b, and return signal keys 113a, 213a and 527a, respectively. These keys, and the corresponding keys provided in the other rooms of the building, may be arranged directly to control the return signal circuits of the selectors through which the associated room signals are controlled. Alternatively, code transmission equipment controlled by these keys may be provided for transmitting to any calling one of the three operator positions an indication of the floor location of a room in which a call is answered or acknowledged. To this end, a code interrupter 900, which may be substantially similar in construction and arrangement with the interrupter 570, a connect relay R960, and floor relays R910, R920, R950, etc., individual to the various floors of the building, are provided. Each of the floor relays is arranged to be controlled by any one of the return signal keys on the associated floor. For example, the first floor relay R910 may be controlled from any one of the keys individual to the rooms of the first floor. The manner in which these relays are controlled is explained with particularity in a following portion of the specification.

The arrangement of the automatic switching equipment, the room signals and the return signaling equipment provided in building No. 3 is in all respects identical with that provided in building No. 2 and described above. The arrangement of the automatic switching equipment and the individual room equipment as provided in building No. 1, on the other hand, is considerably different in certain respects, since provisions are made in this equipment for providing intercommunicating facilities between the operator position No. 1 and at least a portion of the rooms in building No. 1. This building is also equipped with a program distribution system over which radio or other programs may be transmitted to loud speakers located in the various rooms. Provisions are made in this building for utilizing, so far as possible, the facilities of the program distribution system in providing the intercommunicating facilities. In this regard, it will be noted by reference to Fig. 16 of the drawings that the two rooms #364 and #471 of building No. 1 are equipped with loud speakers 364c and 471c, respectively, which may be connected to a common program distribution trunk 1655 through operation of the keys 364d and 471d, respectively. These keys are of the locking type. This distribution trunk extends to the loud speakers in each of the other rooms of the building, and is connected through the contacts of a switching relay R1620 to the output terminals of a program circuit schematically indicated at 1650. This circuit may include facilities for connecting the trunk 1655 to the output terminals of a radio receiver, a phonograph, or a public address system, as desired. Each of the rooms of building No. 1 is also equipped with a call signal, a return signal key and a switching relay. Thus room #364 is provided with a call signal 364b, a return signal key 364a of the non-locking type, and a switching relay R1610. Similarly, room #471 is provided with a call signal 471b, a return signal key 471a, and a switching relay R1600. The various room signals 364b, 471b, etc., are preferably of the tuned reed type, such that they individually respond only to ringing current of a particular frequency. Thus the selective signaling facilities of the portion of the system serving building No. 1 may be substantially increased by connecting in multiple two or more of the room signals which are tuned to respond to different ringing frequencies and are provided in different rooms, and providing multiple connections between the room relays and the talking leads extending to the corresponding rooms.

Figure 13:
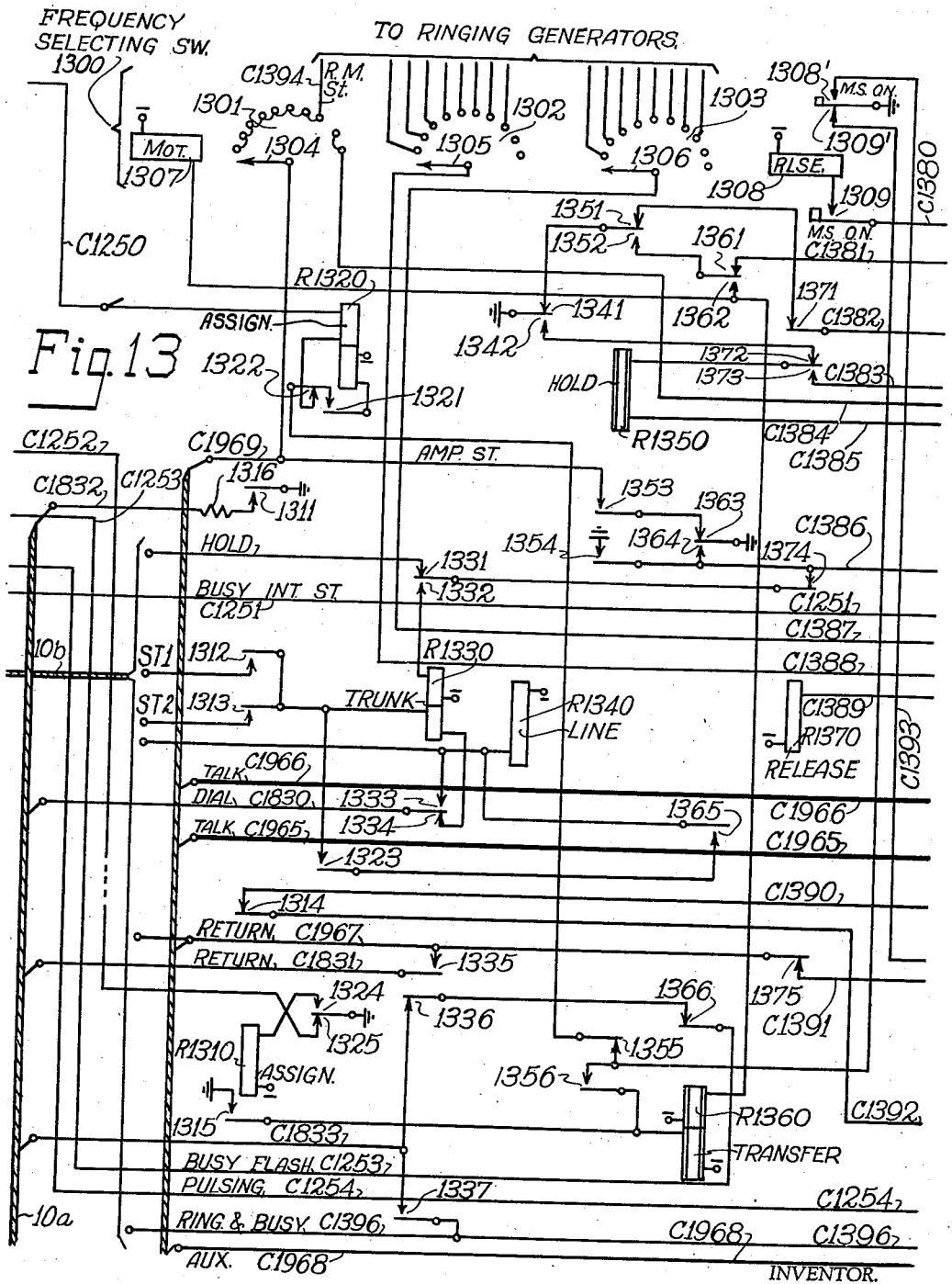
Figure 14:
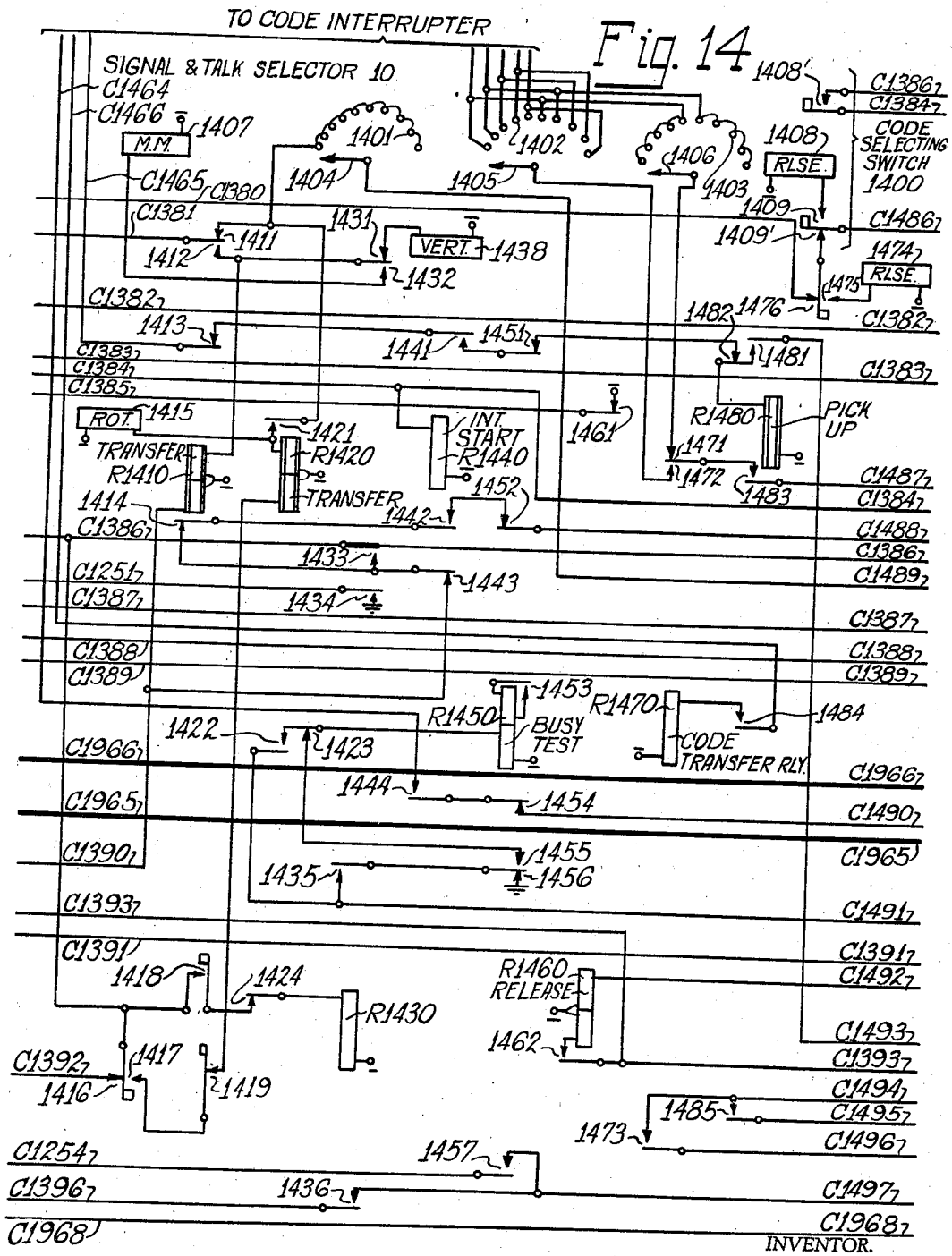
Figure 15:
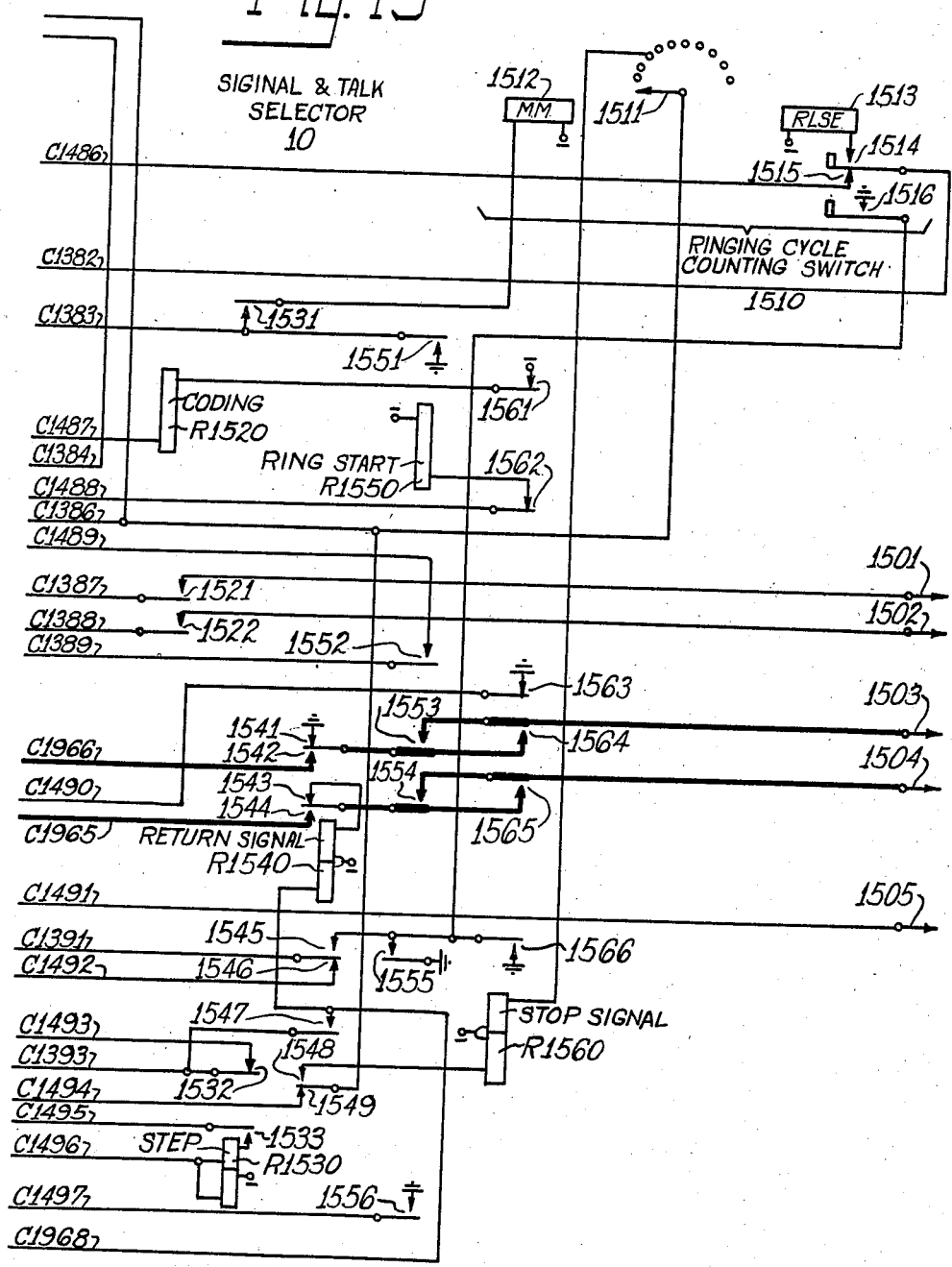
Figure 16:
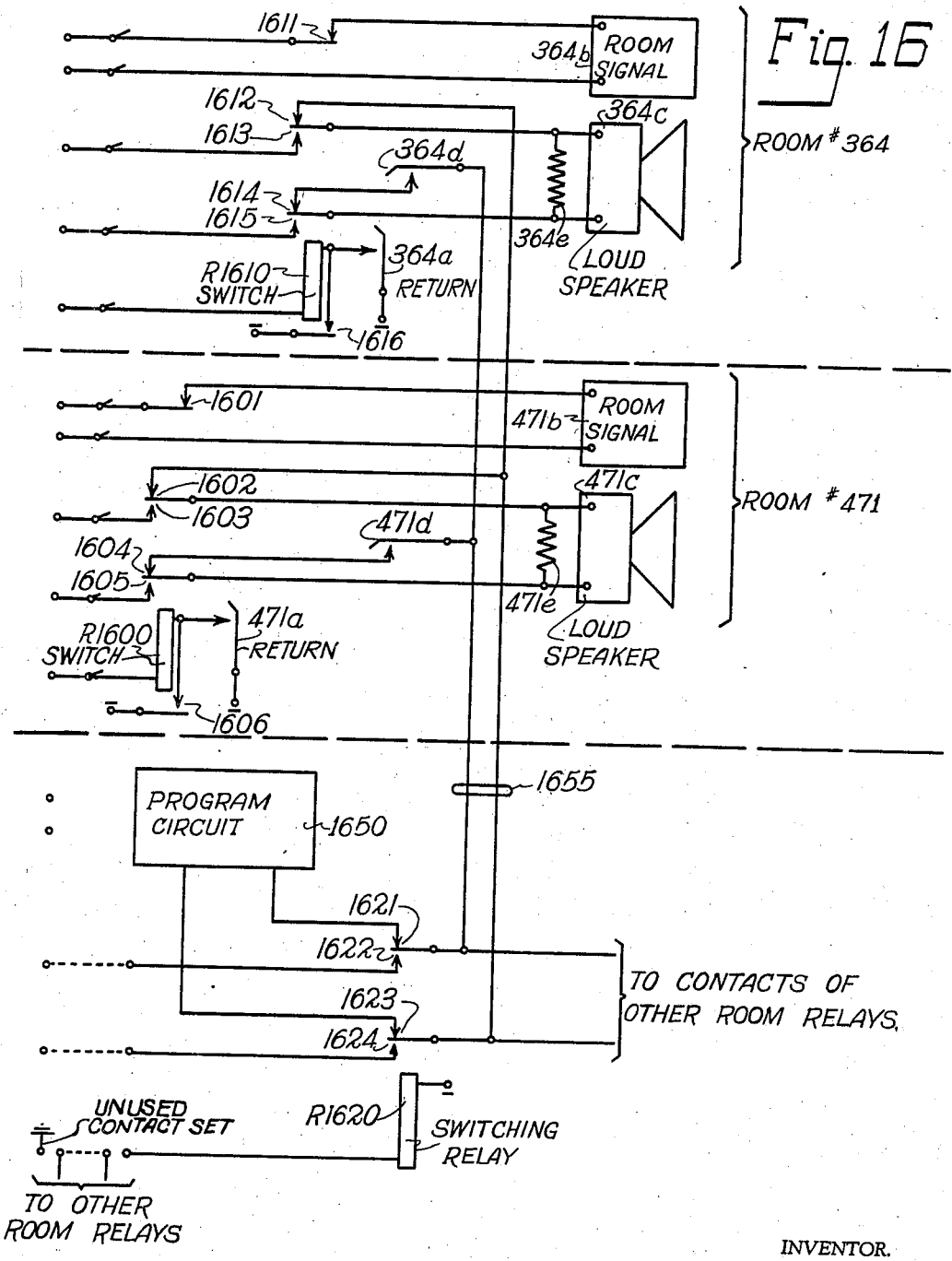
Figure 17:
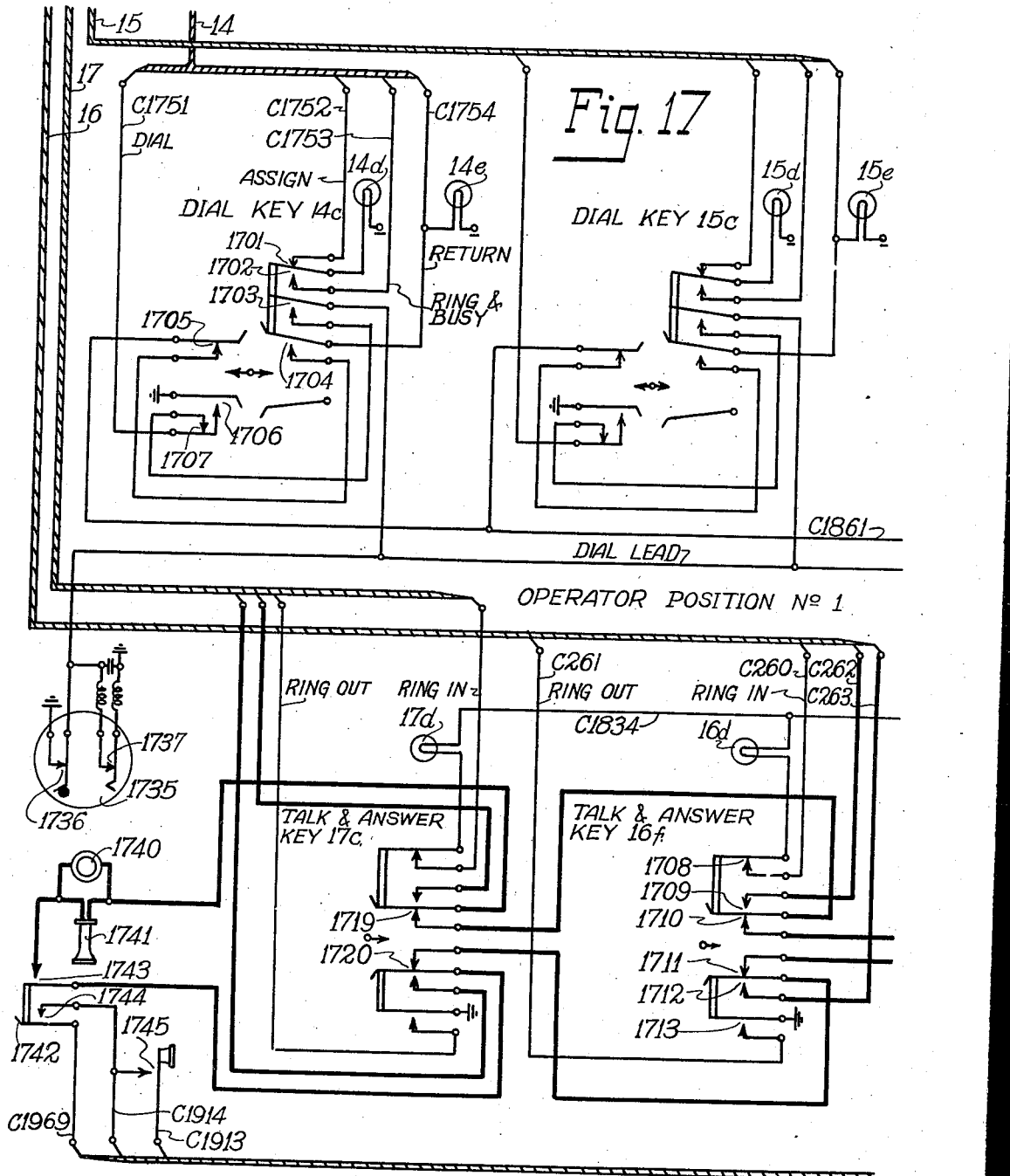

As indicated in the preceding explanation, the automatic switching equipment provided in building No. 1 comprises four signal and talk selectors 10 to 13, inclusive, having associated therewith a common allotter No. 1. These four signal and talk selectors are identical in arrangement and, accordingly, only the details of the selector 10 have beeng illustrated in the drawings. Briefly described, this selector comprises a two-motion switching mechanism of the well-known Strowger type, a frequency selecting switch 1300, a code selecting switch 1400, a ringing cycle counting switch 1510, and a group of control relays which are illustrated in Figs. 13, 14 and 15 of the drawings and are functionally identified by the legends appended thereto. The Strowger switching mechanism is equipped with five banks of contacts each including 100 contact points, and the contacts making up this field are divided into ten levels of ten contact sets each. Each of the five banks has associated therewith one of the five wipers 1501, 1502, 1503, 1504 and 1505, and these wipers are commonly carried by an associated wiper carriage structure of well-known construction and arrangement. For the purpose of elevating the enumerated wipers to a position opposite a desired level of bank contacts, and then rotating the same into engagement with a selected set of contacts in the selected level, vertical and rotary magnets 1438 and 1415 are included in the switching mechanism. The mechanism further comprises a release magnet 1474 which, when energized, permits the wiper carriage structure to be returned to rotary and vertical normal; two sets of vertical off-normal springs 1475, 1476 and 1416, 1417 which are operated when the wiper carriage structure is moved to any vertical off-normal position; and two sets of rotary off-normal springs 1418 and 1419 which are operated when the wiper carriage structure is rotated away from the rotary normal position thereof. The frequency selecting switch 1300, the code selecting switch 1400 and the counting switch 1510 are of the well-known minor type but comprise different contact bank and wiper arrangements in order to perform the functions variously assigned thereto. Thus the counting switch 1510 comprises a single set of contacts having associated therewith a wiper 1511, an operating magnet 1512 for driving the wiper 1511 over the contacts of the associated contact set, a release magnet 1513 which, when energized, permits the wiper 1511 to be returned to normal, and off-normal springs 1514, 1515 and 1516. The code selecting switch 1400, on the other hand, comprises three sets of contacts 1401, 1402 and 1403, wipers 1404, 1405 and 1406 individual to these contact sets, an operating magnet 1407, a release magnet 1408, and off-normal springs 1408', 1409 and 1409'. Similarly, the frequency selecting switch 1300 comprises three sets of contacts 1301, 1302 and 1303, wipers 1304, 1305 and 1306 individual to the three contact sets, an operating magnet 1307, a release magnet 1308, and off-normal springs 1308', 1309 and 1309'.

Briefly considered, the relay equipment incorporated in the signal and talk selector 10 comprises a pair of assign relays R1310 and R1320, a trunk relay R1330, a line relay R1340, a hold relay R1350, three digit transfer relays R1360, R1410 and R1420, a pair of release relays R1370 and R1460, a control relay R1430, an interrupter start relay R1440, a busy test relay R1450, a code transfer relay R1470, a code pickup relay R1480, a coding relay R1520, a counting switch stepping relay R1530, a ring start relay R1550, a return signal relay R1540 and a stop signal relay R1560. As indicated by the mode of illustration thereof, the relays R1350, R1360, R1410, R1420 and R1480 are of the well-known slow-acting type. The relay R1530 is of the well-known double wound two-step type. The remaining relays are of the single or double-wound fast-acting type.

The allotter equipment associated with the four signal and talk selectors 10 to 13, inclusive, is in all respects identical with that provided in building No. 2. Accordingly, the eight connect relays and the all busy-relay as incorporated in the allotter No. 1 have been only schematically illustrated in Fig. 12 of the drawings. This equipment also includes the illustrated start relay R1200 which is controlled in accordance with the idle or busy condition of the four associated selectors and functions selectively to control the R1320 assign relays of these four selectors. The equipment common to the four selectors also includes two pulse generating relays R1210 and R1220 which are utilized in the production of supervisory ground pulses, and a busy start relay R1230 which is controlled over the common busy flash lead C1253 to initiate the operation of the two pulsing relays when a busy room signal is selected through operation of any one of the four selectors.

As indicated above, for the purpose of selectively associating the amplifier 40 with any one of the four signal and talk selectors 10 to 13, inclusive, and the additional purpose of reversely connecting this amplifier in a connection set up through one of the four signal and talk selectors, the amplifier control network 19 is provided. This network comprises four sets of connect relays which are individual to the four different selectors. Thus the two relays R1940 and R1950 are provided for the purpose of operatively including the amplifier 40 in a connection set up through the signal and talk selector 10. Similarly, the two relays R2030 and R2040 are jointly controllable by the dial and talk key 13c and the fourth signal and talk selector 13, to include the amplifier 40 in a connection set up through this selector. The two relays R1960 and R2000 serve the same function with respect to the second signal and talk selector 11. Finally, the two relays R2010 and R2020 are provided for including the amplifier 40 in a connection set up through the third signal and talk selector 12. The amplifier control network 19 further includes a transfer relay R1930 which is controllable by the hook or cradle switch 1742 selectively to connect the loud speaker 2050 and the telephone instrument 1740, 1741 for use in communicating over a connection set up through one of the signal and talk selectors to one of the rooms. Three additional switching relays R1900, R1910 and R1920, controllable by either the speaker key 1850 or the thumb switch 1745, are provided in the control network 19 for the purpose of reversely including the amplifier 40 in a communication connection through one of the signal and talk selectors in order to reverse the direction in which signal currents may be transmitted over the connection.

Current for energizing the control relays, the supervisory lamps, the operating magnets of the minor switches, and the operating magnets of the Strowger switching mechanisms, may be supplied from a direct current source which is common to the three buildings. In such case the positive terminal of the current source is connected to a common bus conductor which is carried to the required points in each of the three buildings and is connected to ground. The negative terminal of the source is connected to a common negative bus conductor which extends to the required points in each of the three buildings and terminates the various relay, magnet and lamp terminals identified in the drawings by the negative polarity sign. For convenience in describing the circuits involved, this source of current, which may conventionally comprise a storage battery floated across the terminals of a charging rectifier, has not been shown.

In building No. 2 and building No. 3, the various room signals are energized by direct current derived from the system battery. In building No. 1, on the other hand, alternating ringing currents of different frequencies are utilized in selectively energizing the various room signals. To this end a bank of ringing current generators is provided, the individual generators of which have different output frequencies. Preferably, these generators are of the well-known pole changer type which are commonly used in small, unattended automatic telephone exchanges for the purpose of producing alternating ringing current. More specifically, each of these generators may be connected and arranged in the manner disclosed in Fig. 3 of Patent No. 1,750,934, granted March 18, 1930, to Clarence E. Lomax.

INTERPOSITION CALLS

In referring to the operation of the system, the manner in which communication connections are set up between different operator positions will first be considered. In this regard, it may be assumed that the attendant at the operator position No. 2 desires a connection with the attendant at the operator position No. 1. In order to signal the last-named attendant, the attendant at the operator position No. 2 actuates the talk and answer key 16c to its call position. Incident to this key operation the contacts 219 are disengaged to open a point in the operating circuit for the call lamp 16d provided at the operator position No. 2. At the contacts 220 and 223, a connection is prepared between the telephone instrument at the operator position No. 2 and the telephone instrument at the operator position No. 1. At the contacts 224, a circuit is completed for energizing the call lamp 16e individual to the interposition trunk 16, this circuit extending from ground by way of the contacts 224, C260, the contacts 1708, the filament of the lamp 16e, C1834, and the winding of R1240 to battery. When thus energized, the lamp 16e is illuminated to signal the attendant at the operator position No. 1 that an incoming call on the interposition trunk 16 should be answered. This visual signal is supplemented by the operation of the chime 1810 provided at the operator position No. 1. More specifically, the relay R1240 operates when energized in the above-traced circuit, and closes its contacts 1241 to complete a circuit including the conductor C1835 for energizing the chime 1810 from the transformer 1242. This chime is so constructed as to produce a short audible signal when its operating circuit is completed. It will be understood, therefore, that if the attendant at the operator position No. 2 repeatedly actuates the talk and answer key 16c between its two positions, the relay R1240 follows the key operations to transmit successive pulses of energizing current to the chime 1810. Thus a succession of chime signals are produced at the operator position No. 1. When the signals just described are produced at the operator position No. 1, the attendant at this position may answer the call by actuating the talk and answer key 16f at this position to its off-normal position, wherein the contacts 1708, 1710 and 1711 are disengaged and the contacts 1709, 1712 and 1713 are moved into engagement. At the contacts 1708, the above-traced circuit for energizing the signal lamp 16e, in series with the signal relay R1240, is interrupted. At the contacts 1713, a circuit is prepared for energizing the signal lamp 16d provided at the operator position No. 2.

After the key operations just described are performed the desired communication connection between the two operator positions is completed when the hand telephones respectively provided at these positions are removed from their respective supporting hooks or cradles. Thus when the telephone instrument comprising the transmitter 240 and the receiver 241 is lifted from its supporting element, the hook or cradle switch 242 is operated to close the contacts controlled thereby. In a similar manner when the telephone instrument comprising the transmitter 1740 and the receiver 1741 is removed from its supporting element, the hook or cradle switch 1742 is operated to a position wherein the contacts 1743 and 1744 are respectively engaged. At this time the desired communication connection between the two operator positions is fully completed, one side of this connection including the contacts 1719 and 1709, C262 and the contacts 220 and 208, and the other side of the connection including the springs of the hook or cradle switch 242, the contacts 209 and 223, C263, the contacts 1712 and 1720 and the hook or cradle switch springs 1743. In this regard, it is pointed out above that the two transmitters 240 and 1740 are of the well-known sound powered type, whereby no battery or other source of voltage is required for the production of voice currents thereby. It will be understood from the above explanation that when the connection between the two operator positions 1 and 2 is no longer desired, it may be released by restoring the talk and answer keys 16c and 16f to normal, and replacing the telephone instruments respectively provided at the two positions upon their respective associated supporting hooks or cradles. In this regard, it is pointed out that a signal is produced at the one of the two operator positions where the connection is last released. Thus if the talk and answer key 16c at the operator position No. 2 is restored to normal before the connection is cleared out at the operator position No. 1, the above-traced circuit for energizing the signal lamp 16e at the operator position No. 1 in series with the signal relay R1240 is recompleted. Thus, the attendant at the No. 2 position receives visual and audible signals which serve as a reminder that the connection should be released. In a similar manner, if the talk and answer key 16f provided at the operator position No. 1 is restored to normal before the connection is released at the operator position No. 2, a circuit, traced below, is completed for energizing the signal relay R540 in series with the signal lamp 16d provided at the No. 2 position. Thus the attendant at the latter position is reminded that the connection should be released.

In the event the attendant at the operator position No. 1 desires to converse with the attendant at the No. 2 position, the call is initiated in a manner substantially similar to that described above. In this case when the talk and answer key 16f provided at the No. 1 position is operated to its off-normal position, a circuit is completed for energizing the signal lamp 16d provided at the operator position No. 2, this circuit extending from ground by way of the contacts 1713, C261, the contacts 219, the filament of the lamp 16d, C558, and the winding of the signal relay R540 to battery. The resulting illumination of the lamp 16d serves to inform the attendant at the operator position No. 2 that a call is present on the interposition trunk 16 which should be answered. This visual signal is audibly supplemented through operation of the chime 210. Thus the relay R540, upon operating, closes its contacts 541 to complete a circuit including the conductor C255 for energizing the chime 210 from the transformer 542. When the talk and answer key 16c provided at the operator position No. 2 is actuated to answer the call, the contacts 219 are disengaged to interrupt the circuit over which the signal lamp 16d and the signal relay R540 are energized in series. The relay R540, upon restoring, opens its contacts 541 to deenergize the chime 210. When the telephone instruments respectively provided at the No. 1 and No. 2 operator positions are removed from their respectively associated supporting hooks or cradles, the previously described talking communication connection, including the talking conductors C262 and C263 of the interposition trunk 16, is set up between the two operator positions. The manner in which this connection is released is exactly the same as described above.

From the above explanation it will be understood that through selective operation of the talk and answer keys 16c, 16f, 17c, 18c, etc., respectively provided at the three operator positions, communication connections may be set up between any two of the three operator positions. In this regard, it will be understood that the talking conductors of the interposition trunk 17 are utilized in communicating between the No. 1 and No. 3 operator positions, and that the talking conductors of the interposition trunk 18 are utilized in communicating between the No. 2 and No. 3 operator positions.

CALLS TO THE LOCAL FLOOR TELEPHONES

As indicated in the preceding general description, each floor of each of the three buildings served by the system under consideration, is provided with a local floor telephone. A call may be extended to any one of these local floor telephones from the operator position in the same building only. Thus it will be noted that the local floor telephones C and D can only be called from the No. 2 operator position. Similarly, the local floor telephones A and B can only be called from the No. 1 operator position.

In considering this type of call, it may be assumed that the attendant at the No. 2 position desires to communicate with a person having a room on the floor served by the telephone C. In order to initiate the call the talk and answer key 26a is operated to the one of its two off-normal positions wherein the contacts 311 are disengaged and the contacts 312, 313 and 314 are respectively moved into engagement. After this operation is completed, the attendant at the No. 2 position may remove the telephone instrument comprising the transmitter 240 and the receiver 241 from its supporting hook or cradle and await a response to the call. When the contacts 311 of the talk and answer key 26a are disengaged, a point is opened in the circuit for energizing the call lamp 25b. At the contacts 314, a circuit including the hook switch contacts 327 is completed for energizing the call signal 323 provided at the local floor telephone C. The operation of this signal serves to attract the attention of the persons located on the floor where the telephone C is provided. To answer the call, the telephone instrument comprising the transmitter 321 and the receiver 322 is removed from its supporting hook or cradle to actuate the switch 324. In response to this operation the contacts 325 are engaged to prepare a circuit for energizing the call lamp 25b; the contacts 327 are disengaged to deenergize the signal 323; and the contacts 326 are engaged to complete a communication connection between the local floor telephone C and the operator position No. 2. One side of this connection may be traced as including the contacts 326, 312, 315, 221 and 208. The other side of the connection includes the contacts 313, 316, 222 and 209, and the springs of the hook or cradle switch 242. After the connection is no longer desired it may be released by restoring the telephone instrument at the local floor telephone C to its supporting hook or cradle, restoring the talk and answer key 26a to normal and restoring the telephone instrument at the No. 2 operator position to its supporting hook or cradle.

Calls may be extended to the other local floor telephones accessible to the No. 2 operator position in substantially the manner described in the immediately preceding paragraph with reference to the extension of a connection to the telephone C. In this regard it will be noted that each of the talk and answer keys which terminates local floor telephone lines is of the three-position type having two off-normal positions wherein either of two different local floor telephones may be selected. Thus if the talk and answer key 26a is operated to the off-normal position opposite that just described with reference to the extension of the connection to the telephone C, the local floor telephone D is signaled and a connection is prepared to this telephone.

It will be understood that communication connections may be set up to the local floor telephones in the other buildings from the operator positions individual to these buildings in the manner described above with reference to the extension of a connection from the operator position No. 2 to the telephone C. Thus, if the attendant at the No. 1 position desires a connection with the local floor telephone A, the talk and answer key 8a is operated to the off-normal position wherein the contacts 1818, 1820 and 1821 are respectively disengaged and the contacts 1819, 1822 and 1823 are respectively engaged. After this key operation is performed the telephone instrument comprising the transmitter 1740 and the receiver 1741 is removed from its supporting hook or cradle, whereby the hook or cradle switch 1742 is operated to close its contacts 1743 and thus prepare a talking connection to the called telephone A. At the contacts 1818, a point is opened in the circuit for energizing the signal lamp 8b in series with the signal relay R1240. At the contacts 1823, a circuit including the hook switch springs 1846 is completed for energizing the signal device 1843 provided at the telephone A. The operation of this signal device serves to inform the persons in the vicinity of the local floor telephone A that a call is present on the line 8 which should be answered.

When the telephone instrument comprising the transmitter 1840 and the receiver 1841 is removed from its supporting hook or cradle, the hook or cradle switch 1842 is operated to a position wherein the contacts 1844 are engaged, the contacts 1845 are engaged and the contacts 1846 are disengaged to deenergize the signal device 1843. At the contacts 1844, the circuit for energizing the signal lamp 8b in series with the signal relay R1240 is prepared. At the contacts 1845, the desired communication connection between the operator position No. 1 and the telephone A is completed. One side of this connection includes the contacts 1845, 1819, 1824, 1710 and 1719. The other side of the connection includes the contacts 1822, 1825, 1711, 1720 and 1743. It will be understood from the above explanation that the communication connection is released when the telephone instruments respectively provided at the telephone A and the operator position No. 1 are restored to their respective supporting hooks or cradles and the talk and answer key 8a is restored to normal.

It will also be understod that if the talk and anwer key 8a is operated to the other of its two off-normal positions, a communication connection to the local floor telephone B is prepared and a circuit is completed for energizing the signal device provided at this telephone. The manner in which the other local floor telephones accessible to the operator position No. 1 are selectively signaled and connections are set up thereto under the control of the attendant at this position will be clearly apparent from the foregoing explanation.

CALLS FROM THE LOCAL FLOOR TELEPHONES

In order to call the operator position No. 2 from the local floor telephone C, for example, the telephone instrument provided at this telephone is removed from its supporting hook or cradle. In response to this operation the switch 324 is operated to a position wherein the contacts 327 are disengaged and the contacts 325 and 326 are respectively engaged. At the contacts 326, a communication connection including the talking conductors of the line 25 is prepared. At the contacts 325, a circuit is completed for energizing the call signal lamp 25b in series with the signal relay R540, this circuit extending from ground by way of the contacts 325, the filament of the lamp 25b, the contacts 311, C558 and the winding of R540 to battery. When energized in this circuit the relay R540 operates to complete the previously traced circuit for energizing the chime 210, whereby an audible signal is produced at the operator position No. 2 which indicates that an incoming call should be answered. The energization of the lamp 25b identifies the line 25 as the calling line. To answer the call, the attendant at this position actuates the talk and answer key 26a to the off-normal position individual to the line 25, wherein the contacts 311 are disengaged and the contacts 312, 313 and 314 are engaged. At the contacts 311, the circuit for energizing the signal lamp 25b and the relay R549 in series is broken, whereby this relay, the chime 210 and the lamp 25b are deenergized. At the contacts 312 and 313, the desired communication connection is further prepared. This connection is completed when the attendant at the No. 2 position removes the telephone instrument at this position from its supporting hook or cradle to cause the operation of the hook or cradle switch 242. The communication connection as thus set up between the operator position No. 2 and the calling local floor telephone C is exactly the same as described above. From this description, it will also be apparent that the connection is released when the telephone instrument provided at the telephone C is restored to its supporting hook or cradle; the talk and answer key 26a is restored to normal; and the telephone instrument provided at the operator position No. 2 is restored to its supporting hook or cradle.

The manner in which calls may be routed from the other floor telephones of building No. 2 to the operator position No. 2 in this building will be clearly apparent from the preceding explanation. Calls incoming to the operator position No. 1 from the various local floor telephones in building No. 1 are also handled in a substantially similar manner. Thus, if the telephone instrument provided at the local floor telephone A is removed from its supporting hook or cradle, the switch 1842 is operated to complete a circuit for energizing the call signal lamp 8b in series with the signal relay R1240, this circuit extending from ground by way of the contacts 1844, the filament of the lamp 8b, the contacts 1818, C1834, and the winding of R1240 to battery. In operating, the relay R1240 completes the previously traced circuit for energizing the chime 1810, whereby an audible signal is produced at the operator position No. 1 which indicates that a call is present upon one of the lines incoming to this position that should be answered. The identity of the calling line is indicated by the energized condition of the signal lamp 8b individual to the line 8. To answer the call the attendant at this position throws the talk and answer key 8a to the off-normal position corresponding to the line 8, and removes the telephone instrument comprising the transmitter 1740 and the receiver 1741 from its supporting hook or cradle. When these two operations are performed, the previously described connection is set up between the local floor telephone A and the operator position No. 1. Incident to the operation of the key 8a, the contacts 1818 are opened to deenergize the series-connected lamp 8b and the signal relay R1240. In order to release the connection, the telephone instrument provided at the local floor telephone A is restored to its supporting hook or cradle; the talk and answer key 8a is restored to normal; and the telephone instrument provided at the operator position No. 1 is restored to its supporting hook or cradle.

CALL FROM OPERATOR POSITION No. 2 TO ROOM #113

In considering the operation of the selective call facilities provided in building No. 2, it may be assumed that the attendant at the operator position No. 2 desires to signal one of the occupants of room #113 that she is wanted in the lobby of the building. It may also be assumed that the ninth code is the code utilized to convey this information to the occupants of room #113. It may be assumed further, that the illustrated signal selector 20 has previously been set up for use, through operation of the allotter equipment associated with the selectors 20 to 23, inclusive. Under these circumstances, the two assign relays R600 and R610, and the transfer relay R650 are operated in the signal selector 20. With the relay R600 operated, a circuit is completed for energizing the assign lamp 20d which is individual to the trunk 20a extending to the signal selector 20. This circuit extends from ground by way of the contacts 601, the resistor 607, the assign conductor C331, the contacts 301, and the filament of the lamp 20d to battery. Due to the current limiting action of the resistor 607, the lamp 20d is only dimly illuminated when energized in this circuit. With the lamp 20d thus dimly illuminated the attendant at the operator position No. 2 is informed that the dial key 20c should be utilized in routing a control connection to a desired one of the room signals.

Seizing the signal selector 20

In order to seize the preselected signal selector 20 the attendant at the operator position No. 2 actuates the dial key 20c from the position illustrated in the drawings to a position wherein the contacts 301 are disengaged and the contacts 302, 303 and 304 are respectively engaged. When the contacts 301 are opened the above-traced circuit for energizing the assign lamp 20d is interrupted, whereby the signal produced by this lamp is extinguished. At the contacts 302, an alternative circuit is prepared for energizing the lamp 20d. At the contacts 304, a circuit is prepared for releasing the signal selector 20. At the contacts 303, a dial or pulsing circuit is completed over which the trunk and line relays R620 and R630 are energized. Initially this circuit extends from ground by way of the pulsing springs 237 of the calling device 235, the dial lead, the contacts 303 and 307, the dial lead C330, the contacts 624, the lower winding of R620, the contacts 613 and 654 and the winding of R630 to battery. When energized in this circuit the two relays R620 and R630 both operate. In operating, the relay R620 opens its contacts 621 to disconnect the hold lead C1194 from the grounded release conductor C677, and locks to ground in a circuit including its preliminary make contacts 622 and the contacts 664 and 653. After this locking circuit is completed, the relay R620 opens its contacts 624 and closes its contacts 623 to exclude its own lower winding from the circuit for energizing the line relay R630. At its contacts 625, the relay R620 prepares a circuit over which the return signal lamp 20e is controlled in the manner explained hereinafter. At its contacts 626, the relay R620 opens a point in one of the available circuits for energizing the assign lamp 20d. At its contacts 627, the relay R620 prepares an alternative circuit for energizing the assign lamp 20d.

The line relay R630, upon operating, opens its contacts 631 to interrupt a point in the common portion of the circuits over which the magnets 705, 746, 715, 706, 745, 817 and 818 are respectively controlled. At its contacts 632, the relay R630 completes a circuit for energizing the slow-acting hold relay R640, this circuit extending from ground by way of the contacts 632 and 662, the winding of R640, C674 and the contacts 761 to battery.

The relay R640, upon operating, closes its contacts 642 to prepare a common point in the above-mentioned operating circuits for the magnets 705, 715, 746 and 817. At its contacts 641, the relay R640 opens a point in the common portion of the operating circuits for the release magnets 825, 706, 745 and 818. At its contacts 643, the relay R640 completes an obvious multiple path for impressing ground potential upon the release conductor C677, and in so doing completes an obvious multiple locking circuit for the trunk relay R620. At its contacts 644, the relay R640 completes an alternative locking circuit for the transfer relay R650, this circuit extending from ground by way of the off-normal springs 821, C681, the contacts 644 and the lower winding of R620 to battery. At its contacts 645, the relay R640 opens the established locking circuit for the assign relay R610. When the last-named circuit is broken, the relay R610 releases and opens its contacts 614 to deenergize the assign relay R600. At its contacts 615, the relay R610 prepares a point in the chain circuit described hereinafter over which the start relay R500 of the allotter No. 2 is controlled. At its contacts 611, the relay R610 opens another point in its own locking circuit. At its contacts 612, the relay R610 reprepares its operating circuit. At its contacts 613, the relay R610 opens another point in the initially traced operating circuit for the two relays R620 and R630. The relay R600, upon restoring, opens its contacts 605 to interrupt the operating circuit for the transfer relay R650. At its contacts 601, the relay R600 opens another point in the previously traced circuit for energizing the assign lamp 20d. At its contacts 603 and 604, the relay R600 opens points in two alternative circuits, described hereinafter, over which the line relay R630 may be energized. At its contacts 602, the relay R600 completes the prepared operating circuit for the transfer relay R710, this circuit extending from the grounded release conductor C677 by way of the vertical off-normal springs 716, C676, the contacts 602, C675 and the lower winding of R710 to battery.

In operating, the relay R710 closes its contacts 712 to prepare a circuit for energizing its upper winding in parallel with the vertical magnet 746 during the dialing of the second digit. At its contacts 711, the relay R710 opens an incomplete circuit for transmitting pulses to the rotary magnet 715 and the upper winding of the relay R720 in parallel during the dialing of the third digit. At its contacts 714, the relay R710 opens a point in the operating circuit for the ring start relay R850. At its contacts 713, the relay R710 opens a point in the operating circuit for the pickup relay R780. Following the operation of the transfer relay R710 the signal selector 20 is conditioned to respond to the impulse of the first digit of the directory number designating the desired room signal and the desired signal code.

Selecting the room signal

As pointed out in the preceding description, each of the four signal selectors provided in building No. 1 have access to as many as two hundred room signals. For selection purposes, these room signals are divided into two large groups of one hundred each which are respectively designated by first directory number digits of "1" and "2." If it is assumed, for example, that the signal 113b provided in room #113 is in the first group of one hundred signals, and further that the control leads individual to this room extend to the third set of contacts in the first contact level of the Strowger switching mechanism forming a part of the signal selector 20, the directory number designating the desired room will be "113." It will also be understood that the character of the fourth digit depends upon the particular code which is to be used in controlling the energization of the signal 113b.

When the first digit "1" is dialed at the operator position No. 2, the pulsing springs 237 are opened and closed to transmit a current impulse over the dial lead C330 to the line relay R630. Upon restoring at the beginning of the open-circuit period of the impulse, the relay R630 opens its contacts 632 to interrupt the previously traced operating circuit for the hold relay R640. Due to its slow-to-release characteristic the latter relay remains operated during impulsing. At its contacts 631, the relay R630 completes the prepared circuit for energizing the magnet 817 of the group selecting switch 810 in parallel with the upper winding of the transfer relay R650. This circuit extends from ground by way of the contacts 631, 642 and 652 to the conductor C680 where it divides, one branch extending through the upper winding of R650 to battery and the other branch extending through the winding of the magnet 817 to battery. When energized in this circuit the magnet 817 operates to step the wipers 814, 815 and 816 one step from the illustrated normal positions thereof into engagement with the contacts terminating the conductors which extend to the wipers 800, 802 and 804. Incident to the off-normal movement of the wipers 814, 815 and 816, the off-normal springs 819 are closed to prepare a circuit for energizing the release magnet 818, the off-normal springs 820 are engaged to prepare various locking circuits described more fully hereinafter and the off-normal springs 821 are disengaged to deenergize the lower winding of the transfer relay R650. The latter relay, due to its slow-to-release characteristic, remains operated during any further impulses of the first digit, due to the continued intermittent energization of its upper winding.

At the end of the open-circuit period of the single impulse constituting the first digit, the pulsing springs 237 are moved back into engagement to recomplete the operating circuit for the line relay R630. This relay, in reoperating, closes its contacts 632 to recomplete the operating circuit for the hold relay R640, and opens its contacts 631 to deenergize the transfer relay R650 and the magnet 817. From the above explanation, it will be understood that if a first digit comprising two or more impulses is dialed at the operator position No. 2, these impulses are repeated by the line relay R630 to the upper winding of the transfer relay 2650 and the magnet 817 of the group selecting switch 810 in parallel, whereby the wipers of this switch are rotated to engage the contacts which correspond to the numerical value of the digit dialed.

In the event a room signal included in the second group of one hundred signals is desired by the attendant at the operator position No. 2, the calling device 235 is operated to transmit a first digit which comprises two impulses. Accordingly, two current pulses are transmitted by the line relay R630 to the operating magnet 817 of the group selecting switch 810. This magnet responds to the two current pulses by advancing the wipers 814, 815 and 816 into engagement with their respective associated second contacts, wherein the wipers 801, 803 and 805 are operatively connected to the control equipment of the selector 20 in lieu of the wipers 800, 802 and 804. It will be understood, therefore, that depending upon the numerical value of the first digit, the first or the second group of room signals is selected. Provisions are made in the signal selector 20 for returning a busy signal to the attendant at the operator position No. 2 in the event a first digit comprising more than two impulses is inadvertently dialed into this selector. Thus it will be noted that the third to tenth contacts of the contact set 812 are multipled together and connected to ground. The wiper 815 associated with this contact set is included in the operating circuit for the busy test relay R750. Accordingly, if a first digit comprising three impulses, for example, is dialed at the calling operator position, the busy test relay R750 will be operated to return a busy signal to the attendant at this position incident to the operation of the relay R730 at the end of the third digit.

Shortly following the end of the first digit, the transfer relay R650 releases. Upon restoring this relay closes its contacts 655 to prepare one of the supervisory circuits over which the assign lamp 20d may be controlled. At its contacts 654, the relay R650 opens another point in the previously traced circuit for energizing the two relays R620 and R630 in series. At its contacts 653, the relay R650 opens one of the paths connecting the release conductor C677 to ground. At its contacts 652, the relay R650 opens another point in the above-traced circuit over which current pulses were transmitted to its own upper winding and the winding of the magnet 817 during the dialing of the first digit. At its contacts 651, the relay R650 further prepares the circuit for energizing the vertical magnet 746 in parallel with the upper winding of the transfer relay R710 during the dialing of the second digit. Following the release of the transfer relay R650 the signal selector 20 is conditioned to respond to the impulse of the second digit.

When the second digit "1" is dialed by the attendant at the operator position No. 2, the pulsing springs 237 are again opened and closed to transmit a current impulse over the dial lead C330 to the line relay R630. Upon restoring at the beginning of the open-circuit period of this impulse, the above-mentioned circuit for energizing the vertical magnet 746 in parallel with the upper winding of the transfer relay R710 is completed. This circuit extends from ground by way of the contacts 631, 642 and 651 to the conductor C671 where it divides, one branch extending through the contacts 712 and the upper winding of R710 to battery, and the other branch extending through the contacts 712 and 731, and the winding of the vertical magnet 746 to battery. When energized in this circuit the vertical magnet 746 functions to elevate the wipers 800 to 805, inclusive, to a position opposite the first level of contacts in the associated contact field. Incident to this vertical off-normal movement of the enumerated wipers, the vertical off-normal springs 716 and 747 are respectively disengaged and the off-normal springs 717 and 746 are respectively engaged. At the springs 747, a point is opened in the operating circuit for the release magnet 818. At the springs 746, the operating circuit for the release magnet 745 is prepared. At the springs 717, the prepared operating circuit for the transfer relay R720 is completed, this circuit extending from the grounded release conductor C677 by way of the off-normal springs 717 and 718 and the lower winding of R720 to battery. At the springs 716 the previously traced circuit for energizing the lower winding of the transfer relay R710 is interrupted. Since, as stated above, the upper winding of the transfer relay R710 is intermittently energized in parallel with the vertical magnet 746 during the dialing of the second digit, and this relay is of the slow-to-release type, it remains operated until shortly after the digit is ended. In this regard, it will be understood that second digits which comprise from one to ten impulses may be transmitted to the signal selector 20, depending upon the location of the desired room signal, and that the wipers 800 to 805, inclusive, are positioned accordingly as the vertical magnet 746 is intermittently energized by the line relay R630.

In the case under consideration, the line relay R630 reoperates at the end of the open-circuit period of the single impulse constituting the second digit, and remains operated until the dialing of the third digit is started. In reoperating, this relay closes its contacts 632 to recomplete the operating circuit for the hold relay R640, and opens its contacts 631 to deenergize the parallel-connected windings of the transfer relay R710 and the vertical magnet 746. The relay R710, upon restoring, closes its contacts 714 to prepare the operating circuit for the ring start relay R850. At its contacts 713, the relay R710 prepares the operating circuit for the pickup relay R780. At its contacts 712, the relay R710 opens another point in the above-traced circuit for energizing its upper winding and the winding of the vertical magnet 746 in parallel. At its contacts 711, the relay R710 prepares the previously mentioned circuit for energizing the rotary magnet 715 in parallel with the upper winding of the transfer relay R720.

As indicated above, the transfer relay R720 operates incident to the vertical off-normal movement of the wipers 800 to 805, inclusive. In operating, this relay closes its contacts 721 to prepare the circuit for energizing its upper winding in parallel with the winding of the rotary magnet 715. At its contacts 723, the relay R720 opens a point in the locking circuit for the busy test relay R750. At its contacts 722, the relay R720 prepares the operating or test circuit for the busy test relay R750. At its contacts 724, the relay R720 opens a point in the operating circuit for the relay R730. Following the release of the relay R710 in the manner explained above, the signal selector 20 is conditioned to respond to the impulses of the third digit dialed at the calling operator position.

When the third digit "3" is dialed by the attendant at the operator position No. 2, the pulsing springs 237 are opened and closed three times so that three current impulses are transmitted over the dial lead C330 to the line relay R630. Upon restoring at the beginning of the open-circuit period of the first impulse, the relay R630 closes its contacts 631 to complete the above-mentioned circuit for energizing the upper winding of the transfer relay R720 in parallel with the rotary magnet 715. This circuit extends from ground by way of the contacts 631, 642 and 651, C671, the contacts 711 and 721 and the parallel-connected windings of R720 and the magnet 715 to battery. When energized in this circuit the magnet 715 operates to rotate the wipers 800 to 805, inclusive, into engagement with the associated contacts forming the first contact set in the selected level. Incident to this rotary off-normal movement of the wiper carriage structure, the rotary off-normal springs 719 are moved into engagement to prepare the operating circuit for the relay R730, and the rotary off-normal springs 718 are disengaged to deenergize the lower winding of the transfer relay R720. At the end of the open-circuit period of the first impulse, the line relay R630 reoperates and opens its contacts 631 to interrupt the circuit for energizing the parallel-connected windings of the magnet 715 and the relay R720. During each succeeding impulse transmitted to the line relay R630, another current pulse is transmitted to the rotary magnet 715, whereby the wiper carriage structure of the Strowger switching mechanism is rotated to move the wipers 800 to 805, inclusive, into engagement with the contacts individual to the desired room #113. During this rotation of the wiper carriage structure the test wiper 802 may be moved over contacts which correspond to busy room signals. Each time this occurs the busy test relay R750 is energized in a circuit which includes the grounded test wiper 802, the wiper 815 and its engaged first contact, C795, the contacts 722 and the lower winding of R750 to battery. Each time the test wiper 802 is moved out of engagement with a test contact corresponding to a busy room signal this circuit is obviously interrupted. It will be understood, therefore, that the busy test relay R750 may be intermittently energized during the rotary movement of the wiper carriage structure. Such operation of the busy test relay is without effect. As indicated above, the lower winding of the transfer relay R720 is deenergized incident to the first rotary step of the wipers 800 to 805, inclusive. During continued rotary movement of these wipers the upper winding of the transfer relay R720 is intermittently energized under the control of the line relay R630. Since this transfer relay is of the slow-to-release type, it remains operated until shortly after the digit is ended.

At the end of the third digit the line relay R630 remains in its operated position to cause the deenergization and release of the transfer relay R720. The latter relay, upon restoring, closes its contacts 724 to complete the prepared operating circuit for the relay R730, this circuit extending by way of the grounded release conductor C677, the rotary off-normal springs 719, the contacts 724 and the winding of R730 to battery. At its contacts 721, the relay R720 opens another point in the above-traced circuit for energizing its upper winding in parallel with the rotary magnet 715. At its contacts 722, the relay R720 opens a point in the operating circuit for the busy test relay R750. At its contacts 723, the relay R720 prepares or completes a locking circuit for the busy test relay, depending upon the idle or busy condition of the selected room signal 113b.

*Busy test and busy signal*

As pointed out in the above explanation, the selected room signal 113b is tested to determine the idle or busy condition thereof immediately the wipers 800 to 805 are rotated to engage the contacts corresponding to this signal. It will be understood, therefore, that in the event the selected signal 113b is busy, the busy test relay R750 is energized and occupies its operated position at the time the relay R720 releases. A locking circuit is completed for the relay R750 incident to the release of the relay R720 and the operation of the relay R730, this circuit extending from the grounded test wiper 802 by way of the wiper 815 and its engaged first contact, C795, the contacts 735, 754 and 723, and the lower winding of R750 to battery. With the relay R750 operated, the contacts 751 are disengaged to hold open the operating circuit for the pickup relay R780. At the contacts 752, the operating circuit for the ring start relay R850 is held open. At the contacts 753, the upper winding of the relay R750 is short-circuited to render this relay slow to release. At the contacts 755, the path traced hereinafter for impressing ground potential upon the test contact individual to the room signal 113b is held open. At the contacts 756, the path for impressing ground potential upon the interrupter start lead C592 is held open. At the contacts 757, a circuit is prepared for transmitting current pulses through the filament of the assign lamp 20d.

The relay R730, upon operating in the manner explained above, not only completes the prepared locking circuit for the busy test relay R750 in the event the called room signal 113b is busy, but in addition, closes its contacts 732 to prepare a circuit for energizing the magnet 705 in parallel with the upper winding of the transfer relay R710 during the dialing of the fourth or code selecting digit at the calling operator position. At its contacts 731, the relay R730 opens a point in the previously traced circuit for transmitting current pulses to the vertical magnet 746. At its contacts 733, the relay R730 completes an alternative circuit for energizing the transfer relay R710, this circuit extending from the grounded release conductor C677 by way of the contacts 733 and 743, and the lower winding of R710 to battery. At its contacts 736, the relay R730 prepares the above-mentioned circuit for transmitting current pulses through the filament of the assign lamp 20d provided at the operator position No. 2.

At its contacts 734, the relay R730 completes a circuit including the start conductor C551 for initiating the operation of the two pulse generating relays R510 and R520. Thus when the lead C551 is connected to ground, a circuit including this conductor and the resistor 513 is completed for energizing the slow-to-operate relay R510. This relay operates after an interval and opens its contacts 512 to interrupt the path normally short-circuiting the winding of the relay R520. When this path is opened the relay R520 is energized in a circuit including the grounded lead C551 and the resistor 523. The relay R520 operates after a short interval, and closes its contacts 522 to short-circuit the winding of the relay R510. At its contacts 521, the relay R520 opens a point in the path for transmitting ground pulses through the upper winding of the relay R530 to the busy flash lead C553. When its winding is short-circuited by the relay R520, the relay R510 releases and closes its contacts 512 to short-circuit the winding of the relay R520. The latter relay now releases and opens its contacts 522 to interrupt the path short-circuiting the relay R510. Thus a second cycle of operation of the two relays R510 and R520 is initiated. These two relays continue to operate and restore in sequence so long as ground potential is maintained upon the busy interrupter start lead C551. Each time the relay R510 operates it completes a path which extends from the start lead C551 through the contacts 511 for impressing ground potential upon the pulsing lead C554. This path is obviously opened at the contacts 511 each time the relay R510 restores. Preferably, the two relays R510 and R520 are so constructed and arranged that ground pulses are transmitted over the pulsing lead C554 at a rate of 120 per minute.

With the two relays R730 and R750 of the selector 20 operated, the assign lamp 20d provided at the operator position No. 2 is energized each time a current pulse is short-circuited over the pulsing lead C554. The circuit for energizing the lamp 20d extends from the grounded lead C554 by way of the contacts 757 and 736, the ring and busy conductor C1190, the contacts 627, the ring and busy conductor C332 of the trunk 20a, the contacts 302 and the filament of the lamp 20d to battery. The resulting intermittent illumination of this lamp serves to inform the attendant at the operator position No. 2 that the selected room signal 113b is busy.

Upon receiving this information, the attendant may either release the partially completed control connection, or she may continue the dialing operation to set the code selecting switch 700 in accordance with the desired signal code and camp on the busy room signal until the control connection responsible for the busy condition of this signal is released. The manner in which the code selecting switch 700 responds to the impulses of the fourth digit, and the manner in which the selected room signal 113b is energized in accordance with the selected code after the previously established control connection is released, are fully explained hereinafter.

*Called room signal idle*

In the event the selected room signal 113b is idle at the time it is selected in the manner explained above, the test contact engaged by the test wiper 802 is disconnected from ground so that no circuit is provided for energizing the busy test relay R750. Accordingly, this relay remains in its restored position during and following the release of the transfer relay R720. In this case the relay R730, upon operating, closes its contacts 735 to impress ground potential upon the test contacts individual to the signal 113b over a path which extends from ground at the contacts 755 and includes the conductor C795 and the wipers 815 and 802. With ground potential impressed upon this test contact and the connected test contacts of the other selectors 21, 22 and 23, the signal 113b is guarded against seizure through the other selectors. It will be observed that with the relay R730 operated and the busy test relay R750 in its released position, the previously traced circuit for transmitting ground pulses over the ring and busy lead C332 to the assign lamp 20d is held open at the contacts 757. It will also be noted that, regardless of the idle or busy condition of the selected signal 113b, the release of the relay R730 conditions the signal selector 20 to respond to the impulses of the fourth or code selecting digit.

*Selecting the signal code*

To select the desired ringing code which, in the case assumed, is designated by the digit "9," the attendant at the operator position No. 2 actuates the calling device 235 to dial this digit, whereby the pulsing springs 237 are opened and closed nine times to transmit nine current impulses over the dial lead C330 to the line relay R630. Upon restoring at the beginning of the open-circuit period of the first impulse, the relay R630 completes the prepared circuit for energizing the magnet 705 of the code selecting switch 700 in parallel with the upper winding of the transfer relay R710. This circuit extends by way of the contacts 631, 642 and 651 to the conductor C671 where it divides, one branch extending through the contacts 712 and the upper winding of R710 to battery, and the other branch extending by way of the contacts 712 and 732 and the winding of the magnet 705 to battery. When energized in this circuit, the magnet 705 operates to advance the wipers 703 and 704 one step from the illustrated normal positions thereof into engagement with their respective associated first contacts. Incident to this off-normal movement of the enumerated wipers, the off-normal springs 709 are opened and the off-normal springs 708 are closed to transfer the prepared release circuit from the release magnet 745 of the Strowger switching mechanism to the release magnet 706 of the code selecting switch 700. The off-normal springs 707 are also closed to complete an obvious circuit for energizing the interrupter start relay R740. When thus energized, the relay R740 closes its contacts 741 further to prepare the operating circuit for the pickup relay R780. At its contacts 743, the relay R740 opens the above-traced alternative operating circuit for the transfer relay R710. Throughout the remainder of the digit, however, current pulses are intermittently transmitted through the upper winding of the transfer relay R710 by the line relay R630. These current pulses serve to maintain the slow-to-release transfer relay R710 in its operated position until shortly after the digit is ended. At its contacts 742, the relay R740 further prepares the operating circuit for the ring start relay R850. At its contacts 744, the relay R740 prepares or completes the operating circuit for the interrupter start relay R590, this circuit extending from ground by way of the contacts 756 and 744, C592 and the winding of R590 to battery. It will be noted that this circuit is only completed in the event the busy test relay R750 occupies its restored position.

As the line relay R630 continues to follow the impulses of the fourth digit, eight additional current pulses are transmitted through the parallel-connected windings of the magnet 705 and the transfer relay R710. Each time a current pulse is transmitted to the indicated magnet, the wipers 703 and 704 are advanced another step. Accordingly, at the end of the fourth digit dialed at the operator position No. 2 these wipers are left standing in engagement with their respective associated ninth contacts. Shortly after the digit is ended, the transfer relay R710 restores and closes its contacts 711 to prepare the operating circuit for the release relay R660. At its contacts 712, the relay R710 opens another point in the circuit for energizing its own upper winding in parallel with the magnet 705. At its contacts 713, the relay R710 further prepares the operating circuit for the pickup relay R780. At its contacts 714, the relay R710 prepares or completes the operating circuit for the ring start relay R850, depending upon the position occupied by the busy test relay R750.

Assuming that the selected signal 113b is idle, such that the busy test relay R750 occupies its restored position, the operating circuit for the ring start relay R850 is completed incident to the release of the transfer relay R710 in the manner just explained. This circuit extends from the grounded release conductor C677 by way of the contacts 733, 742, 752 and 714, C778, the winding of R850 and the resistor 856 to battery. In operating, the relay R850 closes its contacts 851 to prepare a locking circuit for the hold relay R640 and a pulsing circuit for the operating magnet 824 of the ringing cycle counting switch 822. At its contacts 852, the relay R850 prepares the operating circuit for the coding relay R830. At its contacts 853, the relay R850 further prepares the operating circuit for the release relay R660. At its contacts 854, the relay R850 prepares one of the operating circuits for the return signal relay R860. At its contacts 855, the relay R850 completes an alternative circuit for energizing the assign lamp 20d associated with the trunk 20a at the calling operator position No. 2. This circuit extends from ground by way of the contacts 855, C796, the contacts 736, C1190, the contacts 627, the ring and busy conductor C332, the contacts 302 and the filament of the lamp 20d to battery. When energized in this circuit, the lamp 20d is brightly illuminated to indicate to the attendant at the operator position No. 2 that the selected room signal is idle and the energization of this signal is about to begin.

*Start signaling*

As indicated above, the interrupter start relay R740, upon operating, completes the operating circuit for the start relay R590, whereby the code interrupter 570 is rendered effective to transmit ground pulses over the pickup and reversing leads C593 and C594, respectively, and to transmit coded signaling pulses of ground potential over the five code leads C595, C596, C597, C598 and C599. In this regard, it will be noted that during each half revolution of the cams mounted upon the shaft 579, two sets of ground pulses are transmitted over each code lead. Thus, during each half revolution of th shaft 579 a single ground pulse is transmitted through the contacts 591 and the pulsing springs 584 to the code lead C595. Two ground pulses are likewise transmitted through the pulsing springs 585 to the code lead C596. Three ground pulses are similarly transmitted by the pulsing cam 575 through the pulsing springs 586 to the code lead C597. The code leads C598 and C599 likewise are connected to ground four and five times, respectively, during each half revolution of the shaft 579. It will further be noted that during alternate half revolutions of the shaft 579 the contact springs 583 are maintained in engagement by the cam 572 to hold ground potential on the reversing lead C594. Each period during which the reversing lead C594 is connected to ground embraces and completely overlaps the transmission of pulses over the five code leads during alternate half revolutions of the shaft 579. From a consideration of the interrupter as shown in Fig. 5, it will also be noted that at the beginning of each code cycle the cam 571, operating in conjunction with the pulsing springs 582, functions to transmit a pickup pulse of ground potential over the puickup lead C593.

Following the release of the transfer relay R710 in the manner pointed out above, the pickup relay R780 is energized the next time a pickup pulse is transmitted over the pickup lead C593. The operating circuit for the pickup relay may now be traced as extending from ground by way of the contacts 591, the contact springs 582, the pickup lead C593, the contacts 713, 741, 751 and 782 and the winding of R780 to battery. When energized in this circuit the relay R780 locks to ground over a path including its contacts 781, C789, the contacts 843 and the off-normal springs 820. After this locking circuit is completed, the relay R780 opens its contacts 782 to disconnect the pickup lead C593 from ground at the off-normal springs 820. At its contacts 784, the relay R780 prepares a locking circuit for the stepping relay R840. At its contacts 785, the relay R780 prepares the operating circuit for the code transfer relay R770. At its contacts 786 and 787, the relay R780 rearranges the available operating circuits which are provided for controlling the selected floor relay R910.

Following the operation of the pickup relay R780, and during the first half of the code cycle as determined by the operation of the code interrupter 570, two short ground pulses are transmitted to the coding relay R830. In this regard, it will be noted that the last five contacts of the contact set 702 embodied in the code selecting switch 700 are multipled together and connected to the second code lead C596. Accordingly, with the wipers 703 and 704 engaging their respective associated ninth contacts, the operating circuit for the coding relay R830 initially extends from the grounded code lead C596 by way of the wiper 704 and its engaged ninth contact, the contacts 771 and 783, C776, the winding of R830 and the contacts 852 to battery. Each time the coding relay R830 is energized over this circuit, it closes its contacts 831 to complete the prepared circuit for energizing the signal 113b of the selected room #113. This circuit extends from ground by way of the contacts 831, the wiper 814, the wiper 800 and its engaged signaling contact, C871, and the operating windings of the signal 113b to battery. This circuit is obviously opened at the contacts 831 each time the coding relay R830 restores at the end of a ground pulse transmitted over the second code lead C596.

At the end of the first half of the code cycle in progress, a spacing interval is measured through operation of the interrupter 570. Immediately before the second half of the code cycle starts, the cam 572 closes the contact springs 583 to impress ground potential upon the reversing lead C594 and thus complete the prepared operating circuit for the code transfer relay R770, this circuit extending from the lead C594 through the contacts 785 and the winding of R770 to battery. When thus energized, the relay R770 opens its contacts 771 to disconnect the coding relay R830 from the wiper 704, and closes its contacts 772 to connect the coding relay to the wiper 703. At its contacts 773, the relay R770 completes the prepared circuit for energizing the lower winding of the stepping relay R840, this circuit extending from the grounded release conductor C677 by way of the contacts 773, C778 and the lower winding of R840 to battery. The relay R840 is of the well-known two-step type. More specifically, when its lower winding is energized in the circuit just traced, it partially operates to close its preliminary make contacts 842 only. At these contacts a path including the conductors C779 and C788 and the additional contacts 784 and 773 is completed for short-circuiting the upper winding of the relay R840.

Following the operation of the code transfer relay R770, and during the second half of the code cycle in progress, the coding relay R830 is energized in accordance with the ground pulses transmitted over the fourth code lead C598. In this case, the operating circuit for the coding relay extends from the grounded lead C598 by way of the wiper 703 and its engaged ninth contact, the contacts 772 and 783, C776, the winding of R830 and the contacts 852 to battery. Each time the coding relay R830 is energized in this circuit it operates to complete the previously traced circuit for energizing the signal 113b. It will be understood, therefore, that at the end of the first code cycle the signal 113b will have been operated to produce an audible code which comprises two short rings, a spacing interval, and four short rings, in the order named. This signal may serve to inform one of the occupants of room #113 that she is wanted in the lobby of the building.

At the end of the first code cycle utilized in controlling the signal 113b, the cam 572, operating in conjunction with the contact springs 583, interrupts the above-traced operating circuit for the code transfer relay R770. This relay, in restoring, opens its contacts 772 and closes its contacts 771, whereby the coding relay R830 is again connected to be controlled over the above-traced circuit including the wiper 704 and the second code lead C596. At its contacts 773, the relay R770 interrupts the above-traced path short-circuiting the upper winding of the two-step relay R840. When this path is opened the two windings of the relay R840 are energized in series over a circuit which extends from the grounded release conductor C677 by way of the contacts 784, C779, the contact 842 and the two windings of R840 in series to battery. When thus fully energized the relay R840 completes its operation, and in so doing opens its contacts 843 to interrupt the previously traced locking circuit for the pickup relay R780. At its contacts 841, the relay R840 completes the prepared operating circuit for the magnet 824 of the counting switch 822, this circuit extending from ground by way of the contacts 851 and 841, and the winding of the magnet 824 to battery. When energized in this circuit the magnet 824 operates to advance the wiper 823 into engagement with its associated first contact. Incident to this off-normal movement of the wiper 823, the off-normal springs 826 are closed and the off-normal springs 827 are opened, whereby the release circuit is transferred from the release magnet 706 of the code selecting switch 700 to the release magnet 825 of the counting switch 822. The off-normal springs 828 are also closed to prepare one of the available operating circuits for the return signal relay R860, incident to the off-normal movement of the wiper 823.

The pickup relay R780, upon restoring, opens its contacts 781 further to interrupt its own locking circuit, and closes its contacts 782 to reprepare its operating circuit. At its contacts 783, the relay R780 opens a point in the circuit over which coded ground pulses are transmitted through the winding of the coding relay R830. At its contacts 785, the relay R780 opens another point in the operating circuit for the code transfer relay R770. At its contacts 786 and 787, the relay R780 rearranges the available operating circuits for the selected floor relay R910. At its contacts 784, the relay R780 interrupts the above-traced circuit for energizing the two windings of the stepping relay R840 in series. When thus deenergized the relay R840 restores and opens its contacts 841 to deenergize the magnet 824 of the counting switch 822. At its contacts 842, the relay R840 opens another point in the circuit for energizing its two windings in series. At its contacts 843, the relay R840 reprepares the locking circuit for the pickup relay R780.

From this point on the manner in which the code signaling relays R770, R780, R830 and R840 are controlled by the code interrupter 570 repeatedly to transmit the selected code to the selected room signal 113b, is exactly the same as just described with reference to the transmission of the first code signal. In this regard, it is pointed out that the number of times the code signal is repeated is determined by the wiring of the relay R850 to the contacts of the counting switch 822. In the illustrated arrangement, the upper terminal of the ring start relay R850 is connected to the third contact of the contact set associated with the wiper 823, so that the selected signal code is transmitted to the signal 113b three times before the signaling operation is automatically arrested. It is pointed out by way of example, however, that by connecting the upper terminal of the relay R850 to the fourth, fifth, sixth or seventh contacts of the single contact set embodied in the counting switch 822, the signal code may be repeated four, five, six or seven times as desired.

Stop signaling

As indicated above, with the present arrangement the wiper 823 of the counting switch 822 is operated to engage its associated third contact when the stepping relay R840 completes its operation after the signal code has been transmitted three times. Incident to the engagement of the wiper 823 with its associated third contact, the winding of the ring start relay R850 is short-circuited over a path which extends from the grounded conductor C677, the contacts 733, 742, 752 and 714, C778, the winding of R850 and the wiper 823 back to ground. When its winding is thus short-circuited the relay R850 is deenergized and restores. In releasing, this relay opens its contacts 852 further to interrupt the operating circuit for the coding relay R830, and opens its contacts 851 further to interrupt the operating circuit for the magnet 824. At its contacts 853, the relay R850 opens a point in the prepared operating circuit for the release relay R660. At its contacts 854, the relay R850 opens a point in one of the available operating circuits for the return signal relay R860. At its contacts 855, the relay R850 opens the previously traced circuit, which extends by way of the ring and busy lead C332, for energizing the assign lamp 20d individual to the trunk 20a and provided at the calling operator position No. 2. With the ring start relay R850 in its restored position, further operation of the coding relay R830 is prevented. It is noted, however, that the three relays R770, R780 and R840 may continue to operate in the exact manner described above under the control of the code interrupter 570 until such time as the interrupter start relay R740 is deenergized. When the assign lamp 20d provided at the calling operator position No. 1 is deenergized, the attendant at this position is informed that the signaling operation has been completed. In the above-considered case, wherein a fourth or code selecting digit "9" is dialed at the calling operator position No. 2, the specific code comprising two short ringing periods, a spacing period and four short ringing periods, is transmitted to the selected room signal 113b. From a consideration of the wiring of the code selecting switch 700, however, it will be understood that various other code signals may be selected for transmission, by dialing code selecting digits having other values. Thus if the code selecting digit "6" is dialed into the selector 20, the wipers 703 and 704 are left standing in engagement with their associated sixth contacts at the end of the digit. Accordingly, the coding relay R830 is controlled over the first code lead C595 during the second half of each code cycle. Alternatively, if the wipers 703 and 704 engage their respective associated seventh contacts, the coding relay R830 is controlled over the second lead C596 during the second half of each code cycle. More generally stated, the second half of each code may comprise from one to five short ringing periods when the wipers 703 and 704 are operated to engage their associated contacts numbered from 1 to 5, inclusive, or 6 to 10, inclusive. In those instances where a code selecting digit is dialed which comprises less than six impulses, the first half of the transmitted code will comprise but a single short ringing period. In this case the coding relay R830 is controlled over the wiper 704 from the first code lead C595. More generally considered, the character of the codes selected through operation of the code selecting switch 700 will be readily apparent from a consideration of the following table:

| Code digit: | Code selected |
|---|---|
| 1 | 1 short, pause, 1 short |
| 2 | 1 short, pause, 2 shorts |
| 3 | 1 short, pause, 3 shorts |
| 4 | 1 short, pause, 4 shorts |
| 5 | 1 short, pause, 5 shorts |
| 6 | 2 shorts, pause, 1 short |
| 7 | 2 shorts, pause, 2 shorts |
| 8 | 2 shorts, pause, 3 shorts |
| 9 | 2 shorts, pause, 4 shorts |
| 0 | 2 shorts, pause, 5 shorts |

Answer supervision

The character of the return signal which is transmitted to the operator position No. 1 when the call is acknowledged in room #113 depends upon which of the two modifications of the return signaling circuits is used. More specifically, if the "Y" wiring arrangement is used, the return signal lamp 20e is continuously energized after the call is answered or acknowledged. In this case the code transmission equipment illustrated in Fig. 9 of the drawings is not used. On the other hand, if the "X" wiring arrangement is used, the code transmission equipment of Fig. 9 is also used and a coded signal which indicates the floor number of the answering room is produced through operation of the return signal lamp 20e.

Considering first the operation of the system with the "Y" wiring arrangement incorporated therein, when the return signal key 113a provided in the called room #113 is momentarily actuated, ground potential is impressed directly upon the lead C872 to complete a circuit for energizing the return signal relay R860. This circuit extends from the grounded lead C872 by way of the wipers 804 and 816, C682, the contacts 665, C679, the off-normal springs 828 and the upper winding of R860 to battery. When energized in this circuit the relay R860 opens its contacts 861 further to interrupt the operating circuit for the release relay R660. At its contacts 862, the relay R860 completes a locking circuit for itself, this circuit extending from ground by way of the off-normal springs 820, the contacts 862 and the lower winding of R860 to battery. At its contacts 864, the relay R860 opens a point in the operating circuit for the release relay R760. At its contacts 863, the relay R860 completes the prepared circuit for energizing the return signal lamp 20e. In the present case this circuit may be traced as extending from ground by way of the contacts 863, the return signal conductor C1191, the contacts 625, the return signal conductor C333 of the trunk 20a and the filament of the lamp 20e to battery. When energized in this circuit the lamp 20e is continuously illuminated to signal the attendant at the operator position No. 1 that the call has been answered.

Considering now the operation of the return signaling circuits when the "X" wiring arrangement and the code transmission equipment illustrated in Figs. 7, 8 and 9 of the drawings are used, it will be observed that when the key 113a provided in the called room #113 is momentarily operated, an obvious circuit is completed for energizing the upper winding of the first floor relay R910. This relay, in operating, closes its contacts 911 to prepare a locking circuit for itself, and closes its contacts 912 to complete a circuit for energizing its lower winding in series with the upper winding of the return signal relay R860. The latter circuit may be traced as extending from ground by way of the lower winding of R910, the contacts 912, C872, the wipers 804 and 816, C682, the contacts 665, C679, the off-normal springs 828, the contacts 865, C793, the contacts 787, C794, and the upper winding of R860 to battery. From a consideration of this circuit, it will be observed that if the key 113a is actuated before the code transmission to the signal 113b is completed, the pickup relay R780 may occupy its operated position. In such case the first floor relay R910, upon operating, locks up until the code cycle in progress is completed, without completing the operating circuit for the return signal relay R860. More specifically, the relay R910, upon operating under the conditions assumed, closes its contacts 912 to complete a locking circuit which extends from ground by way of the lower winding of R910, the contacts 912, C872, the wipers 804 and 816, C682, the contacts 665, C679, the off-normal springs 828, the contacts 865, C793, the contacts 786, and the resistor 774 to battery. Thereafter and when the pickup relay R780 restores at the end of the code cycle in progress, the contacts 787 are closed and the contacts 786 are opened, whereby the lower winding of the first floor relay R910 is energized in series with the upper winding of the return signal relay R860 over the circuit traced above. Thus the transmission of the return supervisory signal to the calling operator position No. 1 is delayed until the complete code is transmitted to the signal 113b.

It may also occur that the return signal key 113a will be operated by one of the occupants of room #113 before the first code cycle is completed. In this case the counting switch 822 occupies its normal position at the time the key 113a is actuated and, hence, the off-normal springs 828 are open. A multiple circuit is, however, provided through the engaged contacts 854 of the ring start relay R850, for energizing the lower winding of the first floor relay R910 in series with the resistor 774 and subsequently in series with the upper winding of the return signal relay R860, thereby to hold the first floor relay R910 operated until the transmission of the code is completed.

With the two relays R860 and R910 operated, the return signal lamp 20e provided at the calling operator position No. 2 is energized in accordance with the ground pulses transmitted over the first floor code lead C971 by the code interrupter 900, operating in conjunction with the coding relay R960. In this regard, it is again pointed out that the code interrupter 900 is substantially similar in arrangement to the code interrupter 570, in that one ground pulse is transmitted over the first floor code lead C971, two ground pulses are transmitted over the second floor code lead C972, three ground pulses are transmitted over the third floor code lead, etc., during each code cycle. Moreover, the arrangement of the interrupter is such that the single pulse transmitted over the first floor code lead C971 during each code cycle coincides with the transmission of the first pulse over each of the other four code leads. Each time a ground pulse is transmitted over the fifth floor lead C975, the coding relay R960 operates and closes its contacts 961 to complete the prepared locking circuit for the first floor relay R910. At its contacts 962, the relay R960 completes a path including the grounded first floor code lead C971 and the contacts 913 and 912 for short-circuiting the lower winding of the first floor relay R910. Incident to this operation, ground potential is impressed directly upon the return signal lead C333 over the previously traced path, whereby energization of the return signal lamp 20e is substantially increased. At the end of the first ground pulse of each code cycle, the relay R960 restores and opens its contacts 961 and 962. At the contacts 961 the locking circuit for the relay R910 is opened. At the contacts 962 the path short-circuiting the lower winding of the relay R910 and the path for impressing ground potential directly upon the return signal conductor C333 are opened. Thus the energization of the return signal lamp 20e is decreased and this lamp is only dimly illuminated. It will be understood from the above explanation that during the second, third, fourth and fifth pulses of the code cycle in progress, ground potential is withheld from the first floor code lead C971. Thus a single flash of the lamp 20e is produced during each code cycle. This single flash serves to inform the attendant at the calling operator position No. 2 that the call has been answered in a room located on the first floor of the building. In this regard, it will be understood that if the room #213, for example, is selected, the second floor relay R920 is operated in response to the answering of the call. In such case two ground pulses are, during each code cycle, transmitted over the return signal conductor C333 to produce two flashes of the lamp 20e, whereby the attendant at the operator position No. 2 is informed that the call has been answered in a room located on the second floor of the building. Similarly, if a call is acknowledged at a selected room located on the fifth floor of the building, five flashes of the lamp 20e are produced during the return signaling operation, to indicate the floor location of the answering room.

*Camp on busy*

As pointed out previously, in the event the desired room signal 113b is busy at the time it is selected in the manner explained above, the attendant at the operator position No. 2 may dial the code select digit designating the desired code, and hold the connection until the previously established connection extending through another of the signal selectors is released. In this regard, it will be noted that the busy test relay R750 is, following the release of the relay R720 and the operation of the relay R730, locked up in a circuit which extends to ground over a path including the test wiper 815 and the contacts of certain of the relays in the other selector. When this other selector is released, ground potential is removed from the test wiper 815 to deenergize the busy test relay R750. Upon restoring, the relay R750 closes its contacts 755 to impress ground potential upon the test contact engaged by the test wiper 815, and closes its contacts 756 to impress ground potential upon the interrupter start lead C592, whereby operation of the interrupter 570 is initiated. At its contacts 757, the relay R750 opens the previously traced circuit for transmitting ground pulses to the assign lamp 20d, whereby the flashing of this lamp is discontinued to indicate to the attendant at the operator position No. 1 that the busy condition of the selected room signal has been terminated. At its contacts 754, the relay R750 opens another point in its own locking circuit. At its contacts 753, the relay R750 opens the path short-circuiting its upper winding. At its contacts 752, the relay R750 completes the previously traced operating circuit for the ring start relay R850. At its contacts 751, the relay R750 further prepares the operating circuit for the pickup relay R780. Following the release of the busy test relay R750 to perform the operations just described, the transmission of the selected code to the room signal 113b may proceed in the exact manner described above.

Holding the call

If for any reason the attendant at the operator position No. 2 desires to hold the connection set up through the signal selector 20 to the room signal 113b, either during the transmission of the selected code to this signal or after the call has been acknowledged, she may do so by operating the dial key 20c to the position wherein the contact springs 305 are disengaged, the contact springs 306 are engaged and the contact springs 307 are disengaged. It will be noted that when the key 20c is thus operated and, more specifically, when the contact springs 306 are moved into engagement, an alternative circuit extending by way of the dial conductor C330 of the trunk 20a is completed for holding the line relay R630 in its operated position. After this alternative circuit is completed the contact springs 307 are disengaged to interrupt the initially traced operating circuit for the line relay R630. At the contact springs 305, a point is opened in the circuit over which the release of the signal selector 20 may be effected in the manner explained below. It will also be noted that after the dial key 20c has been operated to its hold position the calling device 235 is no longer associated with the signal selector 20 and its incoming trunk 20a, and may be used for setting up a connection to another room signal through another of the signal selectors. It will also be noted that the operation of the dial key 20c to its hold position in no way affects the supervisory circuits extending to the assign lamp 20d and the return signal lamp 20e. Accordingly, any operations which occur in the operated signal selector 20, such, for example, as the acknowledgment of the call, are indicated at the operator position No. 2 through appropriate control of one of the two lamps 20d and 20e. Obviously, the dial key 20c may be returned to its call position after having been operated to its hold position, without in any way influencing the connection as set up through the signal selector 20.

Release

The arrangement of the signal selector 20 is such that it may be released under the control of the attendant at the operator position No. 2 any time during the dialing operation. In order to release the connection prior to the dialing of the fourth digit, the attendant at the operator position No. 2 simply restores the dial key 20c to the position illustrated in the drawings. In response to this operation the contact springs 304 are disengaged to interrupt the previously traced circuit for energizing the line relay R630. In releasing, this relay opens its contacts 632 to deenergize the hold relay R640, and closes its contacts 631 to transmit a current pulse to one of the transfer relays and one of the operating magnets 817, 746, 715 and 705, in the manner previously explained. The hold relay R640, upon restoring, opens its contacts 642 to interrupt one of the paths over which ground potential is impressed upon the release conductor C677. At its contacts 645, the relay R640 reprepares the operating circuit for the assign relay R610. At its contacts 641, the relay R640 completes a circuit for energizing in succession the release magnets of the operated minor and Strowger switching mechanisms.

Assuming that no digits have been dialed at the operator position No. 2, the operating magnet 817 is operated to rotate the wipers 814 to 816, inclusive, one step, incident to the release of the line relay R630. Accordingly, the release circuit as initially completed extends from ground by way of the contacts 631, 641 and 661, C672, the off-normal springs 827, C775, the off-normal springs 709 and 747, C790, the off-normal springs 819, and the winding of the release magnet 818 to battery. In the event one or two digits have been dialed, the wipers of the Strowger switching mechanism are either moved off-normal incident to the release of the line relay R630 or already occupy an off-normal position at the time this relay restores. Accordingly, the release circuit as first completed extends through the off-normal springs 746 and the winding of the release magnet 745 to battery. When the magnet 745 is energized in this circuit it attracts its associated holding pawl, whereby the wiper carriage structure of the Strowger switching mechanism is restored to rotary and vertical normal, in the usual manner. Incident to the normalizing of this structure, the off-normal springs 746 are disengaged to deenergize the release magnet 745, and the off-normal springs 747 are moved into engagement to energize the release magnet 818. Also, during the release of the Strowger switching mechanism the rotary off-normal springs 718 are engaged to reprepare the operating circuit for the transfer relay R720; the rotary off-normal springs 719 are disengaged to open a point in the operating circuit for the relay R730; the off-normal springs 717 are disengaged to open a point in the operating circuit for the transfer relay R720; and the off-normal springs 716 are engaged to prepare the operating circuit for the transfer relay R710. When the release magnet 818 is energized, it attracts its associated holding pawl, whereby the wipers 814, 815 and 816 are restored to normal. Incident to the release of these wipers, the off-normal springs 819 are opened to deenergize the magnet 818; the off-normal springs 820 are disengaged to open a point in the previously traced locking circuits for the pickup relay R780 and the return signal relay R860; and the off-normal springs 821 are moved into engagement to reprepare the locking circuits for the assign relay R610 and the transfer relay R650. If the transfer relay R650 is operated at the time the release of the selector 20 is effected, this relay is deenergized and restores in response to the release of the group selecting switch 810, in the manner just explained. With the two relays R640 and R650 in their respective restored positions, the release conductor C677 is disconnected from ground, whereby any operated ones of the other relay embodied in the signal selector 20 are caused to restore in a manner clearly apparent from the above explanation. Thus the signal selector 20 is fully released.

In the event three digits have been dialed by the attendant at the operator position No. 2 at the time the dial key 20c is actuated to its release position, the wipers of the code selecting switch 700 are moved off-normal incident to the release of the line relay R630. Accordingly, the release circuit as initially completed by the hold relay R640 extends through the off-normal springs 708 and the winding of the release magnet 706 to battery. When thus energized the magnet 706 attracts its associated holding pawl to permit the release of the wipers 703 and 704. As these wipers are returned to normal, the off-normal springs 708 are opened to deenergize the magnet 706; the off-normal springs 709 are closed to extend the release circuit to the release magnet 745; and the off-normal springs 707 are disengaged to open a point in the operating circuit for the interrupter start relay R740. From this point on the release of the selector proceeds in the manner described in the preceding paragraph.

In the event the dial key 20c is actuated to its release position after the code transmission is started but before it is completed, the transmission of the selected code to the selected room signal 113b is continued until the full complement of three code cycles is completed. In this case the Strowger switching mechanism of the signal selector 20 is off-normal; the group selecting switch 810 is off-normal; the code selecting switch 700 is off-normal; and the ringing cycle counting switch 822 may or may not be off-normal. Further, the transfer relay R710 and the returned signal relay R760 occupy their respective restored positions and the ring start relay R850 is operated. Accordingly, when the line relay R630 releases in response to the actuation of the dial key 20c to its release position, a circuit is completed for energizing the release relay R660, this circuit extending from ground by way of the contacts 631, 642 and 651, C671, the contacts 711, C777, the contacts 853 and 861, C678, and the winding of R660 to battery. When energized in this circuit, the relay R660 operates and opens its contacts 662 further to interrupt the operating circuit for the hold relay R640. At its contacts 663, the relay R660 completes the prepared locking circuit for the hold relay, this circuit extending from ground by way of the contacts 851, C673, the contacts 663, the winding of R640, C674, and the contacts 761 to battery. At its contacts 661, the relay R660 opens a point in the common portion of the operating circuits for the four release magnets 706, 745, 818 and 825. At its contacts 664, the relay R660 opens the established locking circuit for the trunk relay R820, causing the latter relay to release.

With the two relays R640 and R660 operated, the transmission of the selected code to the selected room signal 113b may continue until the three code cycles have been counted through operation of the counting switch 822. At the end of the third code cycle the ring start relay R850 is deenergized and restores in the manner previously explained. This relay, in releasing, opens its contacts 851 to deenergize the hold relay R640. When the latter relay restores it opens its contacts 642 to deenergize the release relay R660. The relay R660, upon restoring, closes its contacts 661 to energize the release magnet 825 over a circuit which extends from ground by way of the contacts 631, 641 and 661, C672, the off-normal springs 826 and the winding of the magnet 825 to battery. When thus energized the magnet 825 attracts its holding pawl, permitting the wiper 823 to be restored to normal. Incident to the release of this wiper, the off-normal springs 826 are disengaged to deenergize the magnet 825 and the off-normal springs 827 are engaged to extend the release circuit over the conductor C775 and through the off-normal springs 708, whereby the release magnet 706 is energized. From this point on the remaining equipment of the selector 20 is released in the exact manner described above.

In order to release the signal selector 20 after the return signal is received at the operator position No. 2, the attendant at this position actuates the dial key 20c to its release position. In this case the ring start relay R850 occupies its restored position, so that the circuit for energizing the release relay R660 is held open at the contacts 853. Accordingly, the hold relay R640 is immediately deenergized in response to the restoration of the line relay R630. Hence, the release of the signal selector may proceed in the exact manner outlined in the preceding paragraphs.

At any time prior to the operation of the return signal relay R660 to transmit a return supervisory signal to the operator position No. 2, the attendant at this position may effect the immediate release of the signal selector 20 without restoring the dial key 20c to normal, by momentarily operating the release key 300. In response to this operation a circuit is completed for energizing the release relay R760, this circuit extending from ground by way of the contacts of the key 300, the contact springs 305 and 304, the return signal conductor C333, the contacts 625, C1191, the contacts 864, C792, and the lower winding of R760 to battery. When energized in this circuit, the relay R760 locks to ground over a path including its upper winding, the contacts 762, C791 and the off-normal springs 820. At its contacts 761, the relay R760 opens the operating and locking circuits for the hold relay R740. The latter relay, upon restoring, initiates the release of the selector in a manner clearly apparent from the preceding explanation. From this explanation it will be recalled that the group selecting switch 810 is the last of the switching mechanisms to be released. Incident to the release of this switch, the off-normal springs 820 are disengaged to interrupt the locking circuit for the release relay R760. Thus the release of the relay R760 is delayed until all other release operations have been effected in the signal selector. From this explanation it will also be recalled that the trunk relay R620 is deenergized and restores when ground potential is disconnected from the release conductor C677. Upon restoring, the relay R620 opens its contacts 623 to deenergize the line relay R630. Following the release of the group selecting switch 810, in the manner previously explained, the assign relay R610 is conditioned for reoperation to reassign the signal selector 20 for use in response to the next operation of the allotter start relay R500. In this regard, it will be understood that if the dial key 20c is held in its call position following the release of the release key 300 by the attendant at the operator position No. 2, the signal selector 20 may be reseized due to the immediate reoperation of the assign relays R610 and R600.

Assuming that the apparatus illustrated in Fig. 9 of the drawings is utilized for transmitting a coded return signal to a calling one of the operator positions, the release of the operated one of the floor relays is effected incident to the release of a selector with which it is operatively associated. Thus in the case considered above, the first floor relay R910 is, following the operation of the return signal key 113a, locked energized in series with the upper winding of the relay R860 after the return signal key 113a is operated. This locking circuit may be opened at the contacts 665 in the event the release relay R660 is operated to initiate the release of the signal selector 20, in the manner explained above. This locking circuit may also be opened at the off-normal springs 828 incident to the restoration of the ringing cycle counting switch 822 during the release of the signal selector 20. When the established locking circuit for the first floor relay R910 is opened at either of the two indicated points, this relay is either immediately deenergized or is deenergized at the end of the signal period in progress. Thus, if the coding relay R960 is operated at the time the locking circuit for the relay R910 is opened, the latter relay remains operated until the coding relay restores to open its contacts 961 and thus deenergize the upper winding of the relay R910. On the other hand, if the locking circuit for the relay R910 is opened in the selector 20 during a spacing interval between two signal periods, this relay immediately restores.

The manner in which the other signal selectors 21, 22 and 23 may be controlled by the attendant at the operator position No. 2 to select a room signal and to transmit any one of the ten available codes to the selected signal, is exactly the same as described above with reference to the operation of the signal selector 20. In this regard, it will be understood that the signal selector 23, for example, is arranged to be controlled over the dial and return signal conductors of the trunk 23a through operation of the dial key 23c, the calling device 235 and the release key 300. It will also be understood that the assign lamp 23d and the return signal lamp 23e are controlled over the assign, ring and busy and return signal conductors of the trunk 23a from the selector 23 to produce the supervisory signals described above, as a connection is routed through the selector 23 to a desired one of the room signals, the selected room signal is tested, the selected code is transmitted to the signal, and the call is answered in the room where the selected room signal is located. The trunks 21a and 22a, individual to the signal selectors 21 and 22, terminate at the operator position in dial keys identical with the keys 20c and 23c, and each thereof includes the same four control and supervisory leads as do the illustrated trunks 20a and 23a. Further to consider the manner in which the assign lamps individual to the four trunks are controlled, it may be pointed out that even though a signal selector is idle, the associated assign lamp is not energized until the selector is set up for use. Thus, it will be noted from a consideration of the selector 20 that the assign relays R600 and R610 are only operated when this selector is set up for use by the allotter No. 2. With the assign relay R600 in its restored position, the contacts 601 are open, so that the assign lead C331 is disconnected from ground. Accordingly, the assign lamp 20d is not energized. Thus it will be understood that the one of the assign lamps 20d, 23d, etc. which is energized, identifies the selector which has been preselected for use. Should the attendant at the operator position No. 2 attempt to seize the selector 20, for example, at a time when this selector is occupied with a call originating at another of the operator positions, the assign lamp 20d is intermittently energized to signal the attendant at this position that the selector 20 is busy. In this regard, it will be recalled from the preceding explanation that when this selector is seized the two assign relays R600 and R610 are immediately deenergized and restore. It will also be recalled that after the first digit is dialed into the signal selector 20, the transfer relay R650 is released. If, with the apparatus in this condition, the attendant at the operator position No. 2 actuates the dial key 20c to its call position, a circuit is immediately completed for energizing the lamp 20d in series with the lower winding of the relay R530, this circuit extending from ground by way of the lower winding of R530, the busy flash lead C553, the contacts 655 and 626, the ring and busy conductor C332, the contact springs 302 and the filament of the lamp 20d to battery. When energized in this circuit, the relay R530 closes its contacts 531 to impress ground potential upon the busy interrupter start lead C551, whereby operation of the two pulsing relays R510 and R520 is initiated. At its contacts 532, the relay R530 prepares a circuit for connecting its low resistance upper winding in parallel with its high resistance lower winding. This path is completed at the contacts 521 each time the relay R520 restores during an operating cycle of the two pulsing relays. Incident to the completion of this path the current traversing the filament of the assign lamp 20d is materially increased so that this lamp is more brightly illuminated. It will be understood, therefore, that as the two pulsing relays R510 and R520 continue to operate, a flicker is produced in the illumination of the lamps 20d, which serves to signal the attendant at the operator position No. 2 that the signal selector 20 is busy.

TRUNK CALL FROM OPERATOR POSITION
No. 1 TO ROOM #113

In considering the manner in which the room signals in the building No. 2 may be selected and controlled from the operator position No. 1 in building No. 1, it may be assumed that the signal selector 20 has been preselected for use through operation of the allotter No. 2. Under these circumstances, the two assign relays R600 and R610 and the transfer relay R650 are operated in the signal selector 20. Also, the start relay R500 of the allotter occupies its restored position so that a circuit is completed for energizing the assign lamp 14d individual to the trunk 14. This circuit extends from ground by way of the contacts 505, C556, the chain-connected contacts 1141, 1131, 1121, 1111 and 1101, the resistor 1105, the assign conductor C1752, the contact springs 1701, and the filament of the lamp 14d to battery. Due to the action of the current limiting resistor 1105, the lamp 14d is only dimly illuminated when energized in this circuit.

With the apparatus in this condition, the signal selector 20 may be seized from the operator position No. 1 by actuating the dial key 14c to its call position. In response to this operation the contact springs 1701 are disengaged to deenergize the assign lamp 14d. At the contact springs 1702 alternative supervisory circuits commonly including the ring and busy conductor C1753 are prepared over which the assign lamp 14d may be controlled. At the contact springs 1704 a circuit including the contacts of the release key 1800 is prepared for releasing the signal selector after it has been seized. At the contacts 1703 a circuit is completed for energizing the allotter relay R1110 individual to the signal selector 20 in series with the line relay R630 of this selector. This circuit extends from ground by way of the pulsing springs 1737 of the calling device 1735, the contact springs 1703 and 1707, the dial conductor C1751, the chain-connected contacts 1114, 1124, 1134 and 1144, the upper winding of R1110, the start lead C1193 individual to the trunk 20b, the contacts 603, 613 and 654, and the winding of R630 to battery. When energized in this circuit, the relay R1110 first closes its preliminary make contacts 1116 to complete a locking circuit for itself, this circuit extending from ground by way of the contacts 653, 664 and 621, the hold lead C1194, the contacts 1156 and 1116, and the lower winding of R1110 to battery. After this circuit is completed, the relay R1110 opens its contacts 1114 to interrupt its operating circuit. At its contacts 1115, the relay R1110 completes an alternative and more direct circuit for energizing the line relay R630, this circuit extending from the grounded dial conductor C1751 by way of the contacts 1115, the dial lead C1192 and the winding of R630 to battery. Thus the line relay R630 is rendered directly controllable by the calling device 1735 provided at the operator position No. 1.

In operating, the allotter relay R1110 also opens its contacts 1111 further to interrupt the above-traced circuit for energizing the assign lamp 14d. At its contacts 1112, the relay R1110 further prepares the above-mentioned circuit including the ring and busy conductor C1753 over which the assign lamp 14d may be controlled. At its contacts 1113, the relay R1110 prepares a circuit including the return signal conductor C1754, over which the return signal lamp 14e may be controlled. It will be noted that following the operation of the allotter relay R1110, the signal selector 20 is connected to be controlled by the trunk circuit equipment individual to the trunk 14 at the operator position No. 1, in a manner which is in all respects similar to that described above with reference to the trunk circuit equipment associated with the trunk 20a and provided at the operator position No. 2. Accordingly, the call may be extended through the signal selector to the desired room signal 113b under the control of the calling device 1735 in the exact manner explained above with reference to the call originating at the operator position No. 2. In this regard, it will be noted that the trunk relay R620 is not operated on a trunk call of the character under consideration. Accordingly, the return signal conductor C333 of the trunk 20a is disconnected from the return signal lead C1191 of the selector. Also, the ring and busy conductor C332 of the trunk 20a is disconnected from the ring and busy lead C1190 of the selector. The purpose of this arrangement is to prevent the transmission of supervisory signals over the trunk 20a as the setting up of the connection to the desired room signal 113b progresses. In this regard, it will be noted that if the desired room signal is busy a circuit for intermittently energizing the lamp 14d is completed in the selector incident to the operation of the relay R730, this circuit extending from the pulsing lead C554 by way of the contacts 757 and 736, the ring and busy lead C1190, the contacts 1112, C1753, the contact springs 1702, and the filament of the lamp 14d to battery. On the other hand, if the selected room signal is idle, the start ringing supervisory signal is transmitted to the operator position No. 1 incident to the operation of the ring start relay R850. In this case the lamp 14d is energized to produce a steady indication over a circuit which extends from ground by way of the contacts 855, C796, the contacts 736, C1190, the contacts 1112, C1753, the contact springs 1702 and the filament of the lamp 14d to battery. From a consideration of this circuit, it will be noted that when the ring start relay R850 restores at the end of the code transmission, the contacts 855 are opened to deenergize the lamp 14d and thus signal the attendant at the operator position No. 1 that the code transmission has been completed.

The character of the return signal which is transmitted to the operator position No. 1 when the call is answered or acknowledged depends upon the wiring arrangement utilized in the selector and the character of the equipment associated with the return signal keys in the various rooms. Assuming that the illustrated "Y" wiring arrangement is utilized, a steady return signal is produced at the operator position No. 1 incident to the operation of the return signal relay R860 which occurs when the return signal key 113a is operated. In this case the circuit for energizing the return signal lamp 14e extends from ground by way of the contacts 863, the return signal lead C1191, the contacts 1113, C1754, and the filament of the lamp 14e to battery. On the other hand, if the illustrated "X" wiring arrangement is used, the energization of the lamp 14e is intermittently varied in accordance with the code designating the floor location of the answering room, after the return signal relay R860 operates. In this case the circuit for directly energizing the lamp 14e extends from the grounded first floor code lead C971 by way of the contacts 962 and 913, C872, the wipers 804 and 816, C682, the contacts 665, C679, the contacts 854 or the off-normal springs 828, the contacts 863, the return signal lead C1191, the contacts 1113, the return signal conductor C1754, and the filament of the lamp 14e to battery.

In the event the desired room signal is busy at the time it is selected through the signal selector 20, the attendant at the operator position No. 1 may maintain the dial key 14c in its call position to camp on the selected signal until the previously established connection extending to this signal is released. After the earlier established connection is cleared out, the transmission of the selected code to the room signal 113b proceeds in the exact manner described above with reference to the call originating at the operator position No. 2. Also, the attendant at the operator position No. 1 may hold the connection and free the calling device 1735 for use in setting up other connections by operating the dial key 14c to its hold position. Incident to this operation the contact springs 1706 are closed to complete an alternative circuit for energizing the line relay R630, this circuit extending from ground by way of the contact springs 1706, the dial conductor C1751, the contacts 1115, C1192 and the winding of R630 to battery. After this circuit is completed the contact springs 1707 are opened to interrupt the initially completed circuit for energizing the line relay R630. Thus the calling device 1735 is disassociated from the signal selector 20 and may be used for directing the operation of another signal selector. At the contact springs 1705 a point is opened in the circuit, traced below, over which the release relay R760 may be energized to initiate the release of the signal selector 20.

The manner in which the signal selector 20 is released under the control of the attendant at the operator position No. 1 is exactly the same as described above with reference to the release of this selector as effected from the operator position No. 2. In this regard, it will be noted that when the dial key 14c is actuated to the release position illustrated in the drawings, the contact springs 1703 are disengaged to deenergize the line relay R630, whereby the release of the selector is either immediately initiated or the selector is prepared for release at the end of the code transmission.

In the event the code transmission is in progress at the time the dial key 14c is restored to normal, the release of the line relay R630 results in the energization of the release relay R660 in the manner previously described. In operating, the relay R660 completes the previously traced locking circuit for the hold relay R640 and opens its contacts 664 to disconnect the hold lead C1194 from ground. When ground potential is removed from this lead the operated allotter relay R1110 is deenergized and restores to disconnect the conductors of the trunk 20b from the conductors of the trunk 14 extending to the operator position No. 1. The relay R660 remains operated until the code transmission in progress is completed, at which time the ring start relay R850 restores to initiate the release of the selector 20, in the manner previously explained.

In the event the code transmission has not started, or has been completed at the time the dial key 14c is restored to normal, the operating circuit for the release relay R660 is open at the contacts 853 at the time the line relay R630 restores. Accordingly, no holding circuit is provided for the hold relay R640 and this relay is immediately released to initiate the restoration of the selector 20 in the manner pointed out above. It will be observed from the above explanation that the operated allotter relay R1110 is, in the last-mentioned case, held energized until the release conductor C677 is disconnected from ground by the hold relay R640. After the relay R1110 restores, the allotter equipment is in a condition such that another preselected one of the four signal selectors 20 to 23, inclusive, may immediately be seized through operation of the dial key 14c to its call position. This seizure of another of the selectors 20, 21, 22 and 23 may be effected before the illustrated signal selector 20 is fully restored to normal. In the event the signal selector 20 is the only available idle selector, the reoperation of the dial key 14c results in the reseizure of the signal selector 20, after it has been fully released and then reassigned for use in the manner explained below. In this regard, it will be noted that the start lead C1193 is held open-circuited at the contacts 603 until the two assign relays R600 and R610 are reoperated in this signal selector.

In the event the attendant at the operator position No. 1 desires to utilize the release key 1800 to effect an immediate release of the signal selector 20, this key is momentarily operated to its off-normal position, wherein a circuit is completed for energizing the release relay R760. This circuit extends from ground by way of the contacts of the key 1800, the release conductor common to the various dial keys, the contact springs 1705 and 1704, the return signal conductor C1754, the contacts 1113, the return signal lead C1191, the contacts 864, C792, and the lower winding of R760 to battery. In operating, the relay R760 locks up in a circuit including the contacts 762, C791 and the off-normal springs 820, and opens its contacts 761 to deenergize the hold relay R640. Thus the release of the selector is initiated in the manner previously described.

The manner in which the other three signal selectors 21, 22 and 23 provided in building No. 2 may, when assigned for use through operation of the allotter No. 2, be controlled from the operator position No. 1 to select and selectively energize any desired room signal in building No. 2, is exactly the same as described above with reference to the selection and control of the signal selector 20 from this operator position. In this regard, it will be recalled that the four connect relays R1110, R1120, R1130 and R1140 are individual to the four signal selectors 20, 21, 22 and 23. Each of these relays, when operated, serves to connect the control and supervisory leads of the trunk 14 to the control and supervisory leads of the trunk 20b, 21b, 22b or 23b which extends to the associated selector. Moreover, the one of these relays which is energized in response to the operation of the dial key 14c depends upon which of the four signal selectors is set up or allotted for use in building No. 2. Thus if the first signal selector 20 is busy and the selector 21 is set up for use at the time the dial key 14c is operated, the relay R1120 individual to the second selector 21 is energized. The operating circuit for this relay may partially be traced as extending from ground by way of the pulsing springs 1737, the contact spring 1703 and 1707, the dial conductor C1751, the chain-connected contacts 1114, 1124, 1134 and 1144, the upper winding of R1120, the start lead of the trunk 21b extending to the signal selector 21, and the winding of the line relay in this signal selector to battery. If the third signal selector 22 is preselected for use at the time the dial key 14c is operated, the third connect relay R1130 is energized in series with the line relay of the signal selector 22 over a circuit which includes the grounded dial conductor C1751 by way of the chain-connected contacts 1114, 1124, 1134 and 1144, the upper winding of R1130 and the start lead of the trunk 22b extending to the signal selector 22. Similarly, if the fourth signal selector 23 is set up for use at the time the dial key 14c is operated to initiate a call, the relay R1140 is energized in series with the line relay of the signal selector 23 over a circuit which includes the grounded dial conductor C1751, the contacts 1114, 1124, 1134 and 1144, the upper winding of R1140 and the start lead of the trunk 23b extending to the signal selector 23. It will be noted that any one of the four relays R1110, R1120, R1130 and R1140, upon operating, opens at the respective upper break contacts thereof a point in the chain circuit for energizing the assign lamp 14d. Moreover, each of these relays includes contacts for connecting the ring and busy, dial and return signal leads of the associated trunks 20b, 21b, 22b and 23b to the ring and busy, dial and return signal leads of the trunk 14 extending to the operator position No. 1. It will also be noted that only one of the four enumerated connect relays may be operated at any one time, the operating circuits for these relays commonly extending through the chain-connected break contacts 1114, 1124, 1134 and 1144.

The four relays R1150, R1160, R1170 and R1180, which also individually correspond to the four selectors 20, 21, 22 and 23 provided in the building No. 2, function selectively to associate idle ones of these selectors with the trunk 34 extending to the operator position No. 3 provided in building No. 3. Thus it will be noted that these four relays may be selectively energized over the dial lead of the trunk 34 in accordance with the idle or busy condition of the four selectors 20, 21, 22 and 23. The operating circuits for these relays respectively include the windings of the line relays respectively provided in the associated selectors and commonly including the chain-connected contacts 1154, 1164, 1174 and 1184. Each of these relays, when operated, functions to connect the three control leads of the associated trunk to the corresponding leads of the trunk 34. Thus, with the relay R1150 operated, for example, the ring and busy conductor C1190 is connected through the make contacts 1152 to the ring and busy conductor of the trunk 34; the return signal lead C1191 is connected through the make contacts 1153 to the return signal conductor of the trunk 34; and the dial lead C1192 is connected through the make contacts 1155 to the dial conductor of the trunk 34. Any one of the four connect relays R1150, R1160, R1170 and R1180, upon operating, also functions to open the circuit over which the assign lamp individual to the trunk 34 and provided at the operator position No. 3 is normally energized. Thus it will be noted that this circuit which extends by way of the assign conductor of the trunk 34, also includes the chain-connected break contacts 1151, 1161, 1171 and 1181 of the indicated relays. Each relay, in operating, also locks up in a holding circuit which includes the hold lead of the trunk extending to the associated selector. For example, the relay R1150, upon operating, locks to the grounded hold lead C1194 over a path including its preliminary make contacts 1157. It will be understood from the above brief consideration of the four connect relays R1150, R1160, R1170 and R1180, that these relays are controlled from the operator position No. 3 selectively to connect the conductors of the four trunks 20b, 21b, 22b and 23b to the trunk 34 in the same manner that the four connect relays R1110, R1120, R1130 and R1140 are controlled from the operator position No. 1 selectively to connect the four enumerated trunks to the trunk 14.

Figure 10:
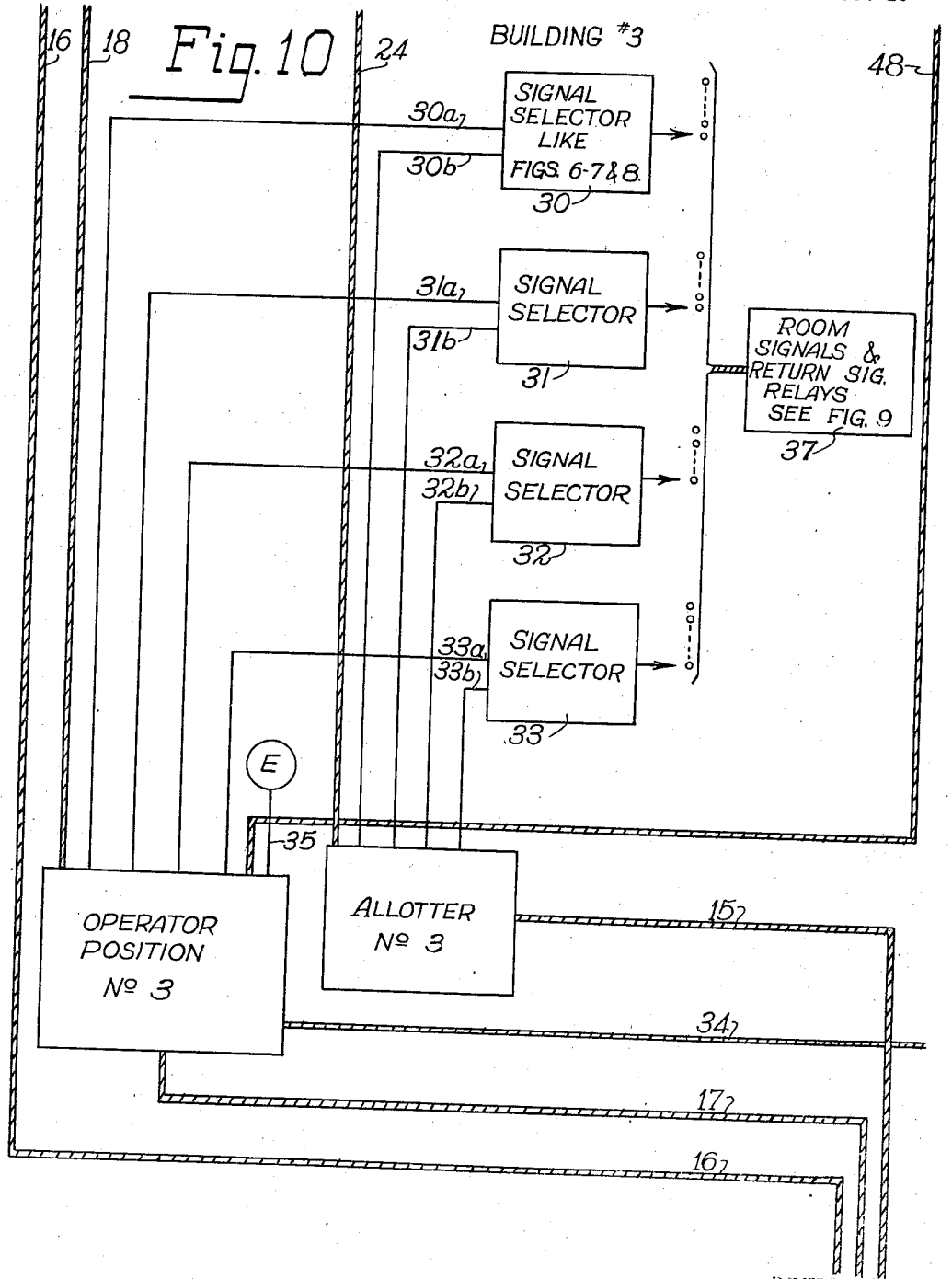
Figure 11:
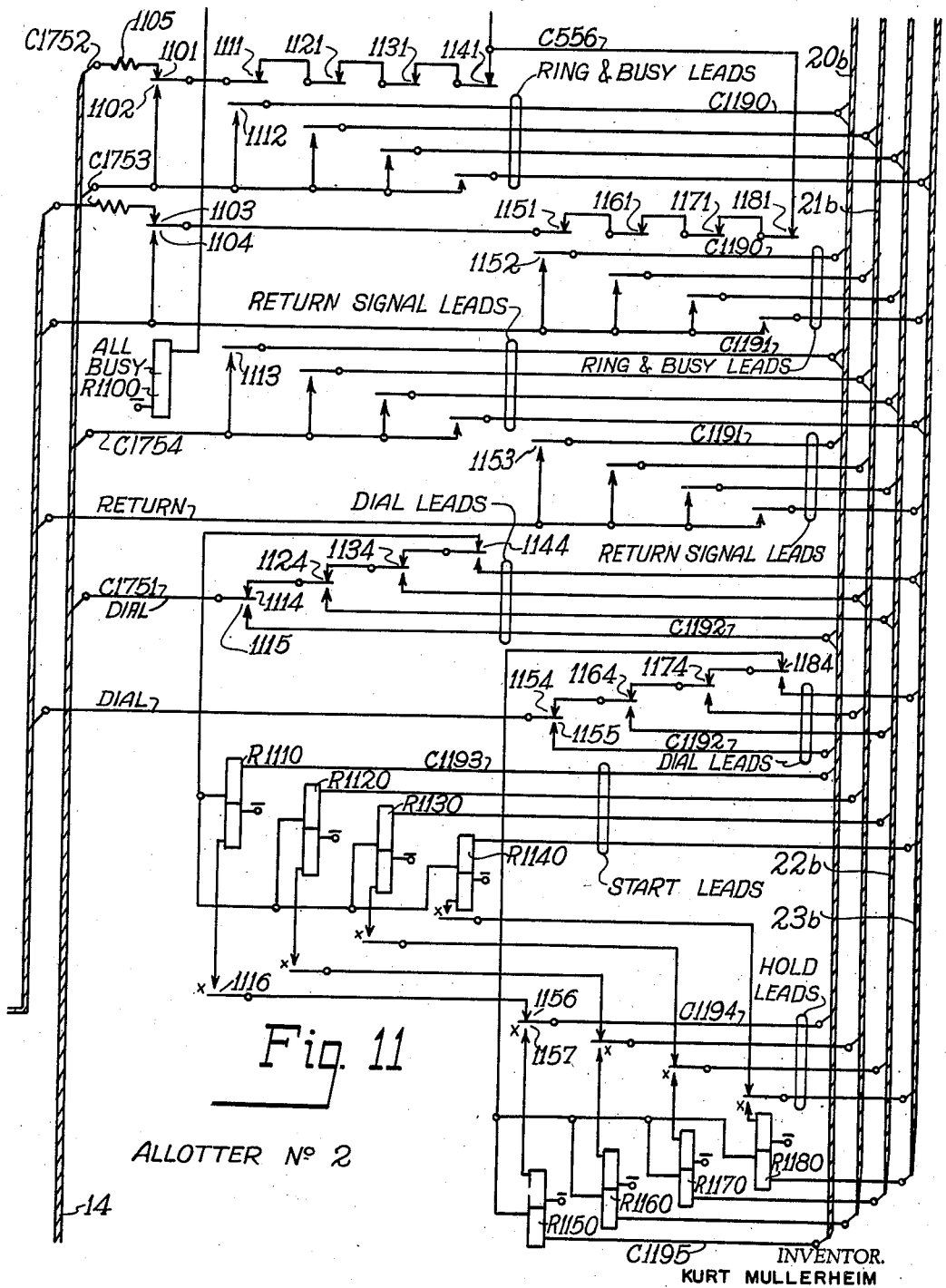
Figure 12:
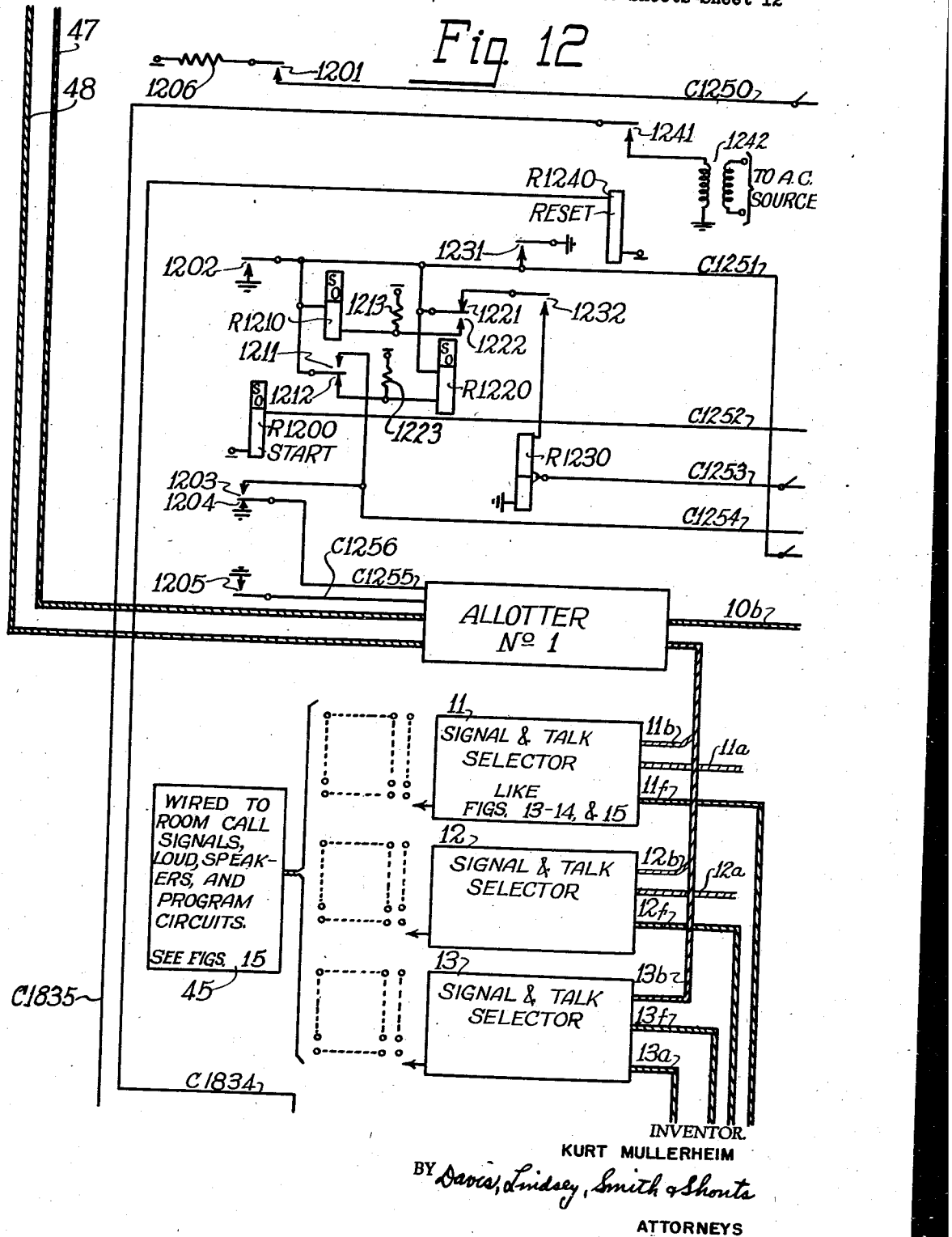

The manner in which the attendant at the operator position No. 1 and the attendant at operator position No. 2 may obtain access through the allotter No. 3, schematically illustrated in Fig. 10 of the drawings, to the signal selectors 30, 31, 32 and 33 provided in building No. 3, for the purpose of selecting and selectively controlling the room signals of this building, is exactly the same as described above with reference to the control of the selectors 20, 21, 22 and 23 through the allotter No. 2 from the operator position No. 1 and the operator position No. 3. In this connection it will be understood that the signal selectors 30, 31, 32 and 33 of building No. 3 are rendered accessible to the operator position No. 1 over the trunk 15 which terminates at this operator position in the contacts of the dial key 15c. It will also be understood that these selectors are accessible through the allotter No. 3 to the attendant at the operator position No. 2 over the trunk 24 which terminates at this operator position in the contacts of the dial key 24c.

ALLOTTING THE SIGNAL SELECTORS OF BUILDING NO. 2 FOR USE

Referring now more particularly to the manner in which the signal selectors 20, 21, 22 and 23 are preselected for use, it is pointed out above that the start conductor C552 over which the slow-to-operate start relay R100 is controlled extends through chain-connected break contacts of an assign relay in each of the four selectors. More specifically, the assign relay R610 of the illustrated selector 20 includes the break contacts 615 which form a part of the indicated contact chain. The corresponding assign relays of the other selectors also include break contacts forming a part of this contact chain. It will also be recalled from the preceding explanation that when the selector 20 is seized, the two assign relays R600 and R610 are deenergized and restore. When all four of the R610 assign relays are released, the start relay R500 is energized over a circuit which includes the start conductor C552 and the completed contact chain. In operating, the relay R500 closes its contacts 502 to initiate the operation of the two pulse generating relays R510 and R520. At its contacts 505, the relay R500 disconnects the assign conductors of the two trunks 14 and 34 from ground, whereby the assign lamps individual to these trunks and respectively provided at the operator position No. 1 and the operator position No. 3 are deenergized. At its contacts 503, the relay R500 completes a circuit including the conductor C555 for energizing the all-busy relay R1100. At its contacts 504, the relay R500 prepares circuits for transmitting ground pulses over the ring and busy supervisory conductors of the trunks 14 and 34, respectively. At its contacts 501, the relay R500 connects the conductor C550 through the resistor 506 to the negative terminal of the system battery, thereby to energize the R610 assign relays of the selectors 20, 21, 22 and 23 which are idle. In this regard, it will be recalled that during each interval when the signal selector 20 is busy, the hold relay R540 thereof is operated and the group selecting switch 810 is off-normal. Accordingly, the operating circuit for the assign relay R610 is held open at the break contacts 645 and the off-normal springs 821. Thus, the assign relay R610 is prevented from operating in response to the operation of the start relay R500. If, however, the signal selector 20 is idle at the time the start relay R500 operates, the upper winding of the assign relay R610 is energized in a circuit which may be traced as extending from ground by way of the off-normal springs 821, C681, the contacts 645 and 612, the upper winding of R610, C550, the contacts 501 and the resistor 506 to battery. When its upper winding is thus energized, the relay R610 locks up in a circuit which extends from ground by way of the off-normal springs 821, C681, the contacts 645 and 611, and the lower winding of R610 to battery. After this locking circuit is completed the relay R610 opens its contacts 612 to interrupt its operating circuit as traced above. In a manner clearly apparent from the above explanation, the R610 assign relays provided in the idle ones of the other three selectors are operated; and the R610 assign relays of the busy selectors are prevented from operating. Immediately one of the R610 assign relays operates, the contact chain included in the operating circuit for the relay R500 is broken. Thus the relay R610, upon operating, opens its contacts 615 to break one point in the contact chain, thereby to deenergize the start relay R500.

In operating, the relay R610 also closes its contacts 614 to complete the operating circuit for its associated assign relay R600. In this regard, it will be understood that the operating circuits for the R600 assign relays of the other selectors extend through the break contacts of the contact chain. This circuit is, accordingly, broken at the contacts 615 incident to the operation of the assign relay R610, assuming that the latter relay is energized in response to the operation of the relay R500. On the other hand, if the selector 20 is busy, such that the relay R510 is not operated therein in response to the operation of the relay R500, the chain circuit is carried through to the winding of the R600 assign relay of the second selector 21. This relay is thus operated to preselect the selector 21 for use, assuming that this selector is idle. More generally stated, the circuit is carried through the chain-connected break contacts of the R610 assign relays in the busy selectors to the winding of the R600 assign relay in the first idle selector. This relay, upon operating, sets up for use the selector in which it is included. Assuming that the first three selectors 20, 21 and 22 are idle at the time the start relay R500 operates, the two assign relays R600 and R610 thereof are both caused to operate in the selector 20 and only the R610 assign relays of the selectors 21 and 22 are locked operated in response to the operation of the start relay R500.

As indicated above, the start relay R500 is deenergized and restores incident to the operation of the assign relay R610 or the corresponding relay of another of the three selectors 21, 22 and 23. In releasing, the relay R500 opens its contacts 501 to interrupt the common portion of the operating circuits for the R610 assign relays; opens its contacts 502 to interrupt one of the operating circuits for the two pulsing relays R510 and R520; and opens its contacts 503 to deenergize the all-busy relay R1100. At its contacts 504, the relay R500 opens the path for transmitting ground pulses over the ring and busy supervisory leads of the two trunks 14 and 34. At its contacts 505, the relay R500 again prepares the paths for impressing ground potential upon the assign conductors of the trunks 14 and 34, these paths being completed at the contacts 1101 and 1103, respectively, incident to the release of the all-busy relay R1100.

It will be recalled from the above explanation that when the signal selector 20 is seized from one of the three operator positions, the assign relay R610 is deenergized and restores. In releasing, this relay opens its contacts 614 to deenergize the associated assign relay R500, and closes its contacts 615 to complete the operating circuit for the R600 assign relay of the next idle signal selector. Thus another of the four signal selectors 20, 21, 22 and 23 is preselected for use. The selector 21 is the first choice for selection due to the arrangement of the contact chain and, if idle, is set up for use. When the signal selector 21 is seized from one of the three operator positions, the chain circuit is extended to the R600 assign relay of the third selector 22. The last-mentioned relay, in operating, automatically preselects the signal selector 22 for use. When the R610 assign relays of all four signal selectors are again deenergized the chain circuit for energizing the start relay R500 is recompleted, whereby the above described operations are repeated.

In the event all four of the signal selectors 20 to 23, inclusive, are rendered busy at the same time, the operating circuit for the start relay R500 is completed. This relay, in operating, performs the functions described above, it being noted in this regard that the operating circuits for the R610 assign relays of the four selectors are, at this time, held open in these selectors. Accordingly, the start relay R500 remains in its operated position until one of the four selectors is released. Assuming that the selector 20 is the first one of the four selectors to be released, the operating circuit for the assign relay R610 is completed at the off-normal springs 821 incident to the release of the group selecting switch 810. This assign relay, in operating, completes the operating circuit for its associated assign relay R600, and opens its contacts 615 to deenergize the start relay R500, whereby the latter relay is released. Thus the selector 20 is set up for seizure from any one of the three operator positions.

During the period when all four of the selectors are busy, the two relays R500 and R1100 remain operated. If, with the apparatus in this condition, the attendant at the operator position No. 1 should actuate the dial key 14c to its call position in an attempt to seize one of the four selectors 20 to 23, inclusive, a circuit is completed for energizing the assign lamp 14d in accordance with the ground pulses being generated by the two pulsing relays R510 and R520. More specifically, this circuit is completed at the contacts 511 during each interval when the relay R510 is operated, and may be traced as extending from ground by way of the contacts 502, 511 and 504, the chain-connected contacts 1141, 1131, 1121, 1111 and 1102, the ring and busy conductor C1753, the contact springs 1702 and the filament of the lamp 14d to battery. The intermittent energization of the lamp 14d over this circuit serves to inform the attendant at the operator position No. 1 that the four selectors of building No. 2 are all busy. In this regard, it will be noted that with the assign relay R600 in its restored position, the two start leads C1193 and C1195 are open-circuited in this selector. A similar condition prevails in each of the other three busy selectors. Accordingly, the operation of the dial key 14c is without effect to produce the operation of any one of the four connect relays R1110, R1120, R1130 and R1140. Thus the four selectors are guarded against seizure during the all-busy period.

In a manner similar to that just described, if the attendant at the operator position No. 3 attempts to seize one of the four selectors 20 to 23, inclusive, at a time when all of these selectors are busy, the assign lamp individual to the trunk 34 and provided at this operator position, is intermittently energized over the ring and busy supervisory lead of the trunk 34 through operation of the two pulsing relays R510 and R520, whereby the attendant at this position is signaled that no idle selectors are available in building No. 2.

From a consideration of the above-traced circuit over which ground pulses are transmitted to the ring and busy conductor C1753 of the trunk 14, it will be apparent that if one of the four selectors 20 to 23, inclusive, is being held from the operator position No. 1 over the trunk 14, the generated ground pulses are ineffective to produce flashing of the lamp 14d. Thus with any one of the four connect relays R1110, R1120, R1130 and R1140 operated, the circuit for transmitting ground pulses over the ring and busy conductor C1753 is held open at the corresponding one of the four sets of break contacts 1111, 1121, 1131 and 1141. In a similar manner, if any one of the four selectors is being held from the operator position No. 3 over the trunk 34, the corresponding one of the four connect relays R1150, R1160, R1170 and R1180 is operated. With any one of the four latter relays operated, the circuit for transmitting ground pulses over the ring and busy conductor of the trunk 34 is held open at one of the four sets of break contacts 1151, 1161, 1171 and 1181. Thus, provisions are made for preventing the production of false supervisory signals by the assign lamps individual to the two trunks 14 and 34 and respectively provided at the operator position No. 2 and the operator position No. 3.

As indicated above, when the all-busy condition of the four selectors 20 to 23, inclusive, is terminated, the two relays R500 and R1100 are sequentially deenergized and restore. In releasing, the relay R1100 closes its contacts 1101 and 1103 to recomplete the high resistance paths over which ground potential is normally impressed upon the assign conductors of the trunks 14 and 34, respectively. When these paths are recompleted, the assign lamps individual to the trunks 14 and 34, and respectively provided at the operator position No. 1 and the operator position No. 3, are dimly illuminated to indicate that one or more idle selectors are available in building No. 2.

CALL FROM OPERATOR POSITION No. 1 TO ROOM #364

In considering the operation of the selective call and intercommunication facilities provided in building No. 1, it may be assumed that the attendant at the operator position No. 1 desires to signal one of the occupants of room #364. It may also be assumed that the room signal 364b provided in this room is tuned to respond to ringing current of the fourth frequency and that the seventh code is the code selected to convey the desired information to the called party. It may be assumed further that the illustrated signal selector 10 has previously been set up for use through operation of the allotter equipment associated with the signal selectors of building No. 1. Under these circumstances the two assign relays R1310 and R1320 and the transfer relay R1360 are operated in the signal selector 10. With the assign relay R1310 operated, a circuit is completed for energizing the assign signal lamp 10d provided at the operator position No. 1. This circuit extends from ground by way of the contacts 1311, the resistor 1315, the assign conductor C1832, the contact springs 1811 and the filament of the lamp 10d to battery. Due to the action of the current limiting resistor 1316, the lamp 10d is only dimly illuminated when energized in this circuit. The signal thus produced by the lamp 10d serves to inform the attendant at the operator position No. 1 that the signal selector 10 should be utilized in routing a control connection to a desired one of the room signals.

*Seizing the signal selector 10*

In order to seize the preselected signal selector 10, the attendant at the operator position No. 1 actuates the dial and talk key 10c to its call position, wherein the contact springs 1811 are disengaged and the contact springs 1812, 1813 and 1814 are respectively engaged. When the contact springs 1811 are opened the above-traced circuit for energizing the assign lamp 10d is interrupted. At the contact springs 1812, alternative supervisory circuits commonly including the ring and busy conductor C1833 are prepared for energizing the lamp 10d. At the contact springs 1814, a circuit is completed for energizing the relay R1950, this circuit extending from ground by way of the contact springs 1814 and 1815, C1832, and the winding of R1950 to battery. In operating, the relay R1950 closes its contacts 1951 to prepare a circuit traced hereinafter for releasing the selector 10. At its contacts 1952, the relay R1950 prepares the operating circuit for the switching relay R1940.

At the contact springs 1813 a circuit is completed for energizing the two relays R1330 and R1340. Initially this circuit extends from ground by way of the pulsing springs 1737 of the calling device 1735, the common dial lead, the contact springs 1813 and 1817, the dial conductor C1830 of the trunk 10a, the contacts 1334, the lower winding of R1330, the contacts 1323 and 1365, and the winding of R1340 to battery. When energized in this circuit the two relays R1330 and R1340 both operate. In operating, the relay R1330 locks to ground in a circuit including its upper winding and the contacts 1332, 1374 and 1363. After this locking circuit is completed, the relay R1330 opens its contacts 1334 and closes its contacts 1333 to exclude its own lower winding from the circuit for energizing the line relay R1340. At its contacts 1335, the relay R1330 further prepares a circuit for energizing the return signaling lamp 10e. At its contacts 1336, the relay R1330 opens one of the circuits over which supervisory signals may be transmitted by way of the ring and busy conductor C1833 to the signal lamp 10d individual to the trunk 10a at the operator position No. 1. At its contacts 1337, the relay R1330 prepares another of the supervisory circuits over which this lamp may be controlled.

The line relay R1340, upon operating, closes its contacts 1342 to complete a circuit for energizing the slow-acting hold relay R1350, this circuit extending from ground by way of the contacts 1342 and 1372, the winding of R1350, C1385 and the contacts 1461 to battery. At its contacts 1341, the relay R1340 opens a point in the common portion of the circuits over which the magnets 1307, 1308, 1407, 1438, 1408, 1415, 1474 and 1513 are respectively controlled.

The relay R1350, upon operating, closes its contacts 1352 to prepare the circuits over which impulses may be transmitted to the magnets 1307, 1407, 1415 and 1438. At its contacts 1351, the relay R1350 opens a point in the common portion of the release circuits over which the release magnets 1308, 1408, 1474 and 1513 are respectively controlled. At its contacts 1353, the relay R1350 prepares a path for impressing ground potential upon the amplifier start conductor C1969. At its contacts 1354, the relay R1350 completes an obvious multiple path for impressing ground potential upon the release conductor C1386, and in so doing completes an obvious multiple locking circuit for the trunk relay R1330. At its contacts 1356, the relay R1350 completes an alternative locking circuit for the transfer relay R1360, this circuit extending from ground by way of the off-normal springs 1309', the contacts 1356 and the lower winding of R1360 to battery. At its contacts 1355, the relay R1350 opens the established locking circuit for the assign relay R1320. When this circuit is opened the relay R1320 restores and opens its contacts 1324 to deenergize the assign relay R1310. At its contacts 1325, the relay R1320 closes a point in the chain circuit described hereinafter, over which the R1310 assign relays of the other selectors 11, 12 and 13 and the start relay R1200 of the allotter No. 1 are controlled. At its contacts 1321, the relay R1320 opens another point in its own locking circuit. At its contacts 1322, the relay R1320 reprepares its operating circuit, this circuit now being held open at the break contacts 1355 of the hold relay R1350. At its contacts 1323, the relay R1320 opens another point in the initially completed operating circuit for the two relays R1330 and R1340. The relay R1310, upon restoring, opens its contacts 1312 and 1313 to disconnect the start 1 and start 2 leads from the trunk relay R1330. At its contacts 1315, the relay R1310 opens the operating circuit for the transfer relay R1360. At its contacts 1314, the relay R1310 completes the prepared operating circuit for the transfer relay R1410, this circuit extending from the grounded release conductor C1368 by way of the off-normal springs 1416, C1392, the contacts 1314, C1390 and the lower winding of R1410 to battery.

In operating, the relay R1410 closes its contacts 1412 to prepare a circuit for energizing its upper winding in parallel with the vertical magnet 1438 during the dialing of the second digit. At its contacts 1411, the relay R1410 opens a point in the common portion of the available circuits for energizing the rotary magnet 1415, the transfer relay R1420, and the release relay R1370. At its contacts 1413, the relay R1410 opens a point in the operating circuit for the pickup relay R1480. At its contacts 1414, the relay R1410 opens a point in the incomplete operating circuit for the ring start relay R1550. Following the operation of the transfer relay R1410, the signal and talk selector 10 is conditioned to respond to the impulses of the first digit of the directory number designating the desired room signal.

*Selecting the ringing frequency*

The arrangement of the signal and talk selector 10 is such that the first digit transmitted thereto in setting up a control connection therethrough is utilized to select the particular ringing frequency which will operate the tuned room signal of the desired room. In the present case, wherein the desired room signal 364b is tuned to respond to ringing current of the fourth frequency, a first digit is dialed at the operator position No. 1 which comprises four impulses. When the dial of the calling device 1735 is moved off normal, the shunt springs 1736 are opened to interrupt the path shunting the pulsing springs 1737 and the associated radio frequency filter network. These springs are again engaged when the dial of the calling device is returned to its normal position. Incident to the return movement of the dial, the pulsing springs 1737 are opened and closed four times so that four impulses are transmitted over the dial conductor C1830 of the trunk 10a to the line relay R1340. Upon restoring at the beginning of the open-circuit period of the first impulse, the line relay R1340 opens its contacts 1342 to interrupt the operating circuit for the hold relay R1350, and closes its contacts 1341 to complete the prepared circuit for energizing the operating magnet 1307 of the frequency selecting switch 1300 in parallel with the upper winding of the transfer relay R1360. This circuit extends from ground by way of the contacts 1341, 1352 and 1362, and the parallel-connected windings of the magnet 1307 and the relay R1360 to battery. When energized in this circuit the magnet 1307 operates to step the wipers 1304, 1305 and 1306 one step from the illustrated normal positions thereof into engagement with the contacts corresponding to the first ringing frequency. Incident to this movement of the enumerated wipers, the off-normal springs 1309 are engaged to prepare the operating circuit for the release magnet 1308; the off-normal springs 1308' are engaged to prepare locking circuits for the relays R1460, R1480 and R1540; and the off-normal springs 1309' are disengaged to interrupt the above-traced circuit for energizing the lower winding of the transfer relay R1360. Due to the slow-to-release characteristics thereof, the two relays R1350 and R1360 remain operated throughout the first series of four impulses. At the end of the open-circuit period of the first impulse, the contacts 1341 are opened to deenergize the parallel-connected windings of the magnet 1307 and the relay R1360, and the contacts 1342 are reclosed to recomplete the operating circuit for the hold relay R1350. It will be understood that during each of the remaining three impulses of the digit, a current pulse is transmitted to the parallel-connected windings of the magnet 1307 and the relay R1360. Accordingly, at the end of the first digit the wipers 1305 and 1306 are left standing in engagement with their associated fourth contacts wherein the fourth ringing frequency is selected for use in energizing the desired room signal.

Shortly following the end of the first digit, the transfer relay R1360 releases. Upon restoring, this relay closes its contacts 1366 to prepare one of the supervisory circuits over which the assign lamp 10d may be controlled. At its contacts 1365, the relay R1360 opens another point in the initially completed circuit for energizing the two relays R1330 and R1340. At its contacts 1364, the relay R1360 opens one of the multiple paths over which the release conductor C1386 is connected to ground. At its contacts 1363, the relay R1360 completes a path including the contacts 1353 for impressing ground potential upon the amplifier start conductor C1969. A path is also completed through these contacts and the wiper 1304 for impressing ground potential upon the ringing generator start lead C1394, whereby operation of the ringing equipment, not shown, is initiated in the usual manner. At its contacts 1362, the relay R1360 opens another point in the above-traced circuit for energizing its upper winding in parallel with the magnet 1307. At its contacts 1361, the relay R1360 further prepares the circuit for energizing the vertical magnet 1438 in parallel with the upper winding of the transfer relay R1410 during the dialing of the second digit. Following the release of the relay R1360 the signal and talk selector 10 is conditioned to respond to the impulses of the second digit.

From the above explanation, it will be understood that the frequency of the ringing current which is selected for energizing the desired room signal is determined by the numerical value of the first digit dialed into the signal and talk selector 10. More specifically, the number of impulses of this digit determines the setting of the wipers 1304 to 1306, inclusive, at the end of the first digit. With these wipers occupying different positions, they are connected to the output terminals of the ringing current generators of different frequencies. In the arrangement illustrated, only eight ringing current generators having different output frequencies are provided, so that eight sets of ring current leads are terminated in the contacts of the selecting switch 1300.

*Selecting the room signal*

Assuming that the group and units digits of the directory number designating the desired room signal are "3" and "6", respectively, the second digit dialed at the calling operator position No. 1 comprises three impulses. When the calling device 1735 is operated to dial this digit, the pulsing springs 1737 are opened and closed three times so that three impulses are transmitted over the dial lead C1830 to the line relay R1340. This relay, in following the impulses, functions to repeat the same to the vertical magnet 1438 and the upper winding of the transfer relay R1410 in parallel over a circuit which may now be traced as extending from ground by way of the contacts 1341, 1352 and 1361, to the conductor C1381 where it divides, one branch extending through the contacts 1412 and the upper winding of R1410 to battery, and the other branch extending through the contacts 1412 and 1431, and the winding of the magnet 1438 to battery. When energized in this circuit, the vertical magnet 1438 operates to elevate the wipers 1501 to 1505, inclusive, one step, whereby they are positioned opposite the first level of contacts in the associated contact field. Incident to this vertical off-normal movement of the enumerated wipers, the vertical off-normal springs 1416 are disengaged to deenergize the lower winding of the transfer relay R1410; the off-normal springs 1476 are opened and the off-normal springs 1475 are closed to transfer the release circuit from the release magnet 1308 to the release magnet 1474; and the off-normal springs 1417 are engaged to energize the lower winding of the transfer relay R1420 over a circuit which also includes the grounded release conductor C1386 and the rotary off-normal springs 1419. Since, as stated above, the upper winding of the transfer relay R1410 is intermittently energized in parallel with the winding of the vertical magnet 1438 during the transmission of the impulses of the second digit, this relay remains in its operated position until shortly after the digit is ended. In this regard, it will be understood that during each of the two remaining impulses of the second digit, current pulses are delivered to the vertical magnet 1438 and the transfer relay R1410 in parallel. Each time the vertical magnet 1438 is thus energized it functions to elevate the wipers 1501 to 1505 an additional step. Accordingly, at the end of the second digit these wipers are left standing in a position opposite the third level of contacts in the associated contact field.

When its lower winding is energized over the above-traced circuit, incident to the vertical off-normal movement of the enumerated Strowger switch wipers, the transfer relay R1420 operates and closes its contacts 1421 further to prepare the circuit for energizing its upper winding in parallel with the rotary magnet 1415 during the dialing of the third digit. At its contacts 1422, the relay R1420 prepares a circuit over which the busy test relay R1450 is controlled to test the idle or busy condition of the selected room signal. At its contacts 1423, the relay R1420 opens a point in the available locking circuit for the busy test relay. At its contacts 1424, the relay R1420 opens a point in the incomplete operating circuit for the relay R1430.

Shortly following the end of the second digit the relay R1410 restores. In releasing, this relay closes its contacts 1411 further to prepare the circuit for energizing the rotary magnet 1415 in parallel with the upper winding of the transfer relay R1420. At its contacts 1412, the relay R1410 opens another point in the circuit for energizing its own winding in parallel with the vertical magnet 1438. At its contacts 1413, the relay R1410 further prepares the operating circuit for the pickup relay R1480. At its contacts 1414, the relay R1410 prepares the incomplete operating circuit for the ring start relay R1550. Following the release of the relay R1410 the control equipment of the signal and talk selector 19 is conditioned to respond to the impulses of the third digit.

When the third digit "6" is dialed through operation of the calling device 1735, the impulsing springs 1737 are opened and closed six times to transmit six current pulses to the line relay R1340. This relay, in following the impulses, functions to repeat the same to the parallel-connected windings of the transfer relay R1420 and the rotary magnet 1415 over a circuit which may now be traced as extending from ground by way of the contacts 1341, 1352 and 1361, C1381, the contacts 1411 and 1421, and the parallel-connected windings of the magnet 1415 and the relay R1420 to battery. When energized in this circuit the magnet 1415 operates to rotate the wipers 1501 to 1505, inclusive, into engagement with the associated contacts forming the first contact set in the selected third level. Incident to this rotary off-normal movement of the wiper carriage structure, the rotary off-normal springs 1419 are disengaged to deenergize the lower winding of the transfer relay R1420, and the rotary off-normal springs 1418 are moved into engagement further to prepare the operating circuit for the relay R1430. During continued operation of the line relay R1340 to repeat the remaining impulses of the third digit to the rotary magnet 1415, the upper winding of the relay R1420 is intermittently energized. Due to its slow-to-release characteristic, this relay remains in its operated position until shortly after the third digit is ended. Each time a current pulse is transmitted to the rotary magnet 1415, the wipers 1501 to 1505, inclusive, are rotated an additional step so that at the end of the third digit these wipers are left standing in engagement with the contacts forming the six sets of contacts of the selected third contact level, i. e. the contact set terminating the conductors extending to the signal and intercommunicating facilities provided in room #364. During the rotation of the wiper carriage structure, the test wiper 1505 may be moved over test contacts which correspond to busy room signals. Each time this occurs the busy test relay R1450 is energized in a circuit which includes the grounded test wiper 1505, C1491 and the contacts 1422. Each time the test wiper 1505 is moved out of engagement with a test contact corresponding to a busy room signal this circuit is obviously broken. It will be understood, therefore, that the busy test relay R1450 may be intermittently energized during the rotary movement of the wiper carriage structure. Such operation of the busy test relay is without effect.

At the end of the third digit the line relay R1340 remains in its operated position to cause the deenergization and release of the transfer relay R1420. The later relay, upon restoring, closes its contacts 1424 to complete the prepared operating circuit for the relay R1430, this circuit extending by way of the grounded release conductor C1386, the rotary off-normal springs 1418, the contacts 1424, and the winding of R1430 to battery. At its contacts 1421, the relay R1420 opens another point in the above-traced circuit for intermittently energizing its upper winding in parallel with the rotary magnet 1415. At its contacts 1422, the relay R1420 opens a point in the above-traced operating circuit for the busy test relay R1450. At its contacts 1423, the relay R1420 prepares or completes a locking circuit for the busy test relay, depending upon the idle or busy condition of the selected room signal 364b provided in room #364.

*Busy test and busy signal*

As indicated in the above explanation, the selected room signal 364b is tested to determine the idle or busy condition thereof immediately the wipers 1501 to 1505, inclusive, are rotated to engage the contacts corresponding to this signal. It will also be understood that in the event the selected signal 364b is busy, the busy test relay R1450 is energized and occupies its operated position at the time the relay R1420 releases and the relay R1430 operates. With the busy test relay operated, a locking circuit is completed therefor, incident to the release of the relay R1420 and the operation of the relay R1430, this circuit extending from the grounded test wiper 1505 by way of C1491, the contacts 1435, 1455 and 1423, and the winding of R1450 to battery. With the relay R1450 operated, the contacts 1451 are disengaged to prevent the operation of the pickup relay R1480. At the contacts 1452 a point is held open in the operating circuit for the ring start relay R1550. At the contacts 1453 the upper winding of the relay R1450 is short-circuited to render this relay slow-to-release. At the contacts 1456 the path for impressing ground potential upon the test contact individual to the selected room signal 364b is held open. At the contacts 1457 a circuit is prepared for transmitting current pulses through the filament of the assign lamp 10d.

The relay R1430, upon operating in the manner explained above, not only completes the prepared locking circuit for the busy test relay R1450, assuming the called room signal 364b to be idle, but in addition, closes its contacts 1432 to prepare a circuit for energizing the upper winding of the transfer relay R1410 in parallel with the winding of the magnet 1407 during the dialing of the fourth or code selecting digit at the calling operator position. At its contacts 1431, the relay R1430 opens another point in the previously traced circuit for transmitting current pulses to the vertical magnet 1438. At its contacts 1433, the relay R1430 prepares the operating circuit for the ring start relay R1550. At its contacts 1433, the relay R1430 also completes an alternative operating circuit for the transfer relay R1410, this circuit extending from the grounded release conductor C1386, by way of the contacts 1433 and 1443 and the lower winding of R1410 to battery. At its contacts 1436, the relay R1430 further prepares the above-mentioned circuit for transmitting current pulses through the filament of the assign lamp 10d provided at the operator position No. 1. At its contacts 1434, the relay R1430 completes a circuit including the start conductor C1251 for initiating the operation of the two pulse generating relays R1210 and R1220.

When the conductor C1251 is connected to ground a circuit including the resistor 1213 is completed for energizing the slow-to-operate relay R1210. This relay operates after an interval and opens its contacts 1212 to interrupt the path normally short-circuiting the winding of the relay R1220. When this path is opened, the relay R1220 is energized in a circuit including the grounded lead C1251 and the resistor 1223. The relay R1220 now operates and closes its contacts 1222 to short-circuit the winding of the relay R1210. At its contacts 1221, the relay R1220 opens a point in the circuit for transmitting ground pulses through the upper winding of the relay R1230 to the busy flash lead C1253. When its winding is short-circuited by the relay R1220, the relay R1210 releases and closes its contacts 1212 to short-circuit the winding of the relay R1220. The latter relay now releases and opens its contacts 1222 to interrupt the path short-circuiting the relay R1210. Thus a second cycle of operation of the two relays R1210 and R1220 is initiated. These two relays continue to operate and restore in sequence so long as ground potential is maintained upon the busy interrupter start lead C1251. Each time the relay R1210 operates it completes a path including the grounded start lead C1251 and the contacts 1211 for impressing ground potential upon the pulsing lead C1254. This path is obviously opened at the contacts 1211 each time the relay R1210 restores. Preferably, the two relays R1210 and R1220 are so constructed and arranged that ground pulses are transmitted over the pulsing lead C1254 at a rate of approximately 120 pulses per minute.

With the two relays R1430 and R1450 of the selector 10 operated, the assign lamp 10d provided at the operator position No. 1 is energized each time the pulsing lead C1254 is connected to ground. The circuit for energizing this lamp may be traced as extending from the grounded lead C1254 by way of the contacts 1457 and 1436, C1396, the contacts 1337, the ring and busy conductor C1833, the contact springs 1612 and the filament of the lamp 10d to battery. The resulting intermittent illumination of this lamp serves to inform the attendant at the operator position No. 1 that the selected room signal 364b is busy.

Upon receiving this information, the attendant at this position may either release the partially completed control connection or may continue the dialing operation to set the code selecting switch 1400 in accordance with the desired signal code. After the signal code is thus selected, the attendant may camp on the busy room signal until the control connection responsible for the busy condition of this signal, is released. The manner in which the code selecting switch 1400 responds to the impulses of the fourth digit, and the manner in which the selected room signal 364b is energized in accordance with the selected code after the previously established control connection is released, are fully explained hereinafter.

*Called room signal idle*

In the event the selected room signal 364b is idle at the time it is selected in the manner explained above, the test contact engaged by the test wiper 1555 is disconnected from ground so that no circuit is provided for energizing the busy test relay R1450. Accordingly, this relay remain in its restored position during and following the release of the transfer relay R1420. In this case the relay R1430, upon operating in response to the release of the transfer relay R1420, closes its contacts 1435 to impress ground potential upon the test contact individual to the room signal 364b over a path which includes the conductor C1431 and the contacts 1455. With ground potential impressed upon this test contact the room signal 364b is guarded against seizure through another of the signal and talk selectors. It will be observed that with the relay R1430 operated, and the relay R1450 in its restored position, the previously traced circuit for transmitting ground pulses over the ring and busy supervisory lead C1333 to the assign lamp 10d is held open at the contacts 1457. It will also be noted that the operation of the two pulse generating relays R1210 and R1220 is initiated incident to the operation of the transfer relay R1430, regardless of the idle or busy condition of the selected room signal. It will further be apparent that, regardless of the idle or busy condition of the selected room signal 364b, the transfer relay R1410 is energized in response to the operation of the relay R1430. In reoperating, this relay closes its contacts 1412 further to prepare the circuit for energizing its upper winding in parallel with the winding of the magnet 1407. At its contacts 1413, the relay R1410 opens a point in the operating circuit for the pickup relay R1430. At its contacts 1414, the relay R1410 opens a point in the operating circuit for the ring start relay R1550. Following the operation of the relay R1410, the signal and talk selector 10 is conditioned to respond to the impulses of the fourth or code selecting digit.

*Selecting the signal code*

To select the desired ringing code, which in the case assumed is designated by the digit "7," the attendant at the operator position No. 1 operates the calling device 1735 to dial this digit, whereby the pulsing springs 1737 are opened and closed seven times to transmit seven current impulses over the dial lead C1830 to the line relay R1340. The line relay, in responding to these current pulses, functions to repeat the same to the parallel-connected windings of the magnet 1407 and the upper winding of the transfer relay R1410. Thus upon restoring at the beginning of the open-circuit period of the first impulse, the relay R1340 closes its contacts 1341 to complete a circuit which extends from ground by way of the contacts 1341, 1352 and 1361, to the conductor C1381 where it divides, one branch extending through the contacts 1412 and the upper winding of R1410 to battery, and the other branch extending by way of the contacts 1412, 1432 and the winding of the magnet 1407 to battery. When energized in this circuit the magnet 1407 operates to advance the wipers 1404, 1405 and 1406 one step from the illustrated normal positions thereof into engagement with their respective associated first contacts. Incident to this off-normal movement of the enumerated wipers, the off-normal springs 1409' are opened and the off-normal springs 1409 are closed to transfer the prepared release circuit from the release magnet 1474 of the Strowger switching mechanism to the release magnet 1408 of the code selecting switch 1400. The off-normal springs 1408' are also closed to complete a circuit including the grounded release conductor C1386 and the conductor C1384 for energizing the interrupter start relay R1440, incident to the operation of the wipers 1404, 1405 and 1406 to an off-normal position. When thus energized, the relay R1440 closes its contacts 1441 further to prepare the operating circuit for the pickup relay R1430. At its contacts 1442, the relay R1440 further prepares the operating circuit for the ring start relay R1550. At its contacts 1443, the relay R1440 interrupts the above-traced alternative operating circuit for the relay R1410. Throughout the remainder of the digit, however, current pulses are transmitted through the upper winding of the transfer relay R1410 by the line relay R1340. These current pulses serve to maintain the slow-to-release transfer relay R1410 in its operated position until shortly after the digit is ended. At its contacts 1444, the relay R1440 completes a path for impressing ground potential upon the interrupter start lead C1464, this path additionally including the contacts 1454, C1490, and the contacts 1563. When the start lead C1464 is connected to ground, operation of the code interrupter, not shown but associated with the four signal and talk selectors 10, 11, 12 and 13, is initiated in the manner explained above with reference to the interrupter 570 shown in Fig. 5 of the drawings. It will be noted that the start circuit for this interrupter is held open at the contacts 1454, in the event the busy test relay R1450 is operated.

As the line relay R1340 continues to follow the impulses of the fourth digit, six additional current pulses are transmitted through the parallel-connected windings of the magnet 1407 and the transfer relay R1410. Each time a current pulse is transmitted to the indicated magnet, the wipers 1404, 1405 and 1406 are advanced another step. Accordingly, at the end of the fourth digit dialed at the operator position No. 1, these wipers are left standing in engagement with their respective associated seventh contacts. Shortly after the digit is ended, the transfer relay R1410 restores and closes its contacts 1411 to reprepare the operating circuit for the release relay R1370. At its contacts 1412, the relay R1410 opens another point in the circuit for energizing its own upper winding in parallel with the magnet 1407. At its contacts 1413, the relay R1410 further prepares the operating circuit for the pickup relay R1430. At its contacts 1414, the relay R1410 prepares or completes the operating circuit for the ring start relay R1550, depending upon the position occupied by the busy test relay R1450.

Assuming that the selected room signal 364b is idle, such that the busy test relay R1450 occupies its restored position, the operating circuit for the ring start relay R1550 is completed incident to the release of the transfer relay R1410 in the manner just explained. This circuit may be traced as extending from the grounded release conductor C1386 by way of the contacts 1433, 1414, 1442 and 1452, C1488, the contacts 1562, and the winding of R1550 to battery. In operating, the ring start relay R1550 closes its contacts 1551 to prepare a locking circuit for the hold relay R1350 and to prepare the pulsing circuit for the operating magnet 1512 of the ringing cycle counting switch 1510. At its contacts 1552, the relay R1550 further prepares the operating circuit for the release relay R1370. At its contacts 1553 and 1554, the relay R1550 prepares a connection between the talking conductors C1965 and C1966 of the trunk 10f and the talking wipers 1503 and 1504 of the Strowger switching mechanism. At these contacts the relay R1550 also prepares an answer circuit over which the switching relay R1540 may subsequently be energized. At its contacts 1555, the relay R1550 prepares a path for impressing ground potential upon the return signal conductor C1831. At its contacts 1556, the relay R1550 completes an alternative circuit for energizing the assign lamp 10d associated with the trunk 10a at the calling operator position No. 1. This circuit extends from ground by way of the contacts 1556, C1497, the contacts 1436, C1396, the contacts 1337, the ring and busy conductor C1833, the contact springs 1812, and the filament of the lamp 10d to battery. When energized in this circuit the lamp 10d is brightly and continuously illuminated to inform the attendant at the operator position No. 1 that the selected room signal is idle and that the energization of this signal is about to start.

*Start signaling*

As indicated above, when the interrupter start lead C1464 is connected to ground, the operation of the code interrupter associated with the four signal and talk selectors 10, 11, 12 and 13 is initiated. This interrupter is identical in arrangement with the interrupter 570 associated with the four selectors 20 to 23, inclusive, and provided in building No. 2. It will be understood from the preceding explanation, therefore, that shortly after the interrupter start lead C1464 is connected to ground, the code interrupter associated with the signal and talk selector 10 functions to transmit a ground pulse over the pickup lead C1465. When this lead is connected to ground, the pickup relay R1480 is energized in a circuit which extends from this lead by way of the contacts 1413, 1441, 1451 and 1482, and the winding of R1480 to battery. In operating, the relay R1480 first locks to ground over a path including its contacts 1481, C1493, the contacts 1532, C1393, and the off-normal springs 1308'. After this locking circuit is completed the relay R1480 opens its contacts 1482 to disconnect the pickup lead C1465 from ground at the off-normal springs 1308'. At its contacts 1484, the relay R1480 prepares the operating circuit for the code transfer relay R1470. At its contacts 1485, the relay R1480 prepares a circuit for energizing the relay R1530. At its contacts 1483, the relay R1480 prepares the operating circuit for the coding relay R1520.

Following the operation of the pickup relay R1480, and during the first half of the code cycle as determined by the operation of the interrupter associated with the signal selector 10, two short current pulses are transmitted to the coding relay R1520. In this regard, it will be noted that the last five contacts of the contact set 1403 embodied in the code selecting switch 1490 are multipled together and connected to the second code lead. Accordingly, with the wipers 1404, 1405 and 1406 engaging their respective associated seventh contacts, the operating circuit for the coding relay initially extends from the intermittently grounded second code lead by way of the wiper 1406 and its engaged seventh contact, the contacts 1471 and 1483, C1487, the winding of R1520 and the contacts 1561 to battery. Each time the coding relay R1520 is energized over this circuit, it closes its contacts 1521 and 1522 to transmit ringing current of the selected frequency through the windings of the room signal 364b. More specifically, the circuit for energizing this signal may, in the present case, be traced as extending from one terminal of the ringing current generator having the fourth output frequency by way of the wiper 1306, C1387, the contacts 1521, the wiper 1501, the contacts 1611, the windings of the signal 364b, the wiper 1502, the contacts 1522, C1388 and the wiper 1305 to the opposite terminal of the selected ringing current generator. This circuit is obviously opened at the contacts 1521 and 1522 each time the coding relay R1520 restores at the end of a ground pulse transmitted over the second code lead.

At the end of the first half of the code cycle in progress, a spacing interval is measured through operation of the interrupter associated with the signal and talk selector 10. Immediately prior to the second half of the code cycle, the interrupter functions to impress ground potential upon the reversing lead C1466 to complete the prepared operating circuit for the code transfer relay R1470, this circuit extending from the grounded lead C1466 by way of the contacts 1484 and the winding of R1470 to battery. When thus energized the relay R1470 opens its contacts 1471 to disconnect the coding relay R1520 from the wiper 1406, and closes its contacts 1472 to connect the coding relay to the wiper 1405. At its contacts 1473, the relay R1470 completes the prepared circuit for energizing the lower winding of the stepping relay R1530, this circuit extending from the grounded release conductor C1386 by way of the contacts 1549, C1494, the contacts 1473, C1496 and the lower winding of R1530 to battery. The relay R1530 is of the well-known two-step type. More specifically, when its lower winding is energized in the circuit just traced, the relay R1530 partially operates to close only its preliminary make contacts 1533. At these contacts a path, including the two conductors C1495 and C1496 and the contacts 1485 and 1473, is completed for short-circuiting the upper winding of the relay R1530.

Following the operation of the code transfer relay R1470, and during the second half of the code cycle in progress, the coding relay R1520 is energized in accordance with the ground pulses transmitted over the second code lead. In this case the operating circuit for the coding relay extends from the intermittently grounded second code lead by way of the wiper 1405, the contacts 1472 and 1483, C1487, the winding of R1520, and the contacts 1561 to battery. Each time the coding relay R1520 is energized in this circuit it closes its contacts 1521 and 1522 to complete the above-traced circuit for energizing the room signal 364b from the ringing current generator having the fourth output frequency. It will be understood, therefore, that at the end of the first code cycle the assign signal lamp 364b has been operated to produce an audible code which comprises two short signal periods, a spacing interval, and two additional short signal periods. This coded signal serves to convey a particular item of information to the occupants of room #364.

At the end of the first code cycle utilized in controlling the room signal 364b, the ringing interrupter associated with the signal and talk selector 10 functions to disconnect the reversing lead C1466 from ground, whereby the code transfer relay R1470 is deenergized. This relay, in restoring, opens its contacts 1472 and closes its contacts 1471, whereby the coding relay R1520 is again connected to be controlled over the above-traced circuit including the wiper 1406 and the second code lead. At its contacts 1473, the relay R1470 interrupts the above-traced path short-circuiting the upper winding of the stepping relay R1530. Incident to this operation, the two windings of the relay R1530 are energized in series over a circuit which includes the grounded release conductor C1386, the contacts 1549, C1494, the contacts 1485, C1495 and the contacts 1533. When thus fully energized the relay R1530 completes its operation, and in so doing opens its contacts 1532 to interrupt the previously traced locking circuit for the pickup relay R1480. At its contacts 1531, the relay R1530 completes an obvious circuit for energizing the magnet 1512 of the counting switch 1510. When thus energized the magnet 1512 operates to advance the wiper 1511 one step from its illustrated normal position into engagement with its associated first contact. Incident to the off-normal movement of the wiper 1511, the off-normal springs 1515 are opened and the off-normal springs 1514 are closed to transfer the release circuit from the release magnet 1408 of the code selecting switch 1400 to the release magnet 1513 of the counting switch 1510. The off-normal springs 1516 are also closed to prepare an alternative path for impressing ground potential upon the return signal conductor C1831, incident to the off-normal movement of the wiper 1511.

The pickup relay R1480, upon restoring, opens its contacts 1481 further to interrupt its own locking circuit, and closes its contacts 1482 to reprepare its operating circuit. At its contacts 1484, the relay R1480 opens another point in the operating circuit for the code transfer relay R1470. At its contacts 1485, the relay R1480 interrupts the circuit for energizing the stepping relay R1530. The relay R1530 now restores and opens its contacts 1531 to deenergize the magnet 1512. At its contacts 1533, the relay R1530 opens another point in the path for short-circuiting its upper winding and the circuit for energizing its two windings in series. At its contacts 1532, the relay R1530 reprepares the previously traced locking circuit for the pickup relay R1480.

From this point on, the manner in which the code signaling relays R1480, R1520, R1470 and R1530 are operated under the control of the code interrupter to repeat the transmission of the selected code to the selected room signal 364b, is exactly the same as just described with reference to the code transmission effected during the first code cycle. In this regard, it is pointed out that the number of times the code signal is repeated is determined by the wiring of the relay R1560 to the contacts of the counting switch 1510. In the illustrated arrangement, the upper terminal of the relay R1560 is wired to the third contact of the contact set associated with the wiper 1511, so that the selected signal code will be transmitted to the selected room signal 364b three times before the signaling operation is arrested. It is pointed out by way of example, however, that by connecting the upper terminal of the relay R1560 to the fourth, fifth, sixth, or seventh contact of the single contact set embodied in the counting switch 1510, the signal code may be repeated four, five, six or seven times, as desired.

*Stop signaling*

As indicated by the above explanation, the wiper 1511 of the counting switch 1510 is operated to engage its associated third contact when the stepping relay R1530 completes its operation at the end of the third code cycle. Incident to the engagement of the wiper 1511 with its associated third contact, a circuit including the grounded release conductor C1386 is completed for energizing the upper winding of the stop signal relay R1560. In operating, the relay R1560 opens its contacts 1561 to interrupt the previously traced operating circuits for the relay R1520. Thus continued operation of the code interrupter associated with the selector 10 is prevented from effecting further code transmission to the selected room signal 364b. At its contacts 1562, the relay R1560 opens the operating circuit for the ring start relay R1550. At its contacts 1563, the relay R1560 interrupts the previously traced path over which ground potential is impressed upon the interrupter start lead C1484 in the signal and talk selector 10. Thus the operated code interrupter associated with this selector is arrested in the event none of the other three selectors are occupied with calls at this time. At its contacts 1564 and 1565, the relay R1560 shunts the contacts 1553 and 1554, respectively, to prevent the opening of the answer circuit when the ring start relay R1550 restores. At its contacts 1566, the relay R1560 prepares an alternative path for impressing ground potential upon the return signal conductor C1831.

The ring start relay R1550, upon restoring, opens its contacts 1551 further to interrupt the operating circuit for the magnet 1512 and the incomplete locking circuit for the hold relay R1520. At its contacts 1552, the relay R1550 opens a point in the prepared operating circuit for the release relay R1370. At its contacts 1553 and 1554, the relay R1550 opens the shunt paths across the contacts 1564 and 1565, respectively. At its contacts 1555, the relay R1550 opens one of the multiple paths over which ground potential may be impressed upon the return signal conductor C1831. At its contacts 1556, the relay R1550 interrupts the previously traced circuit for continuously energizing the signal lamp 10d. When this lamp is thus deenergized the attendant at the operator position No. 1 is informed that the transmission of the selected code has been completed. It is noted that following the operation of the stop signal relay R1560 and the release of the ring start relay R1550, the three relays R1470, R1480 and R1530 may continue to operate under the control of the code interrupter in the exact manner described above, so long as the interrupter continues to operate. The continued operation of these three relays is without effect insofar as the call under consideration is concerned.

In the case assumed above, wherein the frequency selecting digit 4 and the code selecting digit 7 are dialed at the calling operator position No. 1, the code of the signal transmitted comprises two short ringing periods, a spacing period and two additional short ringing periods. Moreover, only ringing current of the selected fourth frequency is transmitted to the selected room signal. From a consideration of the wiring of the frequency selecting switch 1300, however, it will be understood that by dialing any frequency selecting digit from "1" to "8", inclusive, any one of the eight different ringing current frequencies may be utilized in energizing a selected room signal. In this connection, it is pointed out above that more than one room signal may be selected for control through one and the same set of outlet contacts of the selector 10. Thus the provision of the frequency selective signaling arrangement becomes apparent, it being pointed out in this regard that the parallel-connected room signals which are controlled over a single set of outlet contacts of the selector 10, are tuned to respond to the different ringing current frequencies, so that in transmitting a ringing current of a selected frequency only one of the room signals will respond. It will also be understood from a consideration of the wiring arrangement of the code selecting switch 1400 that various other code signals may be selected for transmission by dialing code selecting digits other than the digit "7". Thus if the code selecting digit "6" is dialed into the selector 10, the wipers 1404, 1405 and 1406 are positioned to engage their respective associated sixth contacts at the end of the digit. Accordingly, the coding relay R1520 is controlled over the first code lead during the second half of each code cycle. Similarly, if the wipers 1404, 1405 and 1406 are left standing in engagement with their respective associated eight contacts at the end of the code selecting digit, the coding relay R1520 is controlled over the third code lead during the second half of each code cycle. More generally stated, the second half of each code may comprise from one to five short ringing periods, depending upon the position of the wipers 1404, 1405 and 1406 at the end of the code selecting digit. In those cases where a code selecting digit is dialed to position the enumerated wipers on their associated contacts numbered from 1 to 5, inclusive, the first half of the transmitted code comprises, in each instance, a single short ringing period. More generally considered, the character of the code selected through operation of the switch 1400 will be readily understood from the code chart appearing in a preceding portion of the specification to illustrate the codes which may be transmitted by the ringing control apparatus embodied in the signal selector 20.

*Answer supervision*

In order to acknowledge or answer the call, it is necessary for one of the occupants of room #364 momentarily to operate the return signal key 364a. When the contacts of this key are closed, a circuit is completed for energizing the room switching relay R1610, this circuit extending from ground by way of the contacts 1456 and 1435, C1491, the test wiper 1505, the winding of R1610 and the contacts of the key 364a to battery. When energized in this circuit, the relay R1610 closes its contacts 1616 to complete an obvious locking circuit for itself, and opens its contacts 1611 further to interrupt the circuit for energizing the room signal 364b. At its contacts 1612 and 1614, the relay R1610 opens the connection between the loud speaker 364c and the program trunk 1655. At its contacts 1613 and 1615, the relay R1610 bridges the input terminals of the loud speaker 364c across the talking wipers 1503 and 1504 of the signal selector 10. Incident to this operation, an answer circuit is completed over which the upper winding of the return signal relay R1540 is energized. This circuit extends from ground by way of the contacts 1541 and 1564, the wiper 1503, the contacts 1613, the resistor 364e and the parallel-connected windings of the loud speaker 364c, the contacts 1615, the wiper 1504, the contacts 1565 and 1543, and the upper winding of R1540 to battery. When its upper winding is thus energized, the relay R1540 closes its preliminary make contacts 1547 to complete a locking circuit for itself, this locking circuit extending from ground by way of the off-normal springs 1308', C1393, the contacts 1547 and the lower winding of R1540 to battery. After this locking circuit is completed, the relay R1540 opens its contacts 1541 and 1543 to interrupt two points in its operating circuit as traced above. At its contacts 1542 and 1544, the relay R1540 connects the terminals of the loud speaker 364c to the talking conductors C1965 and C1966 of the trunk 10f extending to the amplifier control network 19. At its contacts 1549, the relay R1540 opens a point in the common portion of the previously traced operating and locking circuits for the stepping relay R1530. At its contacts 1548, the relay R1540 completes a locking circuit which includes the grounded release conductor C1386 for the stop signal relay R1560. At its contacts 1546, the relay R1540 opens a point in the incomplete operating circuit for the release relay R1460. At its contacts 1545, the relay R1540 completes the prepared paths for impressing ground potential upon the return signal conductor C1831. In the present case, this conductor is connected to ground over two paths, which paths commonly extend by way of the contacts 1335 and 1375, and C1391 to the contacts 1545 where they divide, one thereof extending to ground through the contacts 1566, and the other extending to ground through the off-normal springs 1516. When the return signal conductor 1831 is thus connected to ground, a circuit including this conductor is completed for energizing the return signal lamp 10e provided at the operator position No. 1. The resulting illumination of the lamp 10e serves to inform the attendant at this operator position that the call has been acknowledged in the called room #364. The manner in which a talking connection is set up between the operator position No. 1 and the called room #364, is described with particularity in the following portion of the specification.

*Camping on a busy room signal*

In the event the desired room signal 364b is busy at the time it is selected in the manner explained above, the attendant at the operator position No. 1 may dial the code selecting digit designating the desired code, and hold the connection until the previously established connection extending through another of the signal and talk selectors is released. In this regard, it will be recalled that the busy test relay R1450 is, following the release of the relay R1410 and the operation of the relay R1430, locked up in a circuit which extends to ground over a path including the conductor C1491, the test wiper 1505 and the contacts of certain of the relays in the other selector. When the other selector is released, ground potential is removed from the test wiper 1505 to deenergize the busy test relay R1450. Upon restoring, the relay R1450 closes its contacts 1456 to impress ground potential upon the test contact engaged by the test wiper 1505, and closes its contacts 1454 to impress ground potential upon the interrupter start lead C1464, whereby the operation of the code interrupter is initiated. At its contacts 1457, the relay R1450 opens the previously traced circuit for transmitting ground pulses to the assign lamp 10d, whereby the flashing of this lamp is discontinued to indicate to the attendant at the operator position No. 1 that the busy condition of the selected room signal has been terminated. At its contacts 1455, the relay R1450 opens another point in its own locking circuit. At its contacts 1453, the relay R1450 opens the path short-circuiting its upper winding. At its contacts 1452, the relay R1450 completes the previously traced operating circuit for the ring start relay R1550. At its contacts 1451, the relay R1450 further prepares the operating circuit for the pickup relay R1480. Following the release of the busy test relay R1450 to perform the functions just described, the transmission of ringing current of the selected frequency and code to the selected room signal 364b may proceed in the exact manner set forth above.

*Holding the call*

If for any reason the attendant at the operator position No. 1 desires to hold the call set up through the signal and talk selector 10 to the room signal 364b, either during the transmission of ringing current of the selected frequency and code to this signal or after the call has been acknowledged, she may do so by operating the dial and talk key 10c to its hold position. Incident to this key operation, the contact springs 1815 are disengaged, the contact springs 1816 are engaged and the contact springs 1817 are disengaged. At the contact springs 1816 an obvious alternative circuit is completed for maintaining the energization of the line relay R1340. After this circuit is completed, the contact springs 1817 are disengaged to interrupt the initially completed operating circuit for the line relay R1340. At the contact springs 1815, the previously traced circuit for energizing the relay R1950 is interrupted. The relay R1950 now restores and opens its contacts 1952 to deenergize the switching relay R1940. It will be noted that after the dial and talk key 10c has been operated to its hold position, the calling device 1735 is no longer associated with the signal and talk selector 10 and its incoming trunk 10a. Accordingly, this calling device may be used for setting up connections to other rooms through the other signal and talk selectors 11, 12, and 13. It will also be noted that the operation of the dial and talk key 10c to its hold position in no way affects the supervisory circuits extending to the assign lamp 10d and the return lamp 10e. Accordingly, any operations which occur in the signal and talk selector 10, such, for example, as the acknowledgment of the call, after the dial and talk key 10c has been operated to its hold position, are indicated at the operator position No. 1 through appropriate control of one of the two lamps 10d and 10e. Obviously, the dial and talk key 10c may be operated to its call position after having been operated to its hold position, without in any way influencing the connection as set up through the signal and talk selector 10. In this regard, it will be noted that when the contact springs 1815 are reclosed, the operating circuit for the relay R1950 is recompleted to cause the sequential reoperation of this relay and the switching relay R1940.

*Release*

The arrangement of the signal and talk selector 10 is such that it may be released under the control of the attendant at the operator position No. 1 at any time during the dialing operation. In order to release the connection prior to the dialing of the fourth digit, the attendant at the operator position No. 1 simply restores the dial and talk key 10c to its release position, i. e., the position illustrated in the drawings. In response to this key operation, the contact springs 1814 are disengaged to cause the sequential release of the two relays R1950 and R1940, and the contact springs 1813 are disengaged to interrupt the previously traced circuit for energizing the line relay R1340. In releasing, the line relay opens its contacts 1342 to deenergize the hold relay R1350, and closes its contacts 1341 to transmit a current pulse to one of the transfer relays and one of the operating magnets 1307, 1438, 1415 and 1407, in the manner previously explained. The hold relay R1350, upon restoring, opens its contacts 1354 to interrupt one of the paths over which ground potential is impressed upon the release conductor C1386. At its contacts 1355, the relay R1350 reprepares the operating and locking circuits for the assign relay R1320. At its contacts 1356, the relay R1350 opens a point in one of the previously traced locking circuits for the transfer relay R1360. At its contacts 1353, the relay R1350 opens a point in the previously traced path over which ground potential is impressed upon the ringing machine start conductor C1394 and the amplifier start conductor C1969. At its contacts 1351, the relay R1350 completes a circuit for energizing in succession the release magnets of the operated minor and Strowger switching mechanisms. Assuming that the key 10c is operated to its release position before any digits have been dialed into the selector 10 through operation of the calling device 1735, the wipers of the frequency selecting switch 1300 are moved off-normal incident to the release of the line relay R1340. Accordingly, the release circuit as initially completed extends from ground by way of the contacts 1341, 1351, and 1371, C1382, the off-normal springs 1515, C1486, the off-normal springs 1409' and 1476, C1380, the off-normal springs 1309, and the winding of the magnet 1308 to battery. When thus energized the magnet 1308 attracts its associated holding pawl to release the wipers 1304, 1305 and 1306. As these wipers are restored to normal, the off-normal springs 1309 are disengaged to deenergize the magnet 1308; the off-normal springs 1309' are moved into engagement to prepare the locking circuits for the relays R1320 and R1360; and the off-normal springs 1308' are disengaged to open the incomplete locking circuits for the relays R1460, R1480 and R1540.

Assuming that only one digit has been dialed at the operator position prior to the operation of the key 10c to its release position, the release circuit as initially completed extends from ground by way of the contacts 1341, 1351 and 1371, C1382, the contacts 1515, C1486, the off-normal springs 1409' and 1475, and the winding of the Strowger release magnet 1474 to battery, it being noted in this regard that the wipers of the Strowger switching mechanism are moved off-normal incident to the release of the line relay R1340. When energized in this circuit the magnet 1474 attracts its associated holding pawl, permitting the wiper carriage structure of the Strowger switching mechanism to be returned to normal in the usual manner. Incident to this operation, the vertical off-normal springs 1417 are disengaged to deenergize the transfer relay R1420, if operated, and the off-normal springs 1416 are moved back into engagement. Also, incident to the release of the Strowger switching mechanism, the off-normal springs 1475 are disengaged to deenergize the release magnet 1474 and the off-normal springs 1476 are moved into engagement to extend the release circuit over the conductor C1380 and through the off-normal springs 1309 to the winding of the release magnet 1308. When the latter magnet is energized in the release circuit, it too attracts its associated holding pawl to permit the release of the wipers 1304, 1305 and 1306. At the last-named wipers are restored to normal, the off-normal springs 1309 are disengaged to deenergize the release magnet 1308, the off-normal springs 1308' are disengaged to open a point in the locking circuits for the relays R1460, R1480, and R1540, and the off-normal springs 1309' are moved into engagement further to prepare the operating circuit for the assign relay R1320. When the two relays R1350 and R1360 are both restored to normal, the release conductor C1386 is disconnected from ground to interrupt the previously traced locking and operating circuits for the trunk relay R1330 and the transfer relay R1410, causing the two last-named relays to restore. Following the release operations just described, the signal and talk selector 10 is fully restored to normal and may be preselected for use in setting up other connections.

In the event two digits have been dialed at the operator position No. 1 prior to the operation of the dial and talk key 10c to its release position, the Strowger switching mechanism and the frequency selecting switch 1300 are restored to normal in the exact manner described above, it being noted in this regard that the operated transfer relay R1420 is deenergized and restores when the release conductor C1386 is disconnected from ground. In the event two or three digits have been dialed at the operator position No. 1 prior to the operation of the dial and talk key 10c to its release position, the wipers of the Strowger switching mechanism occupy a rotary off-normal position as well as a vertical off-normal position at the time the release operation is initiated. Accordingly, the rotary off-normal springs 1419 are moved back into engagement and the rotary off-normal springs 1418 are disengaged, incident to the restoration of the Strowger switching mechanism to normal. It is also noted that if three digits have been dialed into the selector 10 before the key 10c is operated to its release position, a current pulse is transmitted to the operating magnet 1407 of the code selecting switch 1400 to step the wipers of this switch off normal incident to the release of the line relay R1340. Accordingly, the release circuit as initially completed extends from the conductor C1382 by way of the off-normal springs 1515, C1486 and the off-normal springs 1409 to the release magnet 1408 of the code selecting switch 1400. When this magnet is energized it attracts its associated holding pawl, permitting the wipers 1404, 1405 and 1406 to be restored to normal. Incident to the release of these wipers, the off-normal springs 1409 are disengaged to deenergize the release magnet 1408, and the off-normal springs 1409' are closed to transfer the release circuit to the release magnet 1474 of the Strowger switching mechanism. Also, the off-normal springs 1408' are disengaged to deenergize the interrupter start relay R1440. From this point on the release of the selector 10 proceeds in the manner explained above.

In the event the dial and talk key 10c is restored to normal for the purpose of releasing the signal and talk selector 10 after the code transmission is started but before it is completed, the transmission of ringing current of the selected code and frequency to the selected room signal 364c is continued until the full complement of three code cycles is completed. In this case the Strowger switching mechanism of the signal and talk selector 10 is off normal; the frequency selecting switch 1300 is off normal; the code selecting switch 1400 is off normal; and the ringing cycle counting switch 1510 may or may not be off normal. Further, the transfer relays R1360 and R1410 occupy their respective restored positions and the ring start relay R1550 is operated. Accordingly, when the line relay R1340 restores in response to the operation of the dial and talk key 10c to its release position a circuit is completed for energizing the release relay R1370, this circuit extending from ground by way of the contacts 1341, 1352 and 1361, C1381, the contacts 1411, the wiper 1404, C1489, the contacts 1552, C1389 and the winding of R1370 to battery. When energized in this circuit the relay R1370 opens its contacts 1372 further to interrupt the operating circuit for the hold relay R1350. At its contacts 1373, the relay R1370 completes the prepared holding circuit for the hold relay R1350, this circuit extending from ground by way of the contacts 1551, C1383, the contacts 1373, the winding of R1350, C1385 and the contacts 1461 to battery. At its contacts 1371, the relay R1370 opens a point in the common portion of the operating circuits for the four release magnets 1308, 1408, 1474 and 1513. At its contacts 1374, the relay R1370 opens the established locking circuit for the trunk relay R1330, causing the latter relay to restore. At its contacts 1375, the relay R1370 opens a point in the previously traced paths for impressing ground potential upon the return signal conductor C1831. The relay R1330, upon restoring, opens its contacts 1332 further to interrupt its own locking circuit; and closes its contacts 1331 to reprepare the path over which the hold conductor is normally connected to the release conductor C1386. At its contacts 1333, the relay R1330 opens another point in the circuit for energizing the line relay R1340. At its contacts 1334, the relay R1330 reprepares the previously traced circuit for energizing its lower winding in series with the winding of the line relay R1340. At its contacts 1335, the relay R1330 opens another point in the path over which ground potential may be impressed upon the return signal conductor C1831. At its contacts 1336, the relay R1330 reconnects the busy flash lead C1253 to the ring and busy conductor C1833 of the trunk 10a. At its contacts 1337, the relay R1330 disconnects the ring and busy conductor C1833 from the supervisory conductor C1396 of the selector 10.

With the two relays R1350 and R1370 operated, the transmission of ringing current of the selected code and frequency to the selected room signal 364b may continue until the three code cycles have been counted through operation of the counting switch 1510. At the end of the third code cycle the stop signal relay R1560 is energized and operates in the manner previously explained. This relay, in operating, opens its contacts 1562 to deenergize the ring start relay R1550. The latter relay, upon restoring, opens its contacts 1552 to deenergize the release relay R1370. At its contacts 1551, the relay R1550 interrupts the above-traced locking circuit for the hold relay R1350. The release relay R1370, upon restoring, closes its contacts 1371 to prepare the common portion of the operating circuits for the four release magnets 1308, 1408, 1474 and 1513. This circuit is completed at the contacts 1351 incident to the release of the hold relay R1350. In this case the release circuit initially extends from ground by way of the contacts 1341, 1351 and 1371, C1382, the off-normal springs 1514, and the winding of the magnet 1513 to battery. When thus energized the magnet 1513 attracts its associated holding pawl, permitting the wiper 1511 to be restored to normal. Incident to the release of this wiper the off-normal springs 1514 are opened to deenergize the magnet 1513; the off-normal springs 1515 are closed to extend the release circuit to the release magnet 1408 of the code selecting switch 1400; and the off-normal springs 1516 are opened to interrupt one of the prepared paths for impressing ground potential upon the return signal conductors C1831 and C1967. From this point on, the release of the signal selector 10 proceeds in a manner clearly apparent from the preceding explanation.

In the event the dial and talk key 10c is operated to its release position after the call has been answered at the operator position No. 1, the ring start relay R1550 occupies its restored position when the line relay R1340 restores. Accordingly, the release relay R1370 is not energized and the release of the selector is immediately started. Incident to the release of the hold relay R1350 to disconnect the release conductor C1386 from ground, the relay R1430 restores to open the locking circuit for the room relay R1610. The relay R1610, in releasing, opens its contacts 1616 further to interrupt its own locking circuit. At its contacts 1611, the relay R1610 reprepares the circuit for energizing the room signal 364b. At its contacts 1613 and 1615, the relay R1610 disconnects the loud speaker 364c from the talking conductors extending to the contact banks of the four signal and talk selectors. At its contacts 1612 and 1614, the relay R1610 reconnects the loud speaker 364c to the program trunk 1655. Aside from the manner in which the room relay R1610 is controlled, the release of the selector 10 proceeds in the exact manner described above.

At any time prior to the operation of the return signal relay R1540 to transmit a return or answer supervisory signal to the operator position No. 1, the attendant at this position may initiate the immediate release of the signal selector 10, without restoring the dial and talk key 10c to normal. This is accomplished by momentarily operating the release key 1800 to its off-normal position. In response to this key operation a circuit is completed for energizing the release relay R1460, this circuit extending from ground by way of the contacts of the key 1800, C1861, the contacts 1951, C1967, the contacts 1375, C1391, the contacts 1546, C1492, and the upper winding of R1460 to battery. When energized in this circuit the relay R1460 locks to ground over a path including its contacts 1462, C1393 and the off-normal springs 1308'. At its contacts 1461, the relay R1460 opens the operating and locking circuits for the hold relay R1350. The latter relay, upon restoring, initiates the release of the selector 10 in a manner clearly apparent from the preceding explanation. From this explanation it will be recalled that the frequency selecting switch 1300 is the last of the four switching mechanisms to be restored to normal. Incident to the release of this switch the off-normal springs 1308' are disengaged to interrupt the locking circuit for the release relay R1460. Thus the release of the relay R1460 is delayed until all other release operations have been effected in the selector. From the preceding explanation it will also be recalled that the trunk relay R1330 is deenergized and restores when ground potential is removed from the release conductor C1386. Upon restoring, the relay R1330 opens its contacts 1333 to deenergize the line relay R1340. Following the release of the frequency selecting switch 1300 in the manner previously explained, the assign relay R1320 is conditioned for reoperation to reassign the signal and talk selector 10 for use when the allotter start relay R1200 next operates. In this regard, it will be understood that if the dial and talk key 10c is held in its call position, following the release of the release key 1800 by the attendant at the operator position No. 1, the signal and talk selector 10 may be reseized over the trunk 10 in response to the subsequent operation of the assign relays R1310 and R1320.

INTERCOMMUNICATION

From the preceding explanation, it will be understood that after the return signal key 364a provided in the called room #364 is operated, a communication connection is prepared between the operator position No. 1 and this room. In this regard, it will be recalled that when the transfer relay R1360 restores at the end of the first digit dialed into the selector 10, it closes its contacts 1363 to impress ground potential upon the amplifier start conductor C1969. When this lead is connected to ground the start relay conventionally embodied in the amplifier 40, operates to energize the cathode heaters of the amplifier and otherwise to prepare this amplifier for signal current transmission. The manner in which this amplifier is conditioned for operation is well understood in the art. Thereafter, and when the return signal relay R1540 operates in response to the answering of the call in room #364, it closes its contacts 1547 to impress ground potential upon the control conductor C1968, whereby the prepared operating circuit for the switching relay R1940 is completed. More specifically, this circuit extends from ground by way of the off-normal springs 1308', C1393, the contacts 1547, C1968, the contacts 1952 and the winding of R1940 to battery. When energized in this circuit, the relay R1940 operates and opens its contacts 1942 to interrupt the path normally short-circuiting the terminals of the loud speaker 2050. At its contacts 1941 and 1943, the relay R1940 connects the input terminals of the amplifier 40 to the terminals of the loud speaker 364c. One side of this connection may be traced as extending from one input terminal of the amplifier 40 by way of C1981, the contacts 1901, C1970, the contacts 1941, C1965, the contacts 1544 and 1565, the wiper 1504, and the contacts 1615 to one terminal of the loud speaker 364c. The other side of the established connection between the amplifier 40 and the loud speaker 364c extends from the other terminal of the amplifier by way of C1983, the contacts 1995, C1974, the contacts 1943, C1966, the contacts 1542 and 1564, the wiper 1503, and the contacts 1613 to the other terminal of the loud speaker 364c.

With the switching relay R1940 operated, the output terminals of the amplifier 40 are also operatively connected to the terminals of the loud speaker 2050. One side of this connection may be traced as extending from one of the output terminals of the amplifier 40 by way of C1982, the contacts 1903 and 1931, and C1971 to one terminal of the loud-speaker 2050. The other side of the connection extends from the other output terminal of the amplifier 40 by way of C1984, the contacts 1907 and 1933, and C1973 to the other terminal of the loud speaker 2050. Thus a connection is set up whereby the answering party in room #364 may, by speaking into the loud speaker 364c, cause signal currents to be transmitted through the amplifier 40 for reproduction by the loud speaker 2050 provided at the operator position No. 1.

In order reversely to include the amplifier 40 in the established connection, so that signal currents may be transmitted in the reverse direction, i. e., from the operator position No. 1 to room #364, the operator may actuate the speaker key 1850 to its off-normal position, wherein the contact springs 1851 and 1852 are respectively engaged. At the contact springs 1851 an obvious circuit is completed for energizing the lamp 1853, whereby the attendant at the operator position No. 1 is informed that the speaker key 1850 is operated. At the contact springs 1852 a circuit is completed for energizing the slow-to-operate relay R1910, this circuit extending by way of the grounded amplifier start lead C1969, the contact springs 1852, C1913 and the winding of R1910 to battery. When energized in this circuit, the slow-to-operate relay R1910 first closes its contacts 1912 to complete a path including the contacts 1921 for short-circuiting the input terminals of the amplifier 40. At its contacts 1911, the relay R1910 opens a point in another available path for short-circuiting the amplifier input terminals. At its contacts 1913, the relay R1910 completes obvious circuits for energizing the switching relay R1900 and the slow-acting relay R1920. When thus energized, the relay R1900 opens its contacts 1901, 1903, 1905 and 1907, and closes its contacts 1902, 1904, 1906 and 1908, whereby the input terminals of the amplifier 40 are connected by way of the contacts 1931 and 1933, and the conductors C1971 and C1973 to the terminals of the loud speaker 2950, and the output terminals of the amplifier are connected by way of the conductors C1970 and C1974, the contacts 1941 and 1943, and the talking conductors C1965 and 1966 to the terminals of the loud speaker 364c provided in room #364. Shortly following the operation of the relay R1910, the relay R1920 operates and opens its contacts 1921 to interrupt the path short-circuiting the input terminals of the amplifier 40. At its contacts 1922, the relay R1920 prepares the above-mentioned alternative path for short-circuiting the amplifier input terminals. Following the operation of the two relays R1900 and R1920, the amplifier 40 is connected to increase the signal current level of signal currents transmitted from the operator position No. 1 to room #364. More specifically, the attendant at this operator position may now talk into the loud speaker 2050 to generate signal currents which are amplified by the amplifier 40 and transmitted to the loud speaker 364c for reproduction. After transmitting the desired message, the attendant at this operator position may restore the speaker key to normal in order to again condition the connection for the transmission of speech currents from the room #364 to the loud speaker 2050. When the key 1850 is released the contact springs 1852 are disengaged to deenergize the relay R1910. This relay, in restoring, closes its contacts 1911 to complete the above-mentioned alternative path, which includes the contacts 1922, for again short-circuiting the input terminals of the amplifier 40. At its contacts 1912, the relay R1910 opens the short-circuiting path which is completed incident to the operation of the amplifier switching relays. At its contacts 1913, the relay R1910 deenergizes the two relays R1900 and R1920. The relay R1900, upon restoring, again reverses the connections of the amplifier 40 to the two loud speakers 364c and 2050 in preparation for the transmission of signal currents from room #364 to the operator position No. 1. After these operations are completed, the relay R1920 restores and opens its contacts 1922 to interrupt the path short-circuiting the amplifier input terminals. At its contacts 1921, the relay R1920 reprepares the above-described initially completed path for short-circuiting the input circuit of the amplifier.

From the above explanation it will be understood that by operating the speaker key 1850 between its two positions, the attendant at the operator position No. 1 may selectively control the switching relays R1900, R1910 and R1920 to condition the established communication connection for signal current transmission in either direction. It will also be noted from this explanation that, incident to each amplifier switching operation, the amplifier input circuit is short-circuited over one of the two paths described above. The purpose of the short-circuiting arrangement is to prevent the transient currents produced incident to the opening and closing of the communication connection, from being reproduced by the amplifier 40 and transmitted to one of the two loud speakers for reproduction as noise.

If the attendant at the operator position No. 1 desires to hold a secret conversation with the answering party in room #364, the handset comprising the transmitter 1740 and the receiver 1741 may be used in lieu of the loud speaker 2050. To effect a transfer of the signaling circuits from the loud speaker 2050 to the handset of the telephone instrument, the handset is removed from its supporting hook or cradle to cause the operation of the hook or cradle switch 1742 to its off-normal position. Incident to the operation of this switch, the contact springs 1743 are closed to prepare a connection between the attendant's telephone instrument 1740, 1741 and the amplifier 40. At the contact springs 1744, a circuit is completed for energizing the transfer relay R1930; this circuit extending from the grounded amplifier start lead C1969, by way of the contact springs 1744, C1914 and the winding of R1930 to battery. Upon operating, the relay R1930 opens its contacts 1931 and 1933 to disconnect the loud speaker 2050 from the amplifier 40. At its contacts 1932 and 1934, the relay R1930 connects the telephone instrument 1740, 1741 to the amplifier 40. At its contacts 1935, the relay R1930 connects the resistance shunt 1936 across the two talking conductors C1871 and C1872 for the purpose of attenuating the signal currents transmitted over these conductors to the receiver 1741. Following the operation of the transfer relay R1930, signal currents incoming to the operator position No. 1 over the established connection are amplified through the amplifier 40 and transmitted to the receiver 1741 for reproduction over a circuit which may be traced as extending from one of the output terminals of the amplifier 40 by way of C1982, the contacts 1903 and 1932, C1872, the contact springs 1821, 1825, 1711, 1720 and 1743, the receiver 1741, the contact springs 1719, 1710, 1824 and 1820, C1871, the contacts 1934 and 1907, and the conductor C1984 to the opposite output terminal of the amplifier.

With the apparatus in this condition either the speaker key 1850 or the push button 1745 may be operated for the purpose of controlling the switching relays R1900, R1910 and R1920, to reverse the amplifier connections and thus condition the talking circuit for the transmission of signal currents from the operator position No. 1 to the loud speaker 364c. In this regard, it will be noted that the contact springs of the push button 1745 are, following the operation of the hook or cradle switch 1742, connected in shunt with the contact springs 1852 of the speaker key 1850. Accordingly, the relay R1910 may be controlled by either of these two switching elements. It will also be noted that the operation of the relay R1930 to transfer the signaling circuits from the loud speaker 2050 to the telephone instrument 1740, 1741 in no way affects the operation of the three switching relays R1900, R1910 and R1920 selectively to condition the established talking circuit for the transmission of signal currents in either of the two directions. It is pointed out, however, that when the attendant's telephone instrument is used, the resistance pad across the talking conductors C1871 and C1872 is opened at the contacts 1909 incident to the operation of the switching relay R1900, thereby to prevent the attenuation of signal currents generated by the transmitter 1740 for transmission to the input circuit of the amplifier 40. With the three enumerated switching relays operated, the circuit traversed by signal currents generated through operation of the transmitter 1740 may be traced as extending from one of the input terminals of the amplifier 40 by way of C1981, the contacts 1902 and 1932, C1872, the contact springs 1821, 1825, 1711, 1720 and 1743, the transmitter 1740, the contact springs 1719, 1710, 1824 and 1820, C1871, the contacts 1934 and 1906, and the conductor C1983 to the opposite input terminal of the amplifier. It will be understood from the above explanation that with the transfer relay R1930 operated, the established talking circuit, which includes at one end the telephone instrument 1740, 1741 and at the other end the loud speaker 364c, may selectively be controlled for the transmission of signal currents thereover in either direction. It will also be understood that when the telephone instrument 1740, 1741 is restored to its supporting hook or cradle the contact springs 1744 of the hook or cradle switch 1742 are disengaged to deenergize the transfer relay R1930. This relay, upon restoring, disconnects the telephone instrument 1740, 1741 from the amplifier 40, and reconnects the loud speaker 2050 for use in communicating over the established connection.

If the dial and talk key 10c is operated to its hold position after a talking circuit of the character considered above is set up between the operator position No. 1 and room #364, the amplifier control network 19 and the amplifier 40 are disassociated from the signal and talk selector 10 and are rendered available for use in communicating over a connection set up through another of the signal and talk selectors to another of the rooms. Thus incident to the operation of the dial and talk key 10c to its hold position, the contact springs 1815 are disengaged to interrupt the previously traced operating circuit for the relay R1950. In releasing, the relay R1950 opens its contacts 1951 to disconnect the return signal lead C1967 from the common release conductor C1861 which extends to the contacts of the release key 1800. At its contacts 1952, the relay R1950 opens the circuit over which the relay R1940 is being held energized. When thus deenergized the relay R1940 opens its contacts 1941 and 1943 to disconnect the talking conductors C1965 and C1966 of the selector 10 from the talking leads associated with the amplifier 40. At its contacts 1942, the relay R1940 short-circuits the terminals of the loud speaker 2050 over a path which additionally includes the conductors C1971, C1972 and C1973, and the contacts 1962, 2012 and 2032. When this path is completed the loud speaker 2050 is rendered inoperative to reproduce transient voltages which may be impressed upon the input terminals thereof incident to further switching operations. Obviously, if the dial and talk key 10c is reoperated to its call position, the contact springs 1815 are again closed to recomplete the operating circuit for the relay R1950. The two relays R1950 and R1940 are thus caused sequentially to reoperate to again operatively associate the amplifier 40 and the control network 19 with the signal and talk selector 10.

Normally the release of the two operated relays R1950 and R1940 is effected in response to operation of the dial and talk key 10c to its release position to initiate the release of the signal and talk selector 10. Thus when this key is actuated to its release position, the contact springs 1814 are disengaged to deenergize the relay R1950 and thus cause the sequential release of this relay and its associated relay R1940, whereby the equipment of the control network 19 is fully restored to normal. If, however, the release key 1800 is operated in the manner previously explained to initiate the release of the signal selector 10 before the transmission of ringing current of the selected code and frequency is started, the relay R1950 is held in its operated position. Under these circumstances the relay R1940 is not operated and, accordingly, the two talking conductors C1965 and C1966 of the selector 10 are not operatively connected to the talking conductors C1970 and C1974 of the amplifier control network. In this case the release of the signal and talk selector 10 in no way affects the two associated relays R1940 and R1950, the latter of the two relays being held in its operated position until the dial and talk key 10c is subsequently restored to normal.

After the amplifier control network 19 and the amplifier 40 have been released or disassociated from the signal and talk selector 10 in the manner explained in the preceding paragraph, they may be associated with another connection set up through another of the signal and talk selectors 11, 12 and 13. Thus, if the dial and talk key 13c is operated to its call position to seize the signal and talk selector 13, and the control connection is, through operation of the calling device 1735, routed through this selector to the signaling and communication facilities provided in room #471, for example, a communication connection is established between this room and the operator position No. 1 incident to the operation of the return signal relay embodied in the signal and talk selector 13, which occurs when the return signal key 471a is operated in this room. In this regard, it will be apparent from the preceding explanation that when the dial and talk key 13c is first operated to its call position, a circuit including the contact springs 1881 and 1882 and the conductor C1863 is completed for energizing the relay R2040 individual to the selector 13. With this relay operated, the associated relay R2030 is energized and operates incident to the operation of the return signal relay embodied in the selector 13. The relay R2030, upon operating, opens its contacts 2032 to interrupt the path short-circuiting the terminals of the loud speaker 2050, and closes its contacts 2031 and 2033 to connect the talking conductors of the trunk 13b to the conductors C1970 and C1974, respectively, whereby a communication connection is set up between the operator position No. 1 and the called room #471. From this point on, the manner in which the connection may be controlled through operation of the hook or cradle switch 1742 and the speaker key 1850 or through operation of the push button 1745, is exactly the same as described above with reference to the connection set up through the signal and talk selector 10 to the signaling and communication facilities provided in room #364.

The manner in which the two auxiliary relays R1960 and R2000 are controlled by the dial and talk key, not shown, but individual to the signal and talk selector 11, and by the return signal relay of this selector, incident to the setting up of a control connection to the signaling and communication facilities of a selected room, is exactly the same as described above with reference to the connection routed to room #364. Similarly, the two auxiliary relays R2010 and R2020, which are individual to the signal and talk selector 12, may be controlled by the dial and talk key associated with this selector and by the return signal relay of this selector, to provide a communication connection between the operator position No. 1 and the communication facilities provided in any room selected through the selector 12.

The manner in which the other signal and talk selectors 11, 12 and 13 may be controlled by the attendant at the operator position No. 1 to select the signaling and communication facilities individual to any desired room, is exactly the same as described above with reference to the operation of the signal and talk selector 10. In this regard, it will be understood that the signal and talk selector 13, for example, is arranged to be controlled over the dial and return signal conductors of the trunk 13a through selective operation of the calling device 1735, the dial and talk key 13c, and the release key 1800. It will also be understood that the assign lamp 13d and the return signal lamp 13e are controlled over the assign, ring and busy and return signal conductors of the trunk 13a from the selector 13. The trunks 11a and 12a, individual to the signal and talk selectors 11 and 12, terminate at the operator position No. 1 in dial and talk keys identical in arrangement with the illustrated keys 10c and 13c, and include the same four control and supervisory leads as do the illustrated trunks 10a and 13a. Further to consider the manner in which the assign lamps 10d, 13d, etc., individual to the various signal and talk selectors are controlled, it may be pointed out that even though a selector is idle the associated assign lamp is not energized until the selector is preselected for use. Thus it will be noted, from a consideration of the selector 10 and the manner in which the selectors are preselected for use, that the assign relay R1310 is only operated when the selector 10 is allotted for use. With the assign relay R1310 in its restored position, the contacts 1311 thereof are open so that the assign conductor C1832 is disconnected from ground. Accordingly, the assign lamp 10d is not energized. When, however, the selector 10 is set up for use the assign relay R1310 is operated to connect the assign conductor C1832 to ground through the resistor 1316, whereby the assign lamp 10d is dimly illuminated. Since the selectors are set up for use one at a time, it will be understood that only one of the four assign lamps 10d, 13d, etc., is, at any one time, energized. Should the attendant at the operator position No. 1 attempt to seize the selector 10, for example, at a time when this selector is busy, the assign lamp 10d is intermittently energized to signal the calling attendant that the selector 10 is busy. In this regard, it will be recalled from the preceding explanation that when the selector 10 is seized, the two assign relays R1310 and R1320 are immediately deenergized and restore. It will also be recalled that after the first digit is dialed into the selector 10, the transfer relay R1360 thereof is deenergized and restores. If, with the apparatus in this condition, the attendant at the operator position No. 1 actuates the dial and talk key 10c to its talk position, a circuit is immediately completed for energizing the lamp 10d in series with the lower winding of the relay R1230, this circuit extending from ground by way of the lower winding of R1230, C1253, the contacts 1366 and 1336, C1833, the contact springs 1812, and the filament of the lamp 10d to battery. When energized in this circuit the relay R1230 closes its contacts 1231 to impress ground potential upon the busy interrupter start lead C1251, whereby operation of the two pulsing relays R1210 and R1220 is initiated. At its contacts 1232, the relay R1230 prepares a circuit for connecting its low resistance upper winding in parallel with its high resistance lower winding. This path is completed at the contacts 1221 each time the relay R1220 restores during an operating cycle of the two pulsing relays. Incident to the completion of this path, the current traversing the filament of the assign lamp 10d is materially increased so that this lamp is more brightly illuminated. It will be understood, therefore, that as the two pulsing relays R1210 and R1220 continue to operate, the illumination of the lamp 10d flickers, thereby to signal the attendant at the operator position No. 1 that the signal and talk selector 10 is busy.

ANNOUNCING

As indicated previously, provisions are made in the system whereby the attendant at the operator position No. 1 may control any one of the signal and talk selectors 10 to 13, inclusive, to set up a connection to the program trunk 1655 over which programs are disseminated to the various room speakers 364c, 471c, etc. Assuming that such a connection is desired, and further that the signal and talk selector 10 is the selector which has been set up for use, the attendant at the operator position No. 1 actuates the dial and talk key 10c to its call position and operates the calling device 1735 in accordance with the three digits of the directory number designating the program trunk 1655. The first digit of this directory number assignment will comprise nine or ten impulses, so that at the conclusion thereof the wipers 1304, 1305 and 1306 of the frequency selecting switch 1300 are left standing in engagement with their respective associated ninth or tenth contacts. With the wiper 1304 in either of these two positions, a circuit is completed for energizing the interrupter start relay R1440 incident to the release of the transfer relay R1360, which occurs shortly following the end of the first digit. This circuit extends from ground by way of the contacts 1363 and 1353, the wiper 1304 and its engaged ninth or tenth contact, C1384, and the winding of R1440 to battery. In operating, the relay R1440 closes its contacts 1444 to impress ground potential upon the interrupter start lead C1464 and thus initiate operation of the associated code interrupter. At its contacts 1443, the relay R1440 opens a point in the previously traced alternative operating circuit for the transfer relay R1410. At its contacts 1442, the relay R1440 prepares the operating circuit for the ring start relay R1550. At its contacts 1441, the relay R1440 prepares the operating circuit for the pickup relay R1480, this circuit being held open at the contacts 1413 of the operated transfer relay R1410.

The selector 10 responds to the second and third digits of the directory number assigned to the program trunk 1655 in the exact manner explained above. From this explanation it will be understood that at the conclusion of the third digit the wipers 1501 to 1505, inclusive, are left standing in engagement with the contacts over which the program trunk 1655 may be seized. It will also be understood from this explanation that shortly following the end of the third digit the transfer relay R1420 restores to complete the operating circuit for the relay R1430. The latter relay, upon operating, closes its contacts 1433 to complete the previously traced operating circuit for the ring start relay R1550. At its contacts 1435, the relay R1430 completes a circuit for energizing the switching relay R1620, this circuit extending from ground by way of the contacts 1456 and 1435, C1491, the wiper 1505, and the winding of R1620 to battery. When thus energized the relay R1620 opens its contacts 1621 and 1623 to disconnect the conductors of the trunk 1655 from the output terminals of the program circuit 1650. At its contacts 1622 and 1624, the relay R1620 connects the contacts of the program trunk 1655 to the talking wipers 1503 and 1504 of the selector 10. The ring start relay R1550, upon operating, closes its contacts 1553 and 1554 to complete an answering circuit which includes the conductors of the trunk 1655 and has branches which extend to each of the loud speakers that are operatively associated with this trunk. For example, if the program key 471d provided in room #471 is operated, one branch of the answer circuit may be traced as extending from ground by way of the contacts 1541 and 1553, the wiper 1503, the contacts 1622, one side of the program trunk 1655, the contacts of the key 471d, the contacts 1604, the resistor 471e, the contacts 1602, the other side of the trunk 1655, the contacts 1624, the wiper 1504, the contacts 1554 and 1543, and the upper winding of R1540 to battery. When energized in this circuit, the relay R1540 first locks to ground over a path including its preliminary make contacts 1547, C1393 and the off-normal springs 1308', and then closes its contacts 1548 to complete the previously traced circuit for energizing the lower winding of the stop signal relay R1560. At its contacts 1542 and 1544, the relay R1540 connects the conductors of the trunk 1655 to the talking conductors C1965 and C1966 of the selector 10. At its contacts 1545, the relay R1540 completes the previously traced circuit for energizing the return signal lamp 10e, whereby the attendant at the operator position No. 1 is informed that the desired connection is fully set up. The relay R1560, upon operating, closes its contacts 1566 to complete a multiple circuit for energizing the return signal lamp 10e, and opens its contacts 1561 and 1562 to interrupt the respective operating circuits for the two relays R1520 and R1550. At its contacts 1563, the relay R1560 disconnects the interrupter start lead C1464 from ground. At its contacts 1564 and 1565, the relay R1560 closes obvious shunt paths across the contacts 1553 and 1554. The ring start relay R1550, upon restoring, opens its contacts 1556 to deenergize the assign lamp 10d in the manner previously explained. At its contacts 1555, the relay R1550 opens one of the multiple circuits for energizing the return signal lamp 10e. At its contacts 1553 and 1554, the relay R1550 opens the paths respectively shunting the contacts 1564 and 1565. At its contacts 1552, the relay R1550 opens a point in the previously traced operating circuit for the release relay R1370. At its contacts 1551, the relay R1550 opens a point in the previously traced locking and operating circuits for the hold relay R1350 and the magnet 1512. Following the operation of the stop signal relay R1560 and the release of the ring start relay R1550, a communication connection is set up between the operator position No. 1 and each of the rooms wherein the room speaker is operatively associated with the program trunk 1655. Accordingly, the attendant at the operator position No. 1 may, either by using the loud speaker 2050 or the transmitter 1740 in the manner previously explained, make an announcement which will be reproduced by all of the loud speakers that are connected to the program trunk 1655.

The manner in which the connection as set up through the signal and talk selector 10 to the program trunk 1655 may be released, is exactly the same as described above with reference to the release of the connection routed to the signal and communication facilities provided in room #364. In this regard, it will be noted that the switching relay R1620 is deenergized and restores in response to the release of the relay R1430, which occurs when the release conductor C1386 is disconnected from ground by the hold relay R1350. In releasing, the switching relay R1620 opens its contacts 1622 and 1624 to disconnect the conductors of the program trunk 1655 from the talking wipers of the selector 10, and closes its contacts 1621 and 1623 to reconnect the conductors of this trunk to the output terminals of the program circuit 1650.

TRUNK CALLS FROM OPERATOR POSITION No. 2 TO ROOM #364

In considering the manner in which the room signals in building No. 1 may be selected and controlled from the operator position No. 2 in building No. 2, it may be assumed that the signal and talk selector 10 has been preselected for use in building No. 1. Under these circumstances the two assign relays R1310 and R1320 and the transfer relay R1360 are operated in the signal and talk selector 10. Also, the start relay R500 of the allotter in building No. 1 occupies its restored position so that a circuit is completed for energizing the assign lamp 47d individual to the trunk 47 which extends to the operator position No. 2. This circuit will be apparent from a consideration of the wiring of the equipment illustrated in Fig. 11 of the drawings, and may, in the present instance, be traced as extending from ground by way of the contacts 1204, the lead C1255, the chain-connected contacts of the connect relays in allotter No. 1, a resistor, the assign lead of the trunk 47, the contact springs 267 and the filament of the assign lamp 47d to battery. The lamp 47d is only dimly illuminated over this circuit due to the action of the current limiting resistor included therein.

With the apparatus in this condition, if the attendant at the operator position No. 2 desires to select one of the room signals accessible to the selectors 10, 11, 12 and 13, she may do so by actuating the dial key 47c to its call position. In response to this operation, the contact springs 267 are disengaged to deenergize the assign lamp 47d and the contact springs 268 are closed to prepare a circuit for energizing the assign lamp 47d in accordance with the supervisory signals which are transmitted over the ring and busy lead incident to the operation of the selector 10 to select and control the desired room signal. At the contact springs 270 a circuit including the contacts of the release key 300 and the return signal conductor of the trunk 47 is prepared for releasing the signal and talk selector 10 after it has been seized. At the contacts 269, a circuit is completed for energizing the connect relay, which is individual to the selector 10 and is provided in the allotter No. 1, in series with the line relay R1340, in the manner previously explained with reference to the operation of the allotter relays illustrated in Fig. 11 of the drawings. When this connect relay operates, the dial, ring and busy and return signal conductors of the trunk 47 are connected through the make contacts of the operated connect relay in the allotter No. 1 in the dial, ring and busy and return signal leads of the trunk 10b, whereby the signal and talk selector 10 is connected to be controlled over the trunk 47 from the operator position No. 2. The connect relay of the allotter No. 1, in operating to perform these functions, also locks up in a circuit which includes the grounded hold lead of the trunk 10b. After the above-described trunk switching operations are performed by the connect relay of the allotter No. 1, the call may be extended through the selector 10 to the desired room signal 364b under the control of the calling device 235, in the exact manner explained above with reference to the call originating at the operator position No. 1. In this regard, it will be noted that the trunk relay R1330 is not operated on a trunk call of the character under consideration. Accordingly, the return signal conductor C1831 individual to the trunk 10a extending to the operator position No. 1, is disconnected from the return signal conductor C1967 of the selector. Also, the ring and busy conductor C1833 of the trunk 10a is disconnected from the ring and busy lead C1396 of the selector. The purpose of this arrangement is to prevent the transmission of supervisory signals over the trunk 10a as the setting up of the connection to the desired room signal 364b progresses. In this regard, it will be understood that if the desired room signal is busy, a circuit for intermittently energizing the lamp 47d is completed in the selector 10 incident to the operation of the two relays R1430 and R1450. This circuit may partially be traced as extending from the pulsing lead C1254 by way of the contacts 1467 and 1436, C1396, the contacts of the operated connect relay in the allotter No. 1, the ring and busy conductor of the trunk 47, the contact springs 268, and the filament of the lamp 47d to battery. On the other hand, if the selected room signal is idle, the start ring supervisory signal is transmitted to the operator position No. 1 incident to the operation of the ring start relay R1550. In this case the lamp 47d is energized to produce a steady indication over a circuit which extends from ground by way of the contacts 1556, C1497, the contacts 1436, C1396, the contacts of the operated connect relay in the allotter No. 1, the ring and busy conductor of the trunk 47, the contact springs 268, and the filament of the lamp 47d to battery. When energized in this circuit the lamp 47d is steadily illuminated to signal the attendant at the operator position No. 2 that the code transmission is about to start. From a consideration of the supervisory circuits traced above, it will be noted that when the ring start relay R1550 is deenergized at the end of the code transmission, the contacts 1556 are opened to deenergize the lamp 47d and thus signal the attendant at the operator position No. 2 that the code transmission has been completed. It will also be seen that when the return signal relay R1540 operates in response to the acknowledgment of the call in the selected room #364, a circuit is completed for energizing the return signal lamp 47e, to signal the attendant at the operator position No. 2 that the call has been received and acknowledged. This circuit may be traced as extending from ground by way of the off-normal springs 1516 and the contacts 1566 in parallel, the contacts 1545, C1391, the contacts 1375, C1967, the contacts of the operated connect relay in the allotter No. 1, the return signal conductor of the trunk 47, and the filament of the lamp 47e to battery.

In the event the desired room signal 364b is busy at the time it is selected from the operator position No. 2 through the signal and talk selector 10, the attendant at this operator position may maintain the dial key 47c in its call position to camp on the selected signal until the previously established connection extending to this signal is released. After the first established connection is cleared out, the transmission of ringing current of the selected frequency and code to the room signal 364b proceeds in the exact manner described above with reference to the call routed to this signal from the operator position No. 1 through the selector 10. Also, the attendant at the operator position No. 2 may hold the connection and free the calling device 235 for use in setting up other connections, by operating the dial key 47c to its hold position to exclude the pulsing springs of the calling device from the circuit over which the line relay R1340 is held energized. The manner in which the signal and talk selector 10 is released under the control of the attendant at the operator position No. 2 is exactly the same as described above with reference to the release of this selector as effected from the operator position No. 1. In this regard, it will be noted that when the dial key 47c is operated to its position, the contact springs 269 are disengaged to deenergize the line relay R1340, whereby the release of the selector is immediately initiated or the selector is prepared for release at the end of the code transmission. Incident to the release of the selector, the release conductor C1386 is disconnected from ground to remove ground potential from the hold conductor of the trunk 10b, and thus deenergize the operated connect relay in the allotter No. 1. Thus the allotter equipment is restored to normal. In the event the attendant handling the call at the operator position No. 2 desires to utilize the release key 300 to effect an immediate release of the signal and talk selector 10, this key is momentarily operated to its off-normal position, wherein a circuit including the release conductor common to the various dial keys, the contact springs 271 and 270 of the dial key 47c, the return signal conductor of the trunk 47, and the return signal conductor C1967 is completed for energizing the release relay R1460. This relay, in operating, initiates the release of the selector 10 in the exact manner described above.

The manner in which the other three signal and talk selectors 11, 12 and 13 provided in building No. 1 may, when assigned for use through the operation of the allotter in this building, be controlled from the operator position No. 2 to select and energize any desired room signal in building No. 1 in accordance with any desired signal code, is exactly the same as described above with reference to the selection and control of the selector 10 from this operator position and the operator position No. 1. The four signal and talk selectors 10, 11, 12 and 13 may also be controlled through the allotter in building No. 1 and over the trunk 48 from the operator position No. 3 in building No. 3 to select and selectively control any one of the room signals provided in building No. 1. The manner in which this is accomplished will be readily apparent from the foregoing explanation. It will also be understood from this explanation that the four selectors 10, 11, 12 and 13 when seized from the operator position No. 2 or the operator position No. 3, function strictly as signal code transmission selectors, no provisions being made in the system for setting up talking connections which extend from these selectors to the indicated operator positions. It is only when these selectors are seized from the operator position No. 1 in building No. 1 that the intercommunication facilities provided therein may be used.

PRESELECTING THE SIGNAL SELECTORS IN BUILDING No. 1 FOR USE

Referring now more particularly to the manner in which the four signal selectors 10, 11, 12 and 13 are preselected for use, it is pointed out above that the start conductor C1252 over which the slow-to-operate start relay R1200 is controlled, extends through chain-connected break contacts of the respective R1320 assign relays individual to the four selectors. More specifically, the assign relay R1320 of the illustrated selector 10 includes the break contacts 1325 which form a part of this contact chain. It will also be recalled from the preceding explanation that when the selector 10 is seized the two assign relays R1320 and R1310 thereof are deenergized and restore. When all four of the R1320 assign relays individual to the four selectors are released, the start circuit, which includes the above-mentioned contact chain and the start conductor C1252, is completed for energizing the start relay R1200. This relay, in operating, closes its contacts 1202 to initiate the operation of the two pulse generating relays R1210 and R1220 in the manner previously explained. At its contacts 1205, the relay R1200 completes a circuit including the conductor C1256 for energizing the all-busy relay of the allotter No. 1. At its contacts 1204, the relay R1200 disconnects the conductor C1255 from ground, whereby the assign lamps individual to the trunks 47 and 48, and respectively provided at the operator position No. 2 and the operator position No. 3, are deenergized. At its contacts 1203, the relay R1200 prepares circuits for transmitting ground pulses over the ring and busy supervisory conductors of the trunks 47 and 48, respectively. At its contacts 1201, the relay R1200 connects the reset conductor C1250 to the negative terminal of the system battery through the resistor 1206, thereby to energize the R1320 assign relays included in those of the selectors 10, 11, 12 and 13 which are idle. In this regard, it will be recalled that during each interval when the signal and talk selector 10 is busy, the hold relay R1350 thereof is operated and the frequency selecting switch 1390 is off-normal. Accordingly, the operating circuit for the assign relay R1320 of the selector 10 is held open at the break contacts 1355 and the off-normal springs 1309'. Thus the assign relay R1320 is prevented from operating in response to the operation of the start relay R1200. If, however, the signal and talk selector 10 is idle at the time the relay R1200 operates, the upper winding of the assign relay R1320 in this selector is energized in a circuit which may be traced as extending from ground by way of the off-normal springs 1309', the contacts 1355 and 1322, the upper winding of R1320, C1250, the contacts 1201, and the resistor 1206 to battery. When its upper winding is thus energized, the relay R1320 locks up in a circuit which extends from ground by way of the off-normal springs 1309', the contacts 1355 and 1321, and the lower winding of R1320 to battery. After this locking circuit is completed, the relay R1320 opens its contacts 1322 to interrupt its operating circuit as traced above. In a manner clearly apparent from the above explanation with respect to the control of the relay R1320 in the selector 10, the R1320 assign relays provided in the idle ones of the other three selectors are caused to operate incident to the operation of the start relay R1200. Immediately any one of these four assign relays operates, the chain start circuit for the start relay R1200 is opened. Thus the relay R1320, upon operating, opens its contacts 1325 to break one point in the chain start circuit and thus cause the deenergization and release of the relay R1200. In operating, the relay R1320 also closes its contacts 1324 to complete the operating circuit for its associated assign relay R1310. In this regard, it will be understood that the operating circuits for the R1310 assign relays of the other selectors extend through the break contacts of the above-described contact chain. This circuit is accordingly broken at the contacts 1325 incident to the operation of the illustrated assign relay R1320, assuming that the latter relay is energized in response to the operation of the start relay R1200. Thus the R1310 assign relays of the other selectors 11, 12 and 13 are prevented from operating. On the other hand, if the selector 10 is busy, such that the assign relay R1320 is not operated therein in response to the operation of the relay R1200, the chain circuit is carried through the break contacts 1325 to the winding of the R1310 assign relay of the second selector 11. This assign relay is, accordingly, operated to preselect the selector 11 for use, assuming that this selector is idle. More generally stated, the chain circuit is carried through the chain-connected break contacts of the R1320 assign relays in the busy selectors to the winding of the R1310 assign relay in the first available idle selector. This particular R1310 assign relay, upon operating, sets up the associated selector for use. Assuming that the first three selectors 10, 11 and 12 are idle, for example, at the time the start relay R1200 operates, the two assign relays R1310 and R1320 of the illustrated selector 10, and the R1320 assign relays of the selectors 11 and 12, are locked operated incident to the operation of the start relay R1200.

As indicated above, the start relay R1200 is deenergized and restores incident to the operation of one or more of the assign relays embodied in the four selectors 10, 11, 12 and 13. In releasing, the relay R1200 opens its contacts 1201 to interrupt the common portion of the operating circuits for the R1320 assign relays; opens its contacts 1202 to discontinue the operation of the two pulsing relays R1210 and R1220; and opens its contacts 1205 to deenergize the all-busy relay of the allotter No. 1. At its contacts 1203, the relay R1200 opens the path for transmitting ground pulses over the ring and busy conductors of the trunks 47 and 48. At its contacts 1204, the relay R1200 again prepares the path for impressing ground potential upon the assign conductors of the trunks 47 and 48.

When the signal selector 10 is seized from one of the three operator positions in the manner previously explained, the assign relay R1320 is deenergized and restores. In releasing, this relay opens its contacts 1324 to deenergize the associated assign relay R1310, and closes its contacts 1325 to complete the operating circuit for the R1310 assign relay of the idle second signal selector 11. Thus the second signal selector 11 is preselected for use. When this selector is seized from one of the three operator positions, the chain circuit is extended through to the R1310 assign relay of the idle third selector 12. The last-mentioned relay, in operating, automatically preselects the selector 12 for use. When the R1320 assign relays of all four of the signal selectors are again concurrently deenergized, the chain start circuit for the start relay R1200 is recompleted, whereby the above-described reset operations are repeated.

In the event all four of the signal and talk selectors 10 to 13, inclusive, are rendered busy at the same time, the chain start circuit for the start relay R1200 is completed. This relay, in operating, performs the functions described above, it being noted in this regard that the operating circuits for the R1320 assign relays of the four selectors are at this time all held open in these selectors. Accordingly, the start relay R1200 remains in its operated position until one of the four selectors is released. Assuming that the selector 10 is the first one of the four selectors to be released, the operating circuit for the illustrated assign relay R1320 is completed at the off-normal springs 1309' incident to the release of the frequency selecting switch 1300. This assign relay, in operating, completes the operating circuit for its associated assign relay R1310, and opens its contacts 1325 to deenergize the start relay R1200, whereby the latter relay is released. Thus the selector 10 is set up for seizure from any one of the three operator positions.

During the period when all four of the selectors are busy, the all-busy relay of the allotter No. 1 is held in its operated position. If with the apparatus in this condition the attendant at the operator position No. 2, for example, should actuate the dial key 47c to its call position in an attempt to seize one of the four selectors 10 to 13, inclusive, a circuit is completed for energizing the assign lamp 47d in accordance with the ground pulses being generated by the two pulsing relays R1210 and R1220. More specifically, this circuit is completed at the contacts 1211 during each interval when the relay R1210 is operated, and may partially be traced as extending from ground by way of the contacts 1202, 1211 and 1203, C1255, the chain-connected break contacts of those connect relays in the allotter No. 1 which are individual to the four selectors 10, 11, 12 and 13 and the trunk 47, the make contacts of the operated all-busy relay in this allotter, the ring and busy conductor of the trunk 47, the contact springs 268, and the filament of the lamp 47d to battery. The intermittent energization of the lamp 47d over this circuit serves to inform the attendant at the operator position that the four selectors in building No. 1 are all busy. In this regard, it will be noted that when the selector 10 is occupied with a call the assign relay R1310 thereof is released. Accordingly, the two start conductors of the trunk 10b are opened-circuited in this selector. A similar condition prevails in each of the other three selectors when busy. Accordingly, the operation of the dial key 47c is without effect to produce the operation of any one of those connect relays in the allotter No. 1 which are individual to the four selectors 10 to 13, inclusive. Thus the four selectors are guarded against seizure during the all-busy period.

In a manner similar to that just described, if the attendant at the operator position No. 3 attempts to seize one of the four selectors 10 to 13, inclusive, at a time when all of these selectors are busy, the assign lamp individual to the trunk 48 and provided at this operator position is intermittently energized over the ring and busy supervisory conductor of the trunk 48 through operation of the two pulsing relays R1210 and R1220, to inform the attendant at this operator position that no selectors are available for use in building No. 1.

As indicated above, when the all-busy condition of the four selectors 10 to 13, inclusive, is terminated, the start relay R1200 and the all-busy relay of the allotter No. 1 are sequentially deenergized and restore. The all-busy relay, in releasing, recompletes the high resistance paths over which ground potential is normally impressed upon the assign conductors of the trunks 47 and 48, respectively. When these paths are recompleted, the assign lamps individual to the trunks 47 and 48, and respectively provided at the operator position No. 1 and the operator position No. 2, are dimly illuminated to indicate that one or more idle selectors are available for use in building No. 1.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a combined communication and selective call system, a plurality of stations each including a signal, a pair of operator positions, and a selector controllable from either of said operator positions selectively to control the signals at said stations and controllable from only one of said operator positions to set up a communication connection between said one operator position and any selected one of said stations.

2. In a combined communicating and selective call system, a plurality of stations each including a signal, a pair of operator positions, a selector including a first control trunk over which it may be seized from one of said operator positions, a second control trunk over which it may be seized from the other of said operator positions and a communication trunk, means at said one operator position for selectively controlling said selector over said first control trunk to selectively control the signals at said stations, and means at said other operator position for selectively controlling said selector over said second control trunk to select and selectively control the signals at said stations and to set up a communication connection which includes said communication trunk and extends between said other operator position and a selected one of said stations.

3. In a combined communication and selective call system, a plurality of stations each including a signal, a pair of operator positions, a selector selectively controllable from either of said operator positions selectively to control the signals at said stations and controllable from only one of said operator positions to prepare a communication connection between said one operator position and any one of said stations, and means controlled from said one station for completing said prepared communication connection.

4. In a combined communication and selective call system, a plurality of stations each including a signal and a return signal key, a pair of operator positions, a selector selectively controllable from either of said operator positions to select and selectively control the signals at said stations and controllable from only one of said operator positions to prepare a communication connection between said one operator position and a selected one of said stations, and means responsive to the operation of the return signal key provided at a selected one of said stations for transmitting a supervisory signal to the calling operator position and for completing the prepared communication connection in the event said one operator position is the calling operator position.

5. In a combined communication and selective call system, a plurality of stations each including a signal, a pair of operator positions, a plurality of selectors each controllable from either of said operator positions selectively to control the signals at said stations and each controllable from only one of said operator positions to set up a communication connection between said one operator position and any selected one of said stations, and means for preselecting said selectors for use in a predetermined order.

6. In a combined communication and selective call system, a plurality of stations each including a signal, a pair of operator positions, a plurality of selectors each controllable from either of said operator positions selectively to control the signals at said stations and each controllable from only one of said operator positions to prepare a communication connection between said one operator position and any selected one of said stations, means for preselecting said selectors for use in a predetermined order, and means controlled from any one of the stations that has been selected through one of said selectors from said one operator position for completing the prepared communication connection between said one station and said one operator position.

7. In a combined communication and selective call system, a plurality of stations each including a signal, a pair of operator positions, a plurality of selectors each controllable from either of said operator positions selectively to control the signals at said stations and each controllable from only one of said operator positions to set up a communication connection between said one operator position and any selected one of said stations, each of said selectors including means controllable from a selected one of said stations for transmitting a supervisory signal to the one of said operator positions from which it is being controlled, and means for preselecting said selectors for use in a predetermined order.

8. In a combined communication and selective call system, a plurality of stations each including a signal, a pair of operator positions, a plurality of selectors each controllable from either of said operator positions selectively to control the signals at said stations and each controllable from only one of said operator positions to prepare a communication connection between said one operator position and any selected one of said stations, each of said selectors including means controllable from a selected one of said stations for transmitting a supervisory signal to the one of said operator positions from which it is being controlled, means for preselecting said selectors for use in a predetermined order, and means controlled from any one of the stations that has been selected through one of said selectors from said one operator position for completing the prepared communication connection between said one station and said one operator position.

9. In a combined communication and selective call system, a plurality of stations each including a signal, a pair of operator positions, a selector controllable from either of said operator positions selectively to control the signals at said stations and controllable from only one of said operator positions to set up a communication connection for transmitting voice currents between said one operator position and any selected one of said stations in one direction, and means for controlling said connection to reverse the direction in which voice currents may be transmitted thereover.

10. In a combined communication and selective call system, a plurality of stations each including a signal, a pair of operator positions, a selector controllable from either of said operator positions selectively to control the signals at said stations and controllable from only one of said operator positions to set up a communication connection for transmitting voice currents between said one operator position and any selected one of said stations in one direction, and means controllable from said one operator position for controlling said connection to reverse the direction in which voice currents may be transmitted thereover.

11. In a combined communication and selective call system, a plurality of stations each including a signal, a pair of operator positions, a selector controllable from either of said operator positions to select and selectively control the signals at said stations and controllable from only one of said operator positions to prepare a one-way communication connection over which voice currents may be transmitted to said one operator position from a selected one of said stations, means controllable from said one station for completing said connection, and means controllable from said one operator position for controlling said connection to reverse the direction in which voice currents may be transmitted thereover.

12. In a combined communication and selective call system, a plurality of stations each including a signal, a pair of operator positions, a voice current amplifier, a selector controllable from either of said operator positions to select and selectively control the signals at said stations and controllable from only one of said operator positions to set up a communication connection which includes said amplifier and which may be utilized for transmitting voice currents between said one operator position and a selected one of said stations, and means for reversely including said amplifier in said connection, thereby to reverse the direction in which voice currents may be transmitted over said connection.

13. In a combined communication and selective call system, a plurality of stations each including a signal, a pair of operator positions, a voice current amplifier, a selector controllable from either of said operator positions to select and selectively control the signals at said stations and controllable from only one of said operator positions to set up a communication connection which includes said amplifier and which may be utilized for transmitting voice currents between said one operator position and a selected one of said stations, and means controllable from said one operator position for reversely including said amplifier in said connection, thereby to reverse the direction in which voice currents may be transmitted over said connection.

14. In a combined communication and selective call system, a plurality of stations each including a signal, a pair of operator positions, a voice current amplifier, a selector controllable from either of said operator positions to select and selectively control the signals at said stations and controllable from only one of said operator positions to prepare a communication connection which includes said amplifier and which may be utilized for transmitting voice currents from a selected one of said stations to said one operator position, means controllable from said one station for including said amplifier in said connection, thereby to complete said connection, and means controllable from said one operator position for reversely including said amplifier in said connection, thereby to condition said connection for the transmission of voice currents from said one operator position to said one station.

15. In a combined intercommunication and selective call system, a plurality of stations each including a signal, a pair of operator positions, a plurality of selectors each selectively controllable from either of said operator positions to select and selectively control the signals at said stations and controllable from only one of said operator positions to prepare a communication connection between said one operator position and a selected one of said stations, means controlled in accordance with the idle or busy condition of said selectors for preselecting said selectors for use one at a time and in a predetermined order, a voice current amplifier common to said selectors, means at said one operator position for seizing a preselected one of said selectors and for automatically preparing a communication connection which includes said amplifier and may be extended through said one selector to any one of said stations, and means controllable from said one station for completing said connection.

16. In a combined intercommunication and selective call system, a plurality of stations each including a signal, a pair of operator positions, a plurality of selectors each selectively controllable from either of said operator positions to select and selectively control the signals at said stations and controllable from only one of said operator positions to prepare a communication connection between said one operator position and a selected one of said stations, means controlled in accordance with the idle or busy condition of said selectors for preselecting said selectors for use one at a time and in a predetermined order, a voice current amplifier common to said selectors and operative to transmit voice currents in one direction only, means at said one operator position for seizing a preselected one of said selectors and for automatically preparing a communication connection which includes said amplifier and may be extended through said selector to any one of said stations, means controllable from said one station for completing said connection, and means controllable from said one operator position for reversely including said amplifier in said connection.

17. In a combined intercommunication and selective call system, a plurality of stations each including a signal, a pair of operator positions, a plurality of selectors each selectively controllable from either of said operator positions to select and selectively control the signals at said stations and controllable from only one of said operator positions to prepare a communication connection between said one operator position and a selected one of said stations, means controlled in accordance with the idle or busy condition of said selectors for preselecting said selectors for use one at a time and in a predetermined order, a voice current amplifier common to said selectors and operative to transmit voice currents in one direction only, means at said one operator position for seizing a preselected one of said selectors and for automatically preparing a communication connection which includes said amplifier and may be utilized in transmitting voice currents from a selected one of said stations to said one operator position, means at said one operator position for controlling said one selector to extend said connection to the selected station, means controllable from the selected station for completing said connection, and means controllable from said one operator position for reversely including said amplifier in said connection, thereby to condition said connection for the transmission of voice currents from said one operator position to the selected station.

18. In an intercommunication system including a master station and a plurality of remote stations, a selector directively controllable from said master station to set up a communication connection between said master station and a selected one of said remote stations which may be used for transmitting voice currents in one direction only, means at said master station for directively controlling said selector, and means for controlling said connection to reverse the direction in which voice currents may be transmitted thereover.

19. In an intercommunication system including a master station and a plurality of remote stations, a selector directively controllable from said master station to prepare a communication connection between said master station and a selected one of said remote stations which may be used for transmitting voice currents in one direction only, means controllable from the selected remote station for completing said connection, and means controllable from said master station for controlling said connection to reverse the direction in which voice currents may be transmitted thereover.

20. In an intercommunication system including a master station and a plurality of remote stations, a selector directively controllable from said master station to prepare a communication connection between said master station and a selected one of said remote stations which may be used for the transmission of voice currents from the selected remote station to said master station only, means controllable from the selected remote station for completing said connection, and means controllable from said master station for conditioning said connection for the transmission of voice currents from said master station to the selected remote station.

21. In an intercommunication system including a master station and a plurality of remote stations, a voice current amplifier operative to transmit voice currents in one direction only, a selector directively controllable from said master station to set up a connection which includes said amplifier and extends from said master station to a selected one of said remote stations, means at said master station for directively controlling said selector, and means for reversely including said amplifier in said connection.

22. In an intercommunication system including a master station and a plurality of remote stations, a voice current amplifier operative to transmit voice currents in one direction only, a selector directively controllable from said master station to prepare a connection which includes said amplifier and extends from said master station to a selected one of said remote stations, means controllable from the selected remote station for completing said connection, and means controllable from said master station for reversely including said amplifier in said connection, thereby to condition said connection for voice current transmission in the opposite direction.

23. In an intercommunication system including a master station and a plurality of remote stations, a voice current amplifier operative to transmit voice currents in one direction only, a selector directively controllable from said master station to prepare a connection which extends from said master station to a selected one of said remote stations, means controllable from said master station for including said amplifier in said connection in a manner such that voice currents may be transmitted thereover from the selected remote station to said master station, means controllable from the selected remote station for completing said connection, and means controllable from said master station for reversely including said amplifier in said connection, thereby to condition said connection for the transmission of voice currents from said master station to the selected remote station.

24. In an intercommunication system including a master station and a plurality of remote stations, a plurality of selectors each operative to route a connection from said master station to any one of said remote stations, a voice current amplifier common to said selectors, keys individual to said selectors and provided at said master station, a calling device at said master station for directively controlling any one of said selectors, and means responsive to the operation of any one of said keys for connecting the associated selector to be controlled by said calling device and for connecting said amplifier to be included in a connection routed through the associated selector to one of said remote stations.

25. In an intercommunication system including a master station and a plurality of remote stations, a plurality of selectors each operative to route a connection from said master station to any one of said remote stations, a voice current amplifier common to said selectors and operative to transmit voice currents in one direction only, keys individual to said selectors and provided at said master station, a calling device at said master station for directively controlling any one of said selectors, means responsive to the operation of any one of said keys for connecting the associated selector to be controlled by said calling device and for connecting said amplifier to be included in a connection routed through the associated selector to one of said remote stations, and means controllable from said master station for reversely including said amplifier in said connection.

26. In an intercommunication system including a master station and a plurality of remote stations, a loud speaker and a telephone instrument at said master station, a selector directively controllable from said master station to set up a communication connection between said master station and a selected one of said remote stations which may be used for transmitting voice currents in one direction only, means for controlling said connection to reverse the direction in which voice currents may be transmitted thereover, and means for selectively connecting said loud speaker and said telephone instrument for use in communicating over said connection.

27. In an intercommunication system including a master station and a plurality of remote stations, a loud speaker and a telephone instrument at said master station, a selector directively controllable from said master station to prepare a communication connection between said master station and a selected one of said remote stations which may be used for transmitting voice currents in one direction only, means controllable from the selected remote station for completing said connection, means controllable from said master station for controlling said connection to reverse the direction in which voice currents may be transmitted thereover, and means controllable from said master station for selectively connecting said loud speaker and said telephone instrument for use in communicating over said connection.

28. In an intercommunication system including a master station and a plurality of remote stations, a loud speaker and a telephone instrument at said master station, a voice current amplifier operative to transmit voice currents in one direction only, a selector directively controllable from said master station to set up a communication connection which includes said amplifier and extends between said master station and a selected one of said remote stations, means for reversely including said amplifier in said connection, thereby to change the direction in which voice currents may be transmitted thereover, and means for selectively connecting said loud speaker and said telephone instrument for use in communicating over said connection.

29. In an intercommunication system including a master station and a plurality of remote stations, a loud speaker and a telephone instrument at said master station, a voice current amplifier operative to transmit voice currents in one direction only, a selector directively controllable from said master station to set up a communication connection which includes said amplifier and extends between said master station and a selected one of said remote stations, switching means controllable from said master station reversely to include said amplifier in said connection, thereby to change the direction in which voice currents may be transmitted thereover, means operative to short-circuit the input circuit to said amplifier during each period when said switching means is operating, and means for selectively connecting said loud speaker and said telephone instrument for use in communicating over said connection.

30. In an intercommunication system including a master station and a plurality of remote stations, a loud speaker and a telephone receiver at said master station, a voice current amplifier operative to transmit voice currents in one direction only, a selector directively controllable from said master station to set up a communication connection which includes said amplifier and extends between said master station and a selected one of said remote stations, switching means controllable from said master station reversely to include said amplifier in said connection, thereby to change the direction in which voice currents may be transmitted thereover, means operative to short-circuit the input circuit to said amplifier during each period when said switching means is operating, means for selectively connecting said loud speaker and said telephone receiver for use in communicating over said connection, and means for reducing the voice current transmission level over said connection each time said telephone receiver is connected for use in communicating over said connection.

31. In an intercommunication system including a master station and a plurality of remote stations, a voice current amplifier operative to transmit voice currents in one direction only, a selector directively controllable from said master station to set up a communication connection which includes said amplifier and extends between said master station and a selected one of said remote stations, switching means for reversely including said amplifier in said connection, thereby to change the direction in which signal currents may be transmitted thereover, and means operative to short-circuit the input circuit to said amplifier during each period when said switching means is operating.

32. In an intercommunication system including a master station and a plurality of remote stations, a loud speaker and a telephone receiver at said master station, voice current amplifying means, a selector directively controllable from said master station to set up a communication connection which includes said amplifying means and extends between said master station and a selected one of said remote stations, means for selectively connecting said loud speaker and said telephone receiver for use in communicating over said connection, and means for reducing the voice current transmission level over said connection each time said telephone receiver is connected for use in communicating over said connection.

33. In an intercommunicating system including a master station and a plurality of remote stations, a plurality of selectors each having settings individually corresponding to said remote stations, means at said master station for nonconcurrently directing two of said selectors to settings corresponding to two different ones of said remote stations, thereby to set up connections between said master station and each of said two remote stations, a voice current amplifier, and means for selectively including said amplifier in either of said connections without releasing the other connection.

34. In an intercommunicating system including a master station and a plurality of remote stations, a plurality of selectors each having settings individually corresponding to said remote stations, means at said master station for nonconcurrently directing two of said selectors to settings corresponding to two different ones of said remote stations, thereby to set up connections between said master station and each of said two remote stations, a voice current amplifier operative to transmit voice currents in one direction only, means controllable from said master station for selectively including said amplifier in either of said two connections without releasing the other connection, and means controllable from said master station for reversely including said amplifier in either of said two connections.

35. In a communication system, a program circuit, a master station, a plurality of remote stations each provided with a communication line, a loud speaker and switching means for selectively connecting the associated loud speaker either to said program circuit or to the associated line, and a selector directively controllable from said master station to set up a connection between said master station and any selected one of said lines.

36. In a communication system, a program circuit, a master station, a plurality of remote stations each provided with a communication line, a loud speaker and switching means for selectively connecting the associated loud speaker either to said program circuit or to the associated line, and means for setting up a connection between said master station and any one of said lines.

37. In a communication system, a program circuit, a master station, a plurality of remote stations each provided with a communication line, a loud speaker and switching means for selectively connecting the associated loud speaker either to said program circuit or to the associated line, a voice current amplifier operative to transmit voice currents in one direction only, means for setting up a connection which includes said amplifier and extends between said master station and any selected one of said lines, and means controllable from said master station for reversely including said amplifier in said connection, thereby to reverse the direction in which voice currents may be transmitted over said connection.

38. In a communication system, a program circuit, a master station, a plurality of remote stations each provided with a communication line, a loud speaker and switching means for selectively connecting the associated loud speaker either to said program circuit or to the associated line, a voice current amplifier operative to transmit voice currents in one direction only, a selector directively controllable from said master station to set up a connection which includes said amplifier and extends between said master station and a selected one of said lines, and means controllable from said master station for reversely including said amplifier in said connection, thereby to reverse the direction in which voice currents may be transmitted over said connection.

39. In a communication system, a program circuit, a program trunk normally connected to said program circuit, a master station, a plurality of remote stations each provided with a communication line, a loud speaker and switching means for selectively connecting the associated loud speaker either to said trunk or to the associated line, means for setting up a connection between said master station and any selected one of said lines, and means controllable from said master station for disconnecting said program trunk from said program circuit and for setting up a connection which includes said trunk and extends to said master station.

40. In a communication system, a program circuit, a program trunk normally connected to said program circuit, a master station, a plurality of remote stations each provided with a communication line, a loud speaker and switching means for selectively connecting the associated loud speaker either to said trunk or to the associated line, a selector directively controllable from said master station to set up a connection between said master station and any selected one of said lines or said trunk, and means operative incident to the completion of a connection between said master station and said trunk for disconnecting said trunk from said program circuit.

41. In a communication system, a program circuit, a program trunk normally connected to said program circuit, a master station, a plurality of remote stations each provided with a communication line, a loud speaker and switching means for selectively connecting the associated loud speaker either to said trunk or to the associated line, a selector having a plurality of different settings which individually correspond to said lines and to said trunk, means at said master station for directing said selector to any one of its settings, thereby to complete a connection between said master station and the line or trunk corresponding to the setting of said selector, and means responsive to the operation of said selector to the setting corresponding to said trunk for disconnecting said trunk from said program circuit.

42. In a selective call system, a plurality of call signals, a plurality of operator positions, a plurality of selectors each controllable from any one of said operator positions to select and control any one of said signals, and an allotter for selecting said selectors for seizure from said operator positions.

43. In a selective call system, a plurality of call signals, a plurality of operator positions, a plurality of selectors each operative to select and control any one of said signals, means including trunks individual to said selectors and each extending to one of said operator positions for controlling said selectors from said one position, a trunk common to said selectors and extending to another of said operator positions, and means for selectively rendering said selectors controllable over said last-named trunk.

44. In a selective call system, a plurality of call signals, a plurality of operator positions, a plurality of selectors each operative to select and control any one of said signals, means including trunks individual to said selectors and each extending to one of said operator positions for controlling said selectors from said one position, a trunk common to said selectors and extending to another of said operator positions, and allotter means for selecting said selectors for seizure from said one operator position and for selectively rendering said selectors controllable over said last-named trunk from said other operator position.

45. In a selective call system, a plurality of call signals, a plurality of operator positions, a plurality of selectors each operative to select and control any one of said signals, means including trunks individual to said selectors and each extending to one of said operator positions for controlling said selectors from said one operator position, means including connect relays individual to said selectors and a trunk common to said selectors for controlling said selectors from another of said operator positions, and means for selectively rendering said connect relays controllable over said last-named trunk from said other operator position.

46. In a selective call system, a plurality of call signals, a plurality of operator positions, a plurality of selectors each operative to select and control any one of said signals, means including trunks individual to said selectors and each extending to one of said operator positions for controlling said selectors from said one operator position, means including connect relays individual to said selectors and a trunk common to said selectors for controlling said selectors from another of said operator positions, and allotter means for selecting said selectors for seizure from said one operator position and for selectively rendering said relays controllable over said last-named trunk from said other operator position.

47. In a selective call system, a plurality of call signals, first, second and third operator positions, a plurality of selectors each operative to select and control any one of said signals, means including trunks individual to said selectors and each extending to said first operator position for directively controlling said selectors from said first position, trunks common to said selectors and respectively extending to said second and third operator positions, and means for selectively rendering said selectors controllable over said last-named trunks from said second and third operator positions.

48. In a call system, a plurality of call signals, first, second and third operator positions, a plurality of selectors each operative to select and control any one of said signals, means including trunks individual to said selectors and each extending to said first operator position for directively controlling said selectors from said first position, trunks common to said selectors and respectively extending to said second and third operator positions, means for selectively rendering said selectors controllable over said last-named trunks from said second and third operator positions, and means for preventing the same selector from being seized over said last-named trunks from both said second and third operator positions.

49. In a selective call system, a plurality of call signals, first, second and third operator positions, a plurality of selectors each operative to select and control any one of said signals, means including trunks individual to said selectors and each extending to said first operator position for directively controlling said selectors from said first position, trunks common to said selectors and respectively extending to said second and third operator positions, and allotter means for selecting said selectors for seizure from said first operator position and for selectively rendering said selectors controllable over said last-named trunks from said second and third operator positions.

50. In a selective call system, a plurality of call signals, first, second and third operator positions, a plurality of selectors each operative to select and control any one of said signals, means including trunks individual to said selectors and each extending to said first operator position for directively controlling said selectors from said first position, trunks common to said selectors and respectively extending to said second and third operator positions, allotter means for selecting said selectors for seizure from said first operator position and for selectively rendering said selectors controllable over said last-named trunks from said second and third operator positions, and means for preventing the same selector from being seized over said last-named trunks from both said second and third operator positions.

51. In a selective call system, a plurality of call signals, first, second and third operator positions, a plurality of selectors each operative to select and control any one of said signals, means including trunks individual to said selectors and each extending to said first operator position for directively controlling said selectors from said first position, means including connect relays individual to said selectors and a trunk common to said selectors for directively controlling said selectors from said second operator position, means including additional connect relays also individual to said selectors and an additional trunk common to said selectors for controlling said selectors from said third operator position, and means for selectively rendering said connect relays controllable over their respective associated trunks from said second and third operator positions.

52. In a selective call system, a plurality of call signals, first, second and third operator positions, a plurality of selectors each operative to select and control any one of said signals, means including trunks individual to said selectors and each extending to said first operator position for directively controlling said selectors from said first position, means including connect relays individual to said selectors and a trunk common to said selectors for directively controlling said selectors from said second operator position, means including additional connect relays also individual to said selectors and an additional trunk common to said selectors for controlling said selectors from said third operator position, means for selectively rendering said connect relays controllable over their respective associated trunks from said second and third operator positions, and means for preventing the two connect relays corresponding to any one of said selectors from being concurrently operated.

53. In a selective call system, a plurality of call signals, first, second and third operator positions, a plurality of selectors each operative to select and control any one of said signals, means including trunks individual to said selectors and each extending to said first operator position for directively controlling said selectors from said first position, means including connect relays individual to said selectors and a trunk common to said selectors for directively controlling said selectors from said second operator position, means including additional connect relays also individual to said selectors and an additional trunk common to said selectors for controlling said selectors from said third operator position, and allotter means for selecting said selectors for seizure from said first operator position and for selectively rendering said connect relays controllable over said last-named trunks from said second and third operator positions.

54. In a selective call system, a plurality of call signals, first, second and third operator positions, a plurality of selectors each operative to select and control any one of said signals, means including trunks individual to said selectors and each extending to said first operator position for directively controlling said selectors from said first position, means including connect relays individual to said selectors and a trunk common to said selectors for directively controlling said selectors from said second operator position, means including additional connect relays also individual to said selectors and an additional trunk common to said selectors for controlling said selectors from said third operator position, allotter means for selecting said selectors for seizure from said first operator position and for selectively rendering said connect relays controllable over said last-named trunks from said second and third operator positions, and means for preventing the two connect relays corresponding to any one of said selectors from being concurrently operated.

55. In a selective call system, a plurality of call signals arranged in groups, a plurality of operator positions individually corresponding to said groups of signals, a plurality of selectors arranged in groups individually corresponding to said groups of signals and said operator positions, each of said selectors being operative to select and control any one of the signals in the associated group of signals, means including trunks individual to said selectors and each extending to the corresponding operator position for directively controlling said selectors from their respective associated positions, and means including trunks individually common to the different groups of selectors for directively controlling said selectors from the operator positions other than those positions with which they are respectively associated.

56. In a selective call system, a plurality of call signals arranged in groups, a plurality of operator positions individually corresponding to said groups of signals, a plurality of selectors arranged in groups individually corresponding to said groups of signals and said operator positions, each of said selectors being operative to select and control any one of the signals in the associated group of signals, means including trunks individual to said selectors and each extending to the corresponding operator position for directively controlling said selectors from their respective associated positions, means including trunks individually common to the different groups of selectors for directively controlling said selectors from the operator positions other than those positions with which they are respectively associated, and allotters individual to the different groups of selectors for selecting the selectors of the associated groups for seizure from said operator positions in a predetermined order.

57. In a signaling system, a first operator position, a first group of selectors selectively controllable from said first operator position to set up signaling connections, a second operator position, a second group of selectors selectively controllable from said second operator position to set up signaling connections, and means including a trunk common to said first group of selectors and extending to said second operator position for controlling the selectors of said first group from said second operator position to set up signaling connections.

58. In a signaling system, a first operator position, a first group of selectors selectively controllable from said first operator position to set up signaling connections, a second operator position, a second group of selectors selectively controllable from said second operator position to set up signaling connections, means including a trunk common to said first group of selectors and extending to said second operator position for controlling the selectors of said first group from said second operator position to set up signaling connections, and means including a trunk common to said second group of selectors and extending to said first operator position for controlling the selectors of said second group from said first operator position to set up signaling connections.

59. In a selective call system, a plurality of call signals, an operator position, a plurality of selectors each including a trunk extending to said operator position and each directively controllable over its trunk from said operator position to select and control any one of said signals, allotter means operative to preselect said selectors for use in a predetermined order, and signaling means at said operator position and selectively controlled over said trunks in accordance with the operation of said allotter means to indicate the selector which has been selected for use.

60. In a selective call system, a plurality of call signals, an operator position, a plurality of selectors each including a trunk extending to said operator position and each directively controllable over its trunk from said operator position to select and control any one of said signals, each of said selectors including control means operative to different settings in the selection and control of a desired one of said signals, allotter means operative to preselect said selectors for use in a predetermined order, and signaling means at said operator position and controlled in accordance with the operation of said allotter means to indicate the selector which is selected for use and controlled in accordance with the operation of the control means of a seized selector to indicate the setting of said last-named control means.

61. In a selective call system, a plurality of call signals, return signal keys individual to said signals, an operator position, a plurality of selectors each including a trunk extending to said operator position and each directively controllable over its trunk from said operator position to select and control any one of said signals, allotter means operative to preselect said selectors for use in a predetermined order, signaling means at said operator position and controlled in accordance with the operation of said allotter means to indicate the selector which has been selected for use, and signaling means at said operator position and controlled through said selectors by said keys to provide call answer indications.

62. In a selective call system, a plurality of call signals located in different zones of a plural zone area, an operator position, a plurality of selectors each directively controllable from said operator position to select and control any one of said signals, allotter means operative to preselect said selectors for use in a predetermined order, signaling means at said operator position controlled in accordance with the operation of said allotter means to indicate the selector which has been selected for use, additional signaling means at said operator position, return signal keys individual to said call signals, and means controlled in accordance with the operation of said return signal keys for controlling said additional signal means through said selectors to produce distinctive call answer indications at said operator position which identify the zone locations of the operated return signal keys.

63. In a selective call system, a plurality of call signals, an operator position, a plurality of selectors each including a trunk extending to said operator position and each directively controllable over its trunk from said operator position to select and control any one of said signals, each of said selectors including control means operative to different settings in the selection and control of a desired one of said signals, allotter means operative to preselect said selectors for use in a predetermined order, signaling means at said operator position controlled in accordance with the operation of said allotter means to indicate the selector which is selected for use and controlled in accordance with the operation of the control means of a seized selector to indicate the setting of said last-named control means, return signal keys individual to said call signals, and additional signal means at said operator position and selectively controlled through said selectors in accordance with the operation of said keys to provide call answer indications.

64. In a selective call system, a plurality of call signals located in different zones of a plural zone area, an operator position, a plurality of selectors each directively controllable from said operator position to select and control any one of said signals, each of said selectors including control means operative to different settings in the selection and control of a desired one of said signals, allotter means operative to preselect said selectors for use in a predetermined order, signaling means at said operator position controlled in accordance with the operation of said allotter means to indicate the selector which is selected for use and controlled in accordance with the operation of the control means in a seized selector to indicate the setting of said last-named control means, additional signaling means at said operator position, and means controlled in accordance with the operation of said return signal keys for controlling said additional signaling means through said selectors to produce distinctive call answer indications at said operator position which identify the zone locations of the operated return signal keys.

65. In a selective call system, a plurality of call signals, a first operator position, a plurality of selectors each including a trunk extending to said operator position and each directively controllable over its trunk from said operator position to select and control any one of said signals, means at said operator position for seizing any one of said selectors, a second operator position, means at said second operator position for seizing and directively controlling said selectors, and means responsive to an attempted seizure of any one of said selectors at said first operator position for producing a busy signal at said first operator position in the event said one selector has previously been seized from said second operator position.

66. In a selective call system, a plurality of call signals, a first operator position, a plurality of selectors each including a trunk extending to said operator position and each directively controllable over its trunk from said operator position to select and control any one of said signals, means at said operator position for seizing any one of said selectors, a second operator position, means at said second operator position for seizing and directively controlling said selectors, allotter means operative to preselect said selectors for use and concurrently to assign the same selector for seizure from both of said operator positions, and means responsive to an attempted seizure of any one of said selectors at said first operator position for producing a busy signal at said first operator position in the event said one selector has previously been seized from said second operator position.

67. In a selective call system, a plurality of call signals, an operator position, a plurality of selectors each including a trunk extending to said operator position and each directively controllable over its trunk from said operator position to select and control any one of said signals, each of said trunks including an assign conductor and a supervisory conductor, each of said selectors including control means for transmitting supervisory signals over the supervisory conductor of the associated trunk incident to the selection and control of one of said call signals, allotter means operative to preselect said selectors for use in a predetermined order, signal devices at said operator position individual to said trunks and selectively controlled over said assign conductors in accordance with the operation of said allotter means to indicate the selector which has been selected for use, switches individual to said trunks and provided at said operator position, and means individually responsive to the operation of said switches for connecting the associated signal devices to be controlled in accordance with the supervisory signals transmitted over the supervisory conductors of the associated trunks.

68. In a selective call system, a plurality of call signals, a first operator position, a plurality of selectors each including a trunk extending to said operator position and each directively controllable over its trunk from said operator position to select and control any one of said signals, each of said trunks including an assign conductor and a supervisory conductor, each of said selectors including control means for transmitting supervisory signals over the supervisory conductor of the associated trunk incident to the selection and control of one of said call signals, a second operator position, means at said second operator position for seizing and directively controlling said selectors, allotter means operative to preselect said selectors for use and concurrently to assign the same selector for seizure from both of said operator positions, signal devices at said first operator position individual to said trunks and selectively controlled over said assign conductors in accordance with the operation of said allotter means to indicate the selector which has been selected for use, switches individual to said trunks and provided at said first operator position, means individually responsive to the operation of said switches for connecting the associated signal devices to be controlled in accordance with the supervisory signals transmitted over the supervisory conductors of the associated trunks, and means responsive to an attempted seizure of any one of said selectors at said first operator position for controlling the associated signal device over the supervisory conductor of the associated trunk to produce a busy signal in the event said one selector has previously been seized from said second operator position.

69. In a selective call system, a plurality of call signals, an operator position, a plurality of selectors each including a trunk extending to said operator position and each directively controllable over its trunk from said operator position to select and control any one of said signals, each of said trunks including an assign conductor and a supervisory conductor and a return signal conductor, each of said selectors including control means for transmitting supervisory signals over the supervisory conductor of the associated trunk incident to the selection and control of one of said call signals, allotter means operative to preselect said selectors for use in a predetermined order, signal devices at said operator position individual to said trunks and selectively controlled over said assign conductors in accordance with the operation of said allotter means to indicate the selector which has been selected for use, switches individual to said trunks and provided at said operator position, means individually responsive to the operation of said switches for connecting the associated signal devices to be controlled in accordance with the supervisory signals transmitted over the supervisory conductors of the associated trunks, return signal keys individual to said call signals, and answer signals at said operator position selectively controlled over said return signal conductors in accordance with the operation of said keys to provide call answer indications.

70. In a selective call system, a plurality of call signals, a plurality of selectors each including an incoming trunk and each directively controllable over its incoming trunk to select and control any one of said signals, an operator position, a trunk common to said selectors and extending to said operator position, a switch at said operator position, allotter means controlled in accordance with the idle or busy condition of said selectors for preselecting said selectors for use in a predetermined order, and means jointly controlled by said alloter means and by said switch over said common trunk for selectively connecting said common trunk to said incoming trunks.

71. In a selective call system, a plurality of call signals, a plurality of selectors each including an incoming trunk and each directively controllable over its incoming trunk to select and control any one of said signals, an operator position, a trunk common to said selectors and extending to said operator position, a switch at said operator position, allotter means controlled in accordance with the idle or busy condition of said selectors for preselecting said selectors for use in a predetermined order, means jointly controlled by said allotter means and by said switch over said common trunk for selectively connecting said common trunk to said incoming trunks, and means jointly controlled by said allotter means and said switch for producing one signal indication at said operator position so long as any of said selectors are idle and for producing a different signal indication when all of said selectors are busy.

72. In a selective call system, a plurality of call signals, a plurality of selectors each including an incoming trunk and each directively controllable over its trunk to select and control any one of said signals, an operator position, a trunk common to said selectors and extending to said operator position, connect relays individual to said incoming trunks and each operative to connect its associated incoming trunk to said common trunk, and allotter means controlled in accordance with the idle or busy condition of said selectors for selectively rendering said relays controllable over said common trunk from said operator position.

73. In a selective call system, a plurality of call signals, a plurality of selectors each including an incoming trunk and each directively controllable over its trunk to select and control any one of said signals, an operator position, a trunk common to said selectors and extending to said operator position, connect relays individual to said incoming trunks and each operative to connect its associated incoming trunk to said common trunk, allotter means controlled in accordance with the idle or busy condition of said selectors for selectively rendering said relays controllable over said common trunk from said operator position, and means controlled by said allotter means over said common trunk for producing one signal indication at said operator position so long as any of said selectors are idle and for producing a different signal indication when all of said selectors are busy.

74. In a selective call system, a plurality of call signals, a plurality of selectors each including an incoming trunk and each directively controllable over its incoming trunk to select and control any one of said signals, each of said trunks including a supervisory conductor and each of said selectors including control means for transmitting supervisory signals over the supervisory conductor of its incoming trunk incident to the selection and control of one of said call signals, an operator position, a trunk common to said selectors and extending to said operator position, said common trunk including assign and supervisory conductors, connect relays individual to said incoming trunks and each operative to connect the conductors of the associated incoming trunk to the corresponding conductors of said common trunk, allotter means controlled in accordance with the idle or busy condition of said selectors for selectively rendering said relays controllable over said common trunk from said operator position, and signaling means at said operator position normally connected to be controlled by said allotter means over said assign conductor and connected to be controlled over the supervisory conductor of said common trunk following the operation of any one of said relays.

75. In a selective call system, a plurality of call signals, a plurality of selectors each including an incoming trunk and each directively controllable over its incoming trunk to select and control any one of said signals, each of said trunks including supervisory and return signal conductors, each of said selectors including control means for transmitting supervisory signals over the supervisory conductor of its incoming trunk incident to the selection and control of one of said call signals, an operator position, a trunk common to said selectors and extending to said operator position, said common trunk including assign, supervisory and return signal conductors, connect relays individual to said incoming trunks and each operative to connect the conductors of the associated incoming trunk to the corresponding conductors of said common trunk, allotter means controlled in accordance with the idle or busy condition of said selectors for selectively rendering said relays controllable over said common trunk from said operator position, a first signal at said operator position normally connected to be controlled by said allotter means over said assign conductor to produce one signal indication so long as any of said selectors are idle and to produce a different signal indication when all of said selectors are busy, switching means at said operator position and means controlled thereby for energizing a selected one of said connect relays and for connecting said first signal to be controlled in accordance with the supervisory signals transmitted over the supervisory conductor of said common trunk, return signal keys individual to said call signals, and a second signal at said operator position controllable over the return signal conductors of said common trunk and a connected incoming trunk by the key individual to a selected call signal to produce a call answer signal indication.

76. In a selective call system, a plurality of call signals, a plurality of selectors each including an incoming trunk and each directively controllable over its trunk to select and control any one of said signals, an operator position, a trunk common to said selectors and extending to said operator position, connect relays individual to said incoming trunks and each operative to connect its associated incoming trunk to said common trunk, means for selectively rendering said relays controllable from said operator position, return signal keys individual to said call signals, and a signal controllable over said common trunk and a connected one of said incoming trunks by the key individual to a selected call signal to produce a call answer indication at said operator position.

77. In a selective call system, a plurality of call signals, a plurality of selectors each including an incoming trunk and each directively controllable over its incoming trunk to select and control any one of said signals, an operator position, a trunk common to said selectors and extending to said operator position, connect relays individual to said incoming trunks and each operative to connect the conductors of the associated incoming trunk to the corresponding conductors of said common trunk, allotter means controlled in accordance with the idle or busy condition of said selectors for selectively rendering said relays controllable over said common trunk from said operator position, a first signal controlled over said common trunk by said allotter means to produce one signal indication at said operator position so long as any of said selectors are idle and to produce a different signal indication when all of said selectors are busy, return signal keys individual to said call signals, and a second signal controllable over said common trunk and a connected one of said incoming trunks by the key individual to a selected call signal to produce a call answer indication at said operator position.

78. In a communication system, a program trunk, a master station, a plurality of remote stations each provided with a communication line, a loud speaker and switching means for selectively connecting the associated loud speaker either to said program trunk or to the associated line, a selector having access to said lines and said trunk, and means at said station for controlling said selector to set up a connection between said master station and any one of said lines or said trunk.

79. In a communication system, a program trunk, a master station, a plurality of remote stations each provided with a communication line, a call signal, a loud speaker and switching means for selectively connecting the associated loud speaker either to said program trunk or to the associated line, said call signals being tuned to respond to signal currents of different frequencies, an impulse-controlled selector having access to said lines, said trunk and said call signals and including frequency selecting means for selecting the signal current frequency to be used in energizing one of said call signals, and means including an impulsing device at said master station for controlling said frequency selecting means and for otherwise controlling said selector to set up a connection between said master station and any one of said lines or said trunk.

80. In a communication system, a program trunk, a master station, a plurality of remote stations each provided with a communication line, a call signal, a loud speaker and switching means for selectively connecting the associated loud speaker either to said program trunk or to the associated line, said call signals being tuned to respond to signal currents of different frequencies, an impulse-controlled selector having access to said lines, said trunk and said call signals and including frequency selecting means for either selecting the signal current frequency to be used in energizing one of said call signals or conditioning said selector to seize said program trunk, and means including an impulsing device at said master station for controlling said frequency selecting means and for otherwise controlling said selector to set up a connection between said master station and any one of said lines or said trunk.

KURT MULLERHEIM.